(12) United States Patent
Zhang et al.

(10) Patent No.: US 12,720,211 B2
(45) Date of Patent: Aug. 25, 2026

(54) PHOTOGRAPHING METHOD AND RELATED DEVICE THEREOF

(71) Applicant: Honor Device Co., Ltd., Shenzhen (CN)

(72) Inventors: Wenhong Zhang, Shenzhen (CN); Fengxian Deng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 44 days.

(21) Appl. No.: 18/840,685

(22) PCT Filed: Apr. 11, 2023

(86) PCT No.: PCT/CN2023/087489
§ 371 (c)(1),
(2) Date: Aug. 22, 2024

(87) PCT Pub. No.: WO2024/040981
PCT Pub. Date: Feb. 29, 2024

(65) Prior Publication Data

US 2025/0168519 A1 May 22, 2025

(30) Foreign Application Priority Data

Aug. 25, 2022 (CN) ......................... 202211026658.0

(51) Int. Cl.
*H04N 23/80* (2023.01)
*H04N 5/77* (2006.01)
(Continued)

(52) U.S. Cl.
CPC ............. *H04N 23/80* (2023.01); *H04N 23/62* (2023.01); *H04N 23/667* (2023.01); *H04N 23/71* (2023.01); *H04N 23/632* (2023.01)

(58) Field of Classification Search
CPC ...... H04N 23/80; H04N 23/62; H04N 23/667; H04N 23/71; H04N 23/632; H04N 5/772;
(Continued)

(56) References Cited

U.S. PATENT DOCUMENTS 6,122,411 A * 9/2000 Shen .................. H04N 1/00408 358/404
9,990,964 B1 6/2018 Lee et al.
(Continued)

FOREIGN PATENT DOCUMENTS

CN 105979142 A 9/2016
CN 107016963 A 8/2017
(Continued)

OTHER PUBLICATIONS

Tan et al., "Illumination Method in Augmented Reality Based on Dynamic Light Map", Computer Engineering, vol. 35, No. 21, Nov. 2009, pp. 261-263.

*Primary Examiner* — Ahmed A Berhan
(74) *Attorney, Agent, or Firm* — Conley Rose, P.C.

(57) ABSTRACT

A method includes determining a memory occupation amount; when the memory occupation amount is less than a first memory threshold, determining a level-x processing algorithm as a first photographing algorithm, and determining a level-x processing frame quantity as a first frame quantity; when the memory occupation amount is greater than or equal to the first memory threshold but less than a second memory threshold, determining the level-x processing algorithm as a second photographing algorithm, and determining the level-x processing frame quantity as a second frame quantity; or when the memory occupation amount is greater than the second memory threshold, determining the level-x processing algorithm as a third photographing algorithm, and determining the level-x processing frame quantity as a third frame quantity; processing the
(Continued)

level-x processing frame quantity in a raw image by using the level-x processing algorithm to obtain a corresponding shot image; and saving the shot image.

19 Claims, 31 Drawing Sheets

(51) Int. Cl.
*H04N 23/62* (2023.01)
*H04N 23/667* (2023.01)
*H04N 23/71* (2023.01)
*H04N 23/63* (2023.01)

(58) Field of Classification Search
CPC .... H04N 23/631; H04N 23/741; H04N 23/76; H04N 23/81; H04N 23/95; Y02D 10/00; G06F 9/5016
See application file for complete search history.

(56) References Cited

U.S. PATENT DOCUMENTS

| | | | | |
|---|---|---|---|---|
| 11,218,780 | B2 | 1/2022 | Zhou | |
| 11,977,931 | B2 | 5/2024 | Noh et al. | |
| 12,035,053 | B2 | 7/2024 | Kang et al. | |
| 2004/0252201 | A1* | 12/2004 | Meitav | H04N 1/32128 348/241 |
| 2009/0009617 | A1 | 1/2009 | Ito et al. | |
| 2013/0127933 | A1 | 5/2013 | Yamamoto | |
| 2014/0380029 | A1 | 12/2014 | Tokuda | |
| 2015/0229816 | A1 | 8/2015 | Tomiyasu | |
| 2016/0217328 | A1 | 7/2016 | Yanai et al. | |
| 2020/0050530 | A1 | 2/2020 | Orth et al. | |
| 2021/0382650 | A1* | 12/2021 | Agarwal | G06F 3/0659 |

FOREIGN PATENT DOCUMENTS

| | | | |
|---|---|---|---|
| CN | 107277374 | A | 10/2017 |
| CN | 108055556 | A | 5/2018 |
| CN | 108289172 | A | 7/2018 |
| CN | 110166708 | A | 8/2019 |
| CN | 110445988 | A | 11/2019 |
| CN | 110659136 | A | 1/2020 |
| CN | 110705497 | A | 1/2020 |
| CN | 110933294 | A | 3/2020 |
| CN | 110955541 | A | 4/2020 |
| CN | 111416759 | A | 7/2020 |
| CN | 113411504 | A | 9/2021 |
| CN | 113918328 | A | 1/2022 |
| CN | 114144744 | A | 3/2022 |
| CN | 114286018 | A | 4/2022 |
| CN | 114650433 | A | 6/2022 |
| CN | 114841853 | A | 8/2022 |
| CN | 116055897 | A | 5/2023 |
| EP | 3926942 | A1 | 12/2021 |
| IN | 201627019736 | A | 8/2016 |
| JP | 2015179969 | A | 10/2015 |
| WO | 2021052292 | A1 | 3/2021 |

* cited by examiner

FIG. 1A
100
5G 5G 8:00
8:00
Monday, July 5
Files
Email
Music
Calculator
Video
Sports & Health
Weather
Browser
Reader
Settings
Recorder
Mall
Contacts
Phone
Messages

TO FIG. 1B

FIG. 2A
100
5G
5G
8:00
8:00
Monday, July 5
Files
Email
Music
Calculator
Video
Sports &
Health
Weather
Browser
Reader
Settings
Recorder
Mall
Contacts
Phone
Messages
TO
FIG. 2B

CONT. FROM FIG. 2C

| Scenes \ xth time | 1st time |
|---|---|
| Low brightness+high dynamic | A1 algorithm |
| | a1 frames |
| Low brightness+low dynamic | B1 algorithm |
| | b1 frames |
| High brightness+high dynamic | C1 algorithm |
| | c1 frames |
| High brightness+low dynamic | D1 algorithm |
| | d1 frames |

FIG. 8

<table>
<tr><th>Scenes / xth time</th><th>Memory occupation amount</th><th colspan="2">Low brightness+low dynamic</th></tr>
<tr><td>1st time</td><td></td><td>First night scene algorithm (A1 algorithm)</td><td>6 frames</td></tr>
<tr><td>2nd time</td><td>Less than a first memory threshold</td><td>First night scene algorithm (First photographing algorithm)</td><td>6 frames (First frame quantity)</td></tr>
<tr><td>3rd time</td><td>Greater than the first memory threshold and less than a second memory threshold</td><td>First night scene algorithm Second photographing algorithm</td><td>5 frames (Second frame quantity)</td></tr>
<tr><td>4th time</td><td rowspan="2">Greater than the second memory threshold</td><td>First night scene algorithm (Third photographing algorithm)</td><td>4 frames (Third frame quantity)</td></tr>
<tr><td>...</td><td>...</td><td>...</td></tr>
</table>

FIG. 14

| Scenes / xth time | Device temperature | Memory occupation amount | High brightness+low dynamic | |
|---|---|---|---|---|
| 1st time | Less than a temperature threshold | | First MFNR algorithm (D1 algorithm) | 6 frames |
| 2nd time | | Less than a first memory threshold | Second MFNR algorithm (First photographing algorithm) | 6 frames (First frame quantity) |
| 3rd time | | Greater than the first memory threshold and less than a second memory threshold | Third MFNR algorithm Second photographing algorithm | 6 frames (Second frame quantity) |
| 4th time | | Greater than the second memory threshold | Fourth MFNR algorithm (Third photographing algorithm) | 6 frames (Third frame quantity) |
| 5th time | Greater than the temperature threshold | | Single-frame algorithm | 1 frame |
| ... | | | ... | ... |

FIG. 15

| Scenes / xth time | Frequency | Memory occupation amount | High brightness+high dynamic | |
|---|---|---|---|---|
| 1st time | Does not meet a preset frequency condition | | First HDR algorithm | 9 frames |
| 2nd time | | Less than a first memory threshold | Second HDR algorithm (First photographing algorithm) | 8 frames (First frame quantity) |
| ... | | | ... | ... |
| 6th time | | Greater than the first memory threshold and less than a second memory threshold | Third HDR algorithm (Second photographing algorithm) | 7 frames (Second frame quantity) |

FIG. 16A

| xth time \ Scenes | Frequency | Memory occupation amount | High brightness+high dynamic | |
|---|---|---|---|---|
| 1st time | Does not meet a preset frequency condition | | First HDR algorithm | 9 frames |
| 2nd time | | Less than a first memory threshold | Third MFNR algorithm | 8 frames |
| ... | | | ... | ... |
| 6th time | | Greater than the first memory threshold and less than a second memory threshold | Third HDR algorithm | 7 frames |
| 7th time | Meet the preset frequency condition | | Third MFNR algorithm | 4 frames |

Replace

FIG. 16B

| Scenes / xth time | Frequency | Memory occupation amount | High brightness+high dynamic | |
|---|---|---|---|---|
| 1st time | Does not meet a preset frequency condition | | First HDR algorithm | 9 frames |
| 2nd time | | Less than a first memory threshold | Fourth MFNR algorithm | 8 frames |
| … | | | … | … |
| 6th time | | Greater than the first memory threshold and less than a second memory threshold | Third HDR algorithm | 7 frames |
| 7th time | Meet the preset frequency condition | | Fourth MFNR algorithm | 4 frames |
| 8th time | | Greater than the second memory threshold | Fourth MFNR algorithm | 3 frames |

Replace

FIG. 16C

PHOTOGRAPHING METHOD AND RELATED DEVICE THEREOF

CROSS-REFERENCE TO RELATED APPLICATIONS

This is a U.S. National Stage of International Application No. PCT/CN2023/087489 filed on Apr. 11, 2023, which claims priority to Chinese Patent Application No. 202211026658.0, filed with the China National Intellectual Property Administration on Aug. 25, 2022, both of which are incorporated herein by reference in their entireties.

TECHNICAL FIELD

This application relates to the field of image technologies, and specifically, to a photographing method and a related device thereof.

BACKGROUND

With popularization of electronic devices with a photographing function in life, it has become a daily way of behavior for people to use electronic devices to take photos.

Currently, when most electronic devices are performing photographing processing, to achieve a better photographing picture quality effect, a multi-frame photographing algorithm is mostly used. However, usually, more frames are processed by using the algorithm, corresponding processing duration is longer. In this case, if a user continuously triggers a plurality of times of photographing, a photographing request may wait in a background. To-be-processed images accumulated for a quantity of photographing waiting for processing cause memory occupation to continuously expand. When remaining memory is not enough to support photographing processing, the background does not respond to a photographing command of the user, that is, the electronic device cannot continue photographing. A new method is urgently needed to resolve this problem.

SUMMARY

This application provides a photographing method and a related device thereof. By distinguishing a memory occupation amount, processing algorithms with different processing duration and/or processing frame quantities are adaptively selected for processing. This can reduce pressure from a memory increment, and implement continuous and fast photographing.

According to a first aspect, a photographing method is provided and is applied to an electronic device including a camera. The method includes:

displaying a first interface, where the first interface includes a first control;

when a first operation on the first control is detected, collecting a raw image once in response to the first operation;

determining a memory occupation amount for a quantity of an xth time of photographing;

when the memory occupation amount is less than a first memory threshold, determining a level-x processing algorithm as a first photographing algorithm, and determining a level-x processing frame quantity as a first frame quantity, where x is an integer greater than 1;

when the memory occupation amount is greater than or equal to the first memory threshold but less than a second memory threshold, determining the level-x processing algorithm as a second photographing algorithm, and determining the level-x processing frame quantity as a second frame quantity; or when the memory occupation amount is greater than the second memory threshold, determining the level-x processing algorithm as a third photographing algorithm, and determining the level-x processing frame quantity as a third frame quantity, where the first memory threshold is less than the second memory threshold;

processing the level-x processing frame quantity in the raw image by using the level-x processing algorithm to obtain a corresponding shot image; and saving the shot image, where when the first photographing algorithm, the second photographing algorithm, and the third photographing algorithm are the same, the first frame quantity, the second frame quantity, and the third frame quantity gradually decrease; or when processing duration of the first photographing algorithm, the second photographing algorithm, and the third photographing algorithm gradually decreases, the first frame quantity, the second frame quantity, and the third frame quantity are the same or gradually decrease.

Optionally, the first operation is a tap operation. The first operation may further include a voice indication operation or another operation that indicates the electronic device to perform photographing.

An embodiment of this application provides a photographing method. In response to the first operation performed by the user on the first control, the electronic device collects the raw image once by using the camera, and then adaptively selects, for processing, algorithms with different processing duration by determining a value of the memory occupation amount and based on different values of memory occupation amounts. For example, when the memory occupation amount is relatively small, an algorithm with relatively long processing time is selected for processing, or when the memory occupation amount gradually increases, an algorithm with relatively short processing time is selected for processing. This can reduce pressure from a memory increment in the electronic device, improve photographing processing efficiency, respond to a photographing requirement of the user in a timely manner, and implement continuous and fast photographing.

In a possible implementation of the first aspect, the method further includes:

for the quantity of the xth time of photographing, processing 1 frame of the raw image by using a single-frame algorithm when a device temperature is greater than or equal to a temperature threshold, to obtain a corresponding shot image, where when the first photographing algorithm, the second photographing algorithm, and the third photographing algorithm are the same, processing duration of the single-frame algorithm is shorter than the processing duration of the third photographing algorithm; or when the processing duration of the first photographing algorithm, the second photographing algorithm, and the third photographing algorithm gradually decreases, processing duration of the single-frame algorithm is the same as the processing duration of the third photographing algorithm, or the processing duration of the single-frame algorithm is shorter than the processing duration of the third photographing algorithm.

The device temperature is a temperature inside the electronic device.

In this implementation, when the device temperature is higher than the temperature threshold, the single-frame algorithm may be switched to process the 1 frame of the raw image. This reduces workload of the electronic device to a maximum extent, slows down an amplitude of a heat increase, and reduces pressure from a heat increment, so that quantities of some more times of photographing are implemented before the electronic device cannot work, to meet a photographing requirement of the user.

It should be understood that, because the single-frame algorithm may run processing only in an image signal processor, the single-frame algorithm has a relatively fast processing speed and relatively short processing duration.

In a possible implementation of the first aspect, the method further includes:

when the first operation corresponds to a quantity of a 1st time of photographing, performing environment detection on a to-be-shot scene;

determining, based on an environment detection result, a level-1 processing frame quantity and a level-1 processing algorithm corresponding to the quantity of the 1st time of photographing; and processing, by using the level-1 processing algorithm, the level-1 processing frame quantity in a raw image collected corresponding to the quantity of the 1st time of photographing, to obtain a corresponding shot image.

In this implementation, in this application, different scenes may be determined by performing the environment detection on the to-be-shot scene. Then, different algorithms are selected based on different subdivided scenes, and different frame quantities are selected from a correspondingly collected raw image for processing, so that quality and an effect of the shot image obtained corresponding to the quantity of the 1st time of photographing in each scene can be adaptively improved.

In a possible implementation of the first aspect, the environment detection includes at least lightness detection and dynamic range detection, and the environment detection result includes at least lightness and a dynamic range value; and the determining, based on an environment detection result, a level-1 processing frame quantity and a level-1 processing algorithm corresponding to the quantity of the 1st time of photographing includes:

when the lightness is less than a lightness threshold and the dynamic range value is greater than or equal to a dynamic range threshold, determining the level-1 processing frame quantity as a1 frames, and determining the level-1 processing algorithm as an A1 algorithm;

when the lightness is less than the lightness threshold and the dynamic range value is less than the dynamic range threshold, determining the level-1 processing frame quantity as b1 frames, and determining the level-1 processing algorithm as a B1 algorithm;

when the lightness is greater than or equal to the lightness threshold and the dynamic range value is greater than or equal to the dynamic range threshold, determining the level-1 processing frame quantity as c1 frames, and determining the level-1 processing algorithm as a C1 algorithm; or when the lightness is greater than or equal to the lightness threshold and the dynamic range value is less than the dynamic range threshold, determining the level-1 processing frame quantity as d1 frames, and determining the level-1 processing algorithm as a D1 algorithm, where a1, b1, c1, and d1 are all integers greater than or equal to 1.

Optionally, the a1 frames, the b1 frames, the c1 frames, or the d1 frames may be selected from all frames of raw images based on a collection sequence. Alternatively, the a1 frames, the b1 frames, the c1 frames, or the d1 frames may be randomly extracted from all the frames of the raw images.

In a possible implementation of the first aspect, the processing, by using the level-1 processing algorithm, the level-1 processing frame quantity in a raw image collected corresponding to the quantity of the 1st time of photographing, to obtain a corresponding shot image includes:

when the lightness is less than the lightness threshold and the dynamic range value is greater than or equal to the dynamic range threshold, processing, by using the A1 algorithm, the a1 frames of raw images collected corresponding to the quantity of the 1st time of photographing, to obtain a corresponding shot image;

when the lightness is less than the lightness threshold and the dynamic range value is less than the dynamic range threshold, processing, by using the B1 algorithm, the b1 frames of raw images collected corresponding to the quantity of the 1st time of photographing, to obtain a corresponding shot image;

when the lightness is greater than or equal to the lightness threshold and the dynamic range value is greater than or equal to the dynamic range threshold, processing, by using the C1 algorithm, the c1 frames of raw images collected corresponding to the quantity of the 1st time of photographing, to obtain a corresponding shot image; or when the lightness is greater than or equal to the lightness threshold and the dynamic range value is less than the dynamic range threshold, processing, by using the D1 algorithm, the d1 frames of raw images collected corresponding to the quantity of the 1st time of photographing, to obtain a corresponding shot image.

Optionally, when the dynamic range value is greater than or equal to the dynamic range threshold, the a1 frames of the raw images collected corresponding to the quantity of the 1st time of photographing, and/or the c1 frames of the raw images collected corresponding to the quantity of the 1st time of photographing include at least one of a long-exposure raw image, a normal-exposure raw image, and a short-exposure raw image.

In this implementation, when processed raw images include the long-exposure raw image, the normal-exposure raw image, and the short-exposure raw image, a dynamic range of the image and an image detail may be adjusted, so that content presented by an obtained shot image is more real and image quality is relatively better.

In a possible implementation of the first aspect, after the determining the level-x processing algorithm as a third photographing algorithm, and determining the level-x processing frame quantity as a third frame quantity, the method further includes:

determining a frequency of the first operation on the first control and a difference between a memory water level and the memory occupation amount;

when the frequency meets a preset frequency condition or the difference is less than a preset difference, determining a quantity of photographing waiting in a background;

separately using a level-x processing algorithm corresponding to each of the quantity of photographing waiting in the background as an initial processing algorithm;

using, as a target processing algorithm, a level-x processing algorithm corresponding to a quantity of photographing most recently determined;

replacing, by using the target processing algorithm, the initial processing algorithm of each of the quantity of photographing waiting in the background; and when a quantity of any time of photographing waiting in the background is invoked for processing, processing, by using the target processing algorithm, a level-x processing frame quantity in a raw image corresponding to the quantity of the any time of photographing, to obtain a corresponding shot image.

In this implementation, because the processing algorithm corresponding to the quantity of photographing most recently determined is determined based on a current memory situation, the processing algorithm of the quantity of waiting photographing is accordingly adjusted, so that a memory accumulation degree can be controlled, the memory occupation amount can decrease, and continuous and fast photographing can be implemented.

In a possible implementation of the first aspect, the first interface is a photographing interface, and the first control is a control configured to indicate photographing.

In a possible implementation of the first aspect, the first interface is a video recording interface, and the first control is a control configured to indicate taking a snapshot.

According to a second aspect, an image processing apparatus is provided. The apparatus includes a unit configured to perform the steps according to the first aspect or any possible implementation of the first aspect.

According to a third aspect, an electronic device is provided, including one or more processors and a memory.

The memory is coupled to the one or more processors, the memory is configured to store computer program code, the computer program code includes computer instructions, and the one or more processors invoke the computer instructions to enable the electronic device to perform the method provided in the first aspect or any possible implementation of the first aspect.

According to a fourth aspect, a chip is provided, the chip is applied to an electronic device, the chip includes one or more processors, and the processor invokes computer instructions to enable the electronic device to perform the method provided in the first aspect or any possible implementation of the first aspect.

According to a fifth aspect, a computer-readable storage medium is provided. The computer-readable storage medium stores computer program code, and when the computer program code is run by an electronic device, the electronic device is enabled to perform the method provided in the first aspect or any possible implementation of the first aspect.

According to a sixth aspect, a computer program product is provided. The computer program product includes computer program code, and when the computer program code is run by an electronic device, the electronic device is enabled to perform the method provided in the first aspect or any possible implementation of the first aspect.

The embodiments of this application provide the photographing method and the related device thereof. When responding to the first operation performed by the user on the first control, the electronic device collects the raw image once by using the camera. When the first operation corresponds to the quantity of the 1st time of photographing, the environment detection is performed on the to-be-shot scene. Then, the level-1 processing frame quantity and the level-1 processing algorithm corresponding to the quantity of the 1st time of photographing are determined based on the environment detection result. When the first operation corresponds to the quantity of the 2nd time of photographing and a quantity of another subsequent time of photographing, the memory occupation amount is first detected, and a determined value of the memory occupation amount is compared with a preset memory threshold. Then, different processing frame quantities and different processing algorithms are selected based on different values of memory occupation amounts.

When processing is performed for the quantity of the 1st time of photographing, the scene is subdivided based on the environment detection result, and the different algorithms and the different frame quantities are selected based on the different scenes, so that quality and an effect of the shot image obtained corresponding to the quantity of the 1st time of photographing in each scene can be adaptively improved.

When processing is performed for the quantity of the 2nd time of photographing and another subsequent quantity, because subdivision is performed for the memory occupation amount, the different algorithms and the different frame quantities are selected based on different memory occupation amounts. When the memory occupation amount is larger, an algorithm with shorter processing duration is selected and/or the processing frame quantity decreases, thereby reducing pressure from a memory increment, improving processing efficiency, and implementing a fast photographing requirement.

BRIEF DESCRIPTION OF DRAWINGS

FIG. 8 shows a table according to an embodiment of this application;

FIG. 14 shows another table according to an embodiment of this application;

FIG. 15 shows still another table according to an embodiment of this application;

FIG. 16A to FIG. 16C show still another table according to an embodiment of this application;

DESCRIPTION OF EMBODIMENTS

Figure 1A:
FIG. 1A and FIG. 1B are a schematic diagram of a scene to which an embodiment of this application is applicable.

The following describes the technical solutions in this application with reference to the accompanying drawings.

In the descriptions of embodiments of this application, unless otherwise specified, "/" represents "or". For example, A/B may represent A or B. In this specification, "and/or" is merely an association relationship for describing associated objects, and represents that three relationships may exist. For example, A and/or B may represent the following three cases: Only A exists, both A and B exist, and only B exists. In addition, in the descriptions of embodiments of this application, "a plurality of" refers to two or more.

In the following, the terms "first" and "second" are used merely for the purpose of description, and shall not be construed as indicating or implying relative importance or implicitly indicating a quantity of indicated technical features. Therefore, a feature limited by "first" or "second" may explicitly or implicitly include one or more features.

First, some terms in the embodiments of this application are explained and described for ease of understanding by persons skilled in the art.

1. RGB (red, green, blue) color space refers to a color model related to a structure of a human visual system. Based on a structure of human eyes, all colors are treated as different combinations of red, green, and blue.

2. YUV color space refers to a color coding method. Y indicates brightness, and U and V indicate chromaticity. The foregoing RGB color space focuses on human eye sensitivity to colors, while the YUV color space focuses on visual sensitivity to brightness, and the RGB color space and the YUV color space may be converted into each other.

3. A pixel value refers to a group of color components corresponding to each pixel in a color image in RGB color space. For example, each pixel corresponds to a group of three fundamental color components, and the three fundamental color components are respectively a red component R, a green component G, and a blue component B.

4. Bayer pattern (bayer pattern) color filter array (color filter array, CFA): During converting an image from an actual scene to image data, usually, an image sensor separately receives information about three channel signals: a red channel signal, a green channel signal, and a blue channel signal, and then combines the information about the three channel signals into a color image. However, in this solution, three filters are correspondingly required at each pixel location, which is expensive and is difficult to prepare. Therefore, a layer of color filter array may be covered on a surface of the image sensor, to obtain the information about the three channel signals. The bayer pattern color filter array refers to arrange filters in a chessboard format. For example, a minimum repetition unit in the bayer pattern color filter array is: A filter for obtaining a red channel signal, two filters for obtaining a green channel signal, and a filter for obtaining a blue channel signal are arranged in a 2×2 manner.

5. A bayer pattern image (bayer image) is an image output by an image sensor based on a bayer pattern color filter array. Pixels of a plurality of colors in the image are arranged in a bayer pattern. Each pixel in the bayer pattern image corresponds only to a channel signal of one color. For example, because a human vision is relatively sensitive to green, it may be set that green pixels (pixels corresponding to green channel signals) occupy 50% of all pixels, and blue pixels (pixels corresponding to blue channel signals) and red pixels (pixels corresponding to red channel signals) each occupy 25% of all the pixels. A minimum repetition unit of the bayer pattern image is: One red pixel, two green pixels, and one blue pixel are arranged in a 2×2 manner. The bayer pattern image is an image located in a RAW domain.

6. Photographing parameter

The photographing parameter may include a shutter, exposure time, an aperture value (aperture value, AV), an exposure value (exposure value, EV), and photosensitivity ISO. Descriptions are separately provided below.

The shutter is an apparatus that controls time of light entering a camera to determine exposure time of an image. When the shutter remains in an open state for a longer time, more light enters the camera, and the exposure time corresponding to the image is longer. On the contrary, when the shutter remains in the open state for a shorter time, less light enters the camera, and the exposure time corresponding to the image is shorter.

The exposure time refers to time for which the shutter needs to be on to project light onto a photosensitive surface of a photosensitive material of the camera. The exposure time is determined based on photosensitivity of the photosensitive material and lightness on the photosensitive surface. Longer exposure time indicates more light that enters the camera, and shorter exposure time indicates less light that enters the camera. Therefore, longer exposure time is needed in a dark scene, and shorter exposure time is needed in a backlight scene.

The aperture value (f value) is a ratio of a focal length of a lens (lens) in the camera to a light passing diameter of the lens. A larger aperture value indicates more light that enters the camera. A smaller aperture value indicates less light that enters the camera.

The exposure value is a value that is obtained by combining the exposure time and the aperture value and that represents a light passing capability of the lens of the camera. The exposure value may be defined as:

$$EV = \log_2 \frac{N^2}{t},$$

where

N is the aperture value; and t is the exposure time in a unit of second.

The ISO is used to measure sensitivity of a negative film to light, namely, photosensitivity or a gain. An insensitive negative film needs longer exposure time to achieve an image with same brightness as a sensitive negative film. A sensitive negative film needs shorter exposure time to achieve an image with same brightness as an insensitive negative film.

For the shutter, the exposure time, the aperture value, the exposure value, and the ISO among the photographing parameters, an electronic device can implement at least one of auto focus (auto focus, AF), automatic exposure (automatic exposure, AE), and auto white balance (auto white balance, AWB) through an algorithm, to achieve automatic adjustment of these photographing parameters.

The auto focus means that the electronic device obtains a highest image frequency component by adjusting a location of a focusing lens, to obtain higher image contrast. Focusing is an accumulation process. The electronic device compares contrast of images shot by the lens at different locations, to obtain a location of the lens when the contrast of the image is highest, and further determine a focal length of focusing.

The automatic exposure means that the electronic device automatically sets an exposure value based on an available light source condition. The electronic device may automatically set a shutter speed and an aperture value based on an exposure value of a currently collected image, to automatically set the exposure value.

A color of an object changes due to a color of projected light, and images collected by the electronic device in different light colors have different color temperatures. White balance is closely related to ambient light. Regardless of the ambient light, a camera of the electronic device can identify white, and restore another color based on white. Auto white balance enables the electronic device to adjust a fidelity degree of an image color based on a light source condition, where 3A refers to the auto focus, the auto exposure and the auto white balance.

For example, the exposure value may be any one of −24, −4, −3, −2, −1, 0, 1, 2, 3, 4, and 24.

An exposure image corresponding to EV0 is used to indicate an exposure image captured by using a determined exposure value 0 when the electronic device implements exposure by using an algorithm. An exposure image corresponding to EV−2 is used to indicate an exposure image captured by using a determined exposure value −2 when the electronic device implements exposure by using an algorithm. An exposure image corresponding to EV1 is used to indicate an exposure image captured by using a determined exposure value 1 when the electronic device implements exposure by using an algorithm. The rest is deduced by analogy. Details are not described herein again.

Every increase of the exposure value by 1 indicates a change by one level of exposure. To be specific, an exposure amount (which refers to an integral of lightness received by a specific surface element on a surface of an object in time t) is doubled, for example, the exposure time or an aperture area is doubled. In this case, the increase of the exposure value corresponds to a slower shutter speed and a smaller value of f. It can be learned from this that an exposure value of EV0 increases by 2 compared with that of EV−2, and two levels of exposure are changed. Similarly, an exposure value of EV1 increases by 1 compared with that of EV0, and one level of exposure is changed.

Herein, when the exposure value EV is equal to 0, the exposure value is usually an optimal exposure value under a current illumination condition. Correspondingly, an exposure image correspondingly obtained by the electronic device under a condition of EV0 is an optimal exposure image under the current illumination condition. The optimal exposure image may also be referred to as a reference exposure image.

It should be understood that the "optimal" exposure image refers to an exposure image determined by a given electronic device by using an algorithm, and the determined optimal exposure image varies with the electronic device, the algorithm, or the current illumination condition.

The foregoing is a brief description of the terms included in the embodiments of this application, and details are not described again below.

With popularization of electronic devices with a photographing function in life, it has become a daily way of behavior for people to use electronic devices to take photos.

When most electronic devices are performing photographing processing, to achieve better photographing picture quality, a multi-frame photographing algorithm is mostly used. However, usually, more frames are processed by using the algorithm, corresponding processing duration is longer. For example, when a quantity of processed images is 9 frames, duration from pressing by a user a photographing key displayed on a display interface of the electronic device to completing image processing for the user to view, namely, end-to-end duration of the algorithm, is about 2.5 s. When a quantity of processed images is greater than 9 frames, end-to-end duration of the algorithm is greater than 2.5 s.

However, when the electronic device performs photographing processing, the electronic device performs next photographing processing only after previous photographing processing ends. Based on a processing process of this single thread, if the user continuously triggers photographing commands for a plurality of times, and interval time of triggering photographing is less than the foregoing 2.5 s, the electronic device may be unable to respond in a timely manner due to relatively long photographing processing time of the photographing algorithm each time. Consequently, a quantity of photographing waiting in the background gradually increases. As a quantity of waiting photographing increases, to-be-processed data accumulated and stored in the background is also increasing more, and memory occupation is continuously expanded. When remaining memory is not enough to support photographing processing, the background no longer responds to a photographing command triggered by the user.

Consequently, regardless of how the user taps the photographing key, it is felt that the photographing key is unresponsive. In this case, the electronic device is equivalent to being unable to normally perform photographing, resulting in very poor experience for the user.

In view of this, an embodiment of this application provides a photographing method. In response to a first operation performed by the user on a first control, the electronic device collects a raw image once by using a camera, and then adaptively selects, for processing, algorithms with different processing duration by determining a value of a memory occupation amount and based on different values of memory occupation amounts. For example, when the memory occupation amount is relatively small, an algorithm with relatively long processing time is selected for processing, or when the memory occupation amount gradually increases, an algorithm with relatively short processing time is selected for processing. This can reduce pressure from a memory increment in the electronic device, improve photographing processing efficiency, respond to a photographing requirement of the user in a timely manner, and implement continuous and fast photographing.

The photographing method provided in this embodiment of this application may be applied to various electronic devices.

In some embodiments of this application, the electronic device may be various photographing apparatuses such as an action camera and a digital camera, a mobile phone, a tablet computer, a wearable device, an onboard device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or the like; or may be another device or apparatus that can perform image display. A specific type of the electronic device is not limited in the embodiments of this application.

The following uses an example in which the electronic device is a mobile phone for description. The mobile phone may include a display and one or more cameras. In a to-be-shot scene, the mobile phone performs photographing by using the one or more cameras, to obtain shot images with different features. The display is configured to display a processed shot image after photographing.

The to-be-shot scene is a scene expected by the user to be shot. If the user uses the camera of the electronic device to aim at a scene including an object, the scene including the object is a to-be-shot scene. It should be understood that the to-be-shot scene does not specifically refer to a specific scene, but is a scene that is aimed at in real time following a direction of the camera.

Figure 1B:
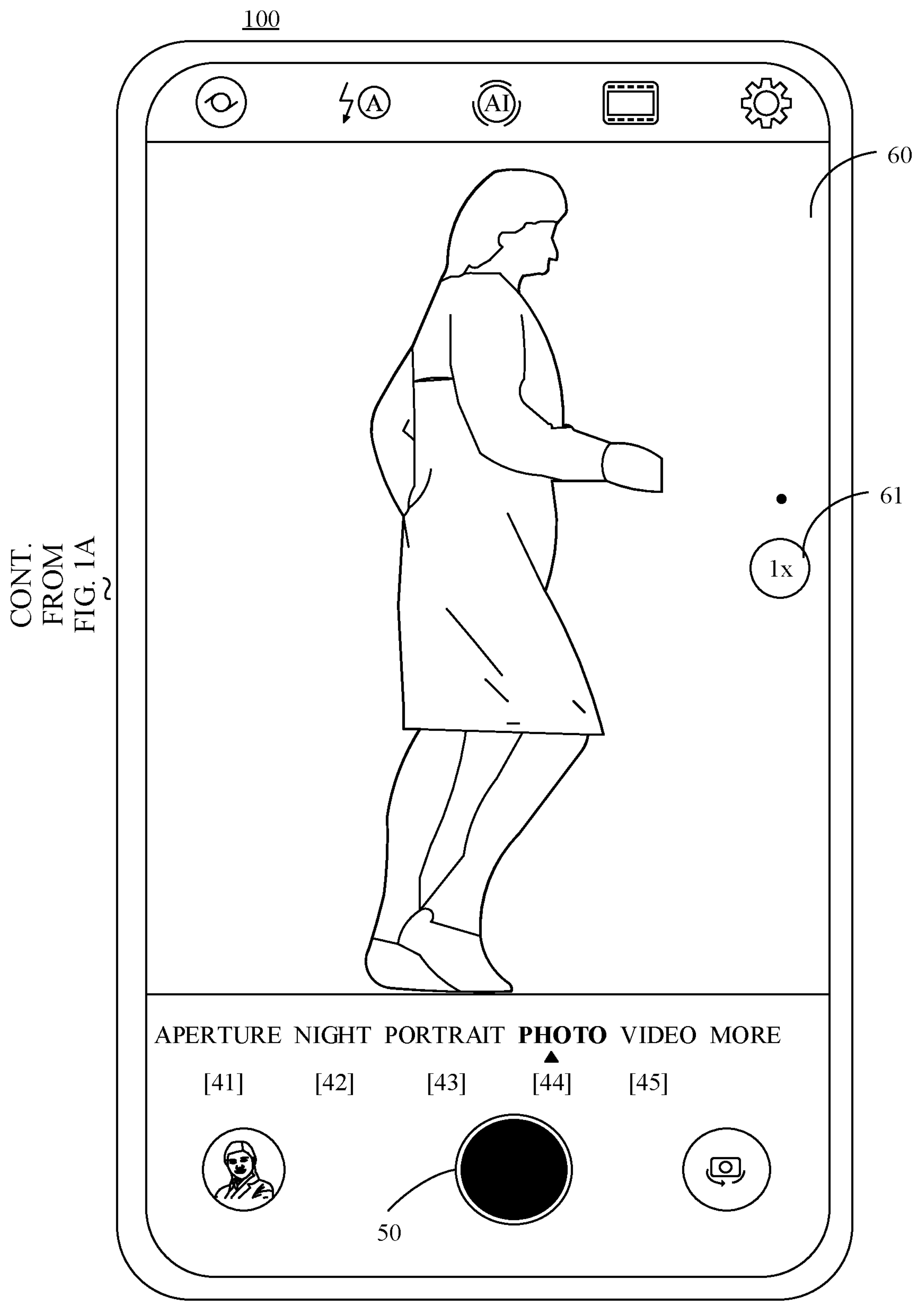

Based on this, an application scene provided in an embodiment of this application is described with reference to FIG. TA and FIG. 1B and FIG. 2A to FIG. 2D. FIG. TA and FIG. 1B are a schematic diagram of a scene applicable to an embodiment of this application. FIG. 2A to FIG. 2D are a schematic diagram of another scene applicable to an embodiment of this application.

Application Scene 1: Photographing Scene

As shown in FIG. TA, a camera application is installed on an electronic device 100. In addition, a plurality of applications are also installed. This is not limited in this embodiment of this application. For example, in response to a tap operation performed by the user on the camera application, when the electronic device 100 runs the camera application, the electronic device 100 displays a photographing interface shown in FIG. 1B.

The photographing interface includes a plurality of photographing modes of the camera application, for example, a wide aperture mode 41, a night mode 42, a portrait mode 43, a photo mode 44, and a video mode 45. The photographing interface further includes a first control, the first control is a photographing key 50, and the photographing key 50 is used to indicate a current photographing mode. For example, when a camera is enabled, the photographing key 50 indicates, by default, that the current photographing mode is the photo mode 44.

As shown in FIG. 1B, the photographing interface further includes a viewfinder window 60, and the viewfinder window 60 may be used to display, in real time, a preview image before photographing. The photographing interface further displays a second control, and the second control is a zoom option 61. The user may select a currently required zoom ratio in the zoom option 61, for example, a zoom ratio of 0.5 times, 2 times, or 50 times.

With reference to FIG. TA and FIG. 1B, when the user enables the camera, and the current photographing mode is the photo mode by default, after the user directs the camera on the mobile phone to the to-be-shot scene, the viewfinder window 60 may display, in real time, the preview image before photographing. Then, in response to a plurality of continuous times of tap operations performed by the user on the photographing key 50, the electronic device may invoke the photographing method provided in this application, and adaptively select, based on a memory size, different photographing algorithms for processing. This can reduce pressure from a memory increment, improve photographing processing efficiency, respond to a photographing requirement of the user in a timely manner, implement fast photographing, and avoid a case in which the background cannot respond to a photographing command in a related technology.

Application Scene 2: Scene Captured in Video Recording

Figure 2A:
FIG. 2A to FIG. 2D are a schematic diagram of another scene to which an embodiment of this application is applicable.
Figure 2B:
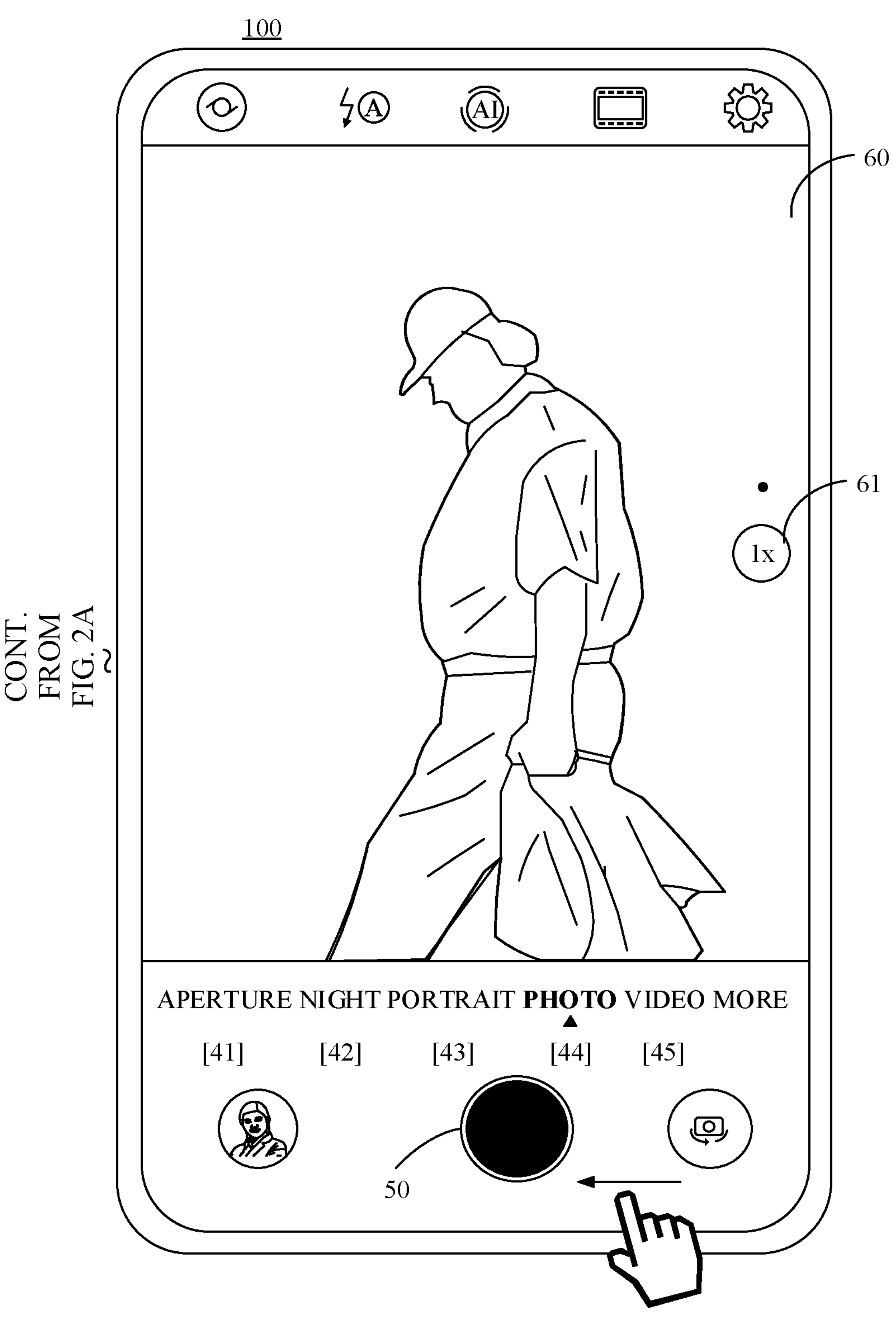

As shown in FIG. 2A, the camera application is installed on the electronic device 100. For example, in response to a tap operation performed by the user on the camera application, when the electronic device 100 runs the camera application, the electronic device displays a photographing interface shown in FIG. 2B.

Description of the photographing interface is the same as description of FIG. 1B. Details are not described herein again. When the camera is enabled, the photographing key 50 indicates, by default, that a current photographing mode is the photo mode 44. For example, the photographing mode may be switched from the photo mode 44 to the video mode 45 in response to a leftward sliding operation of the user.

Figure 2C:
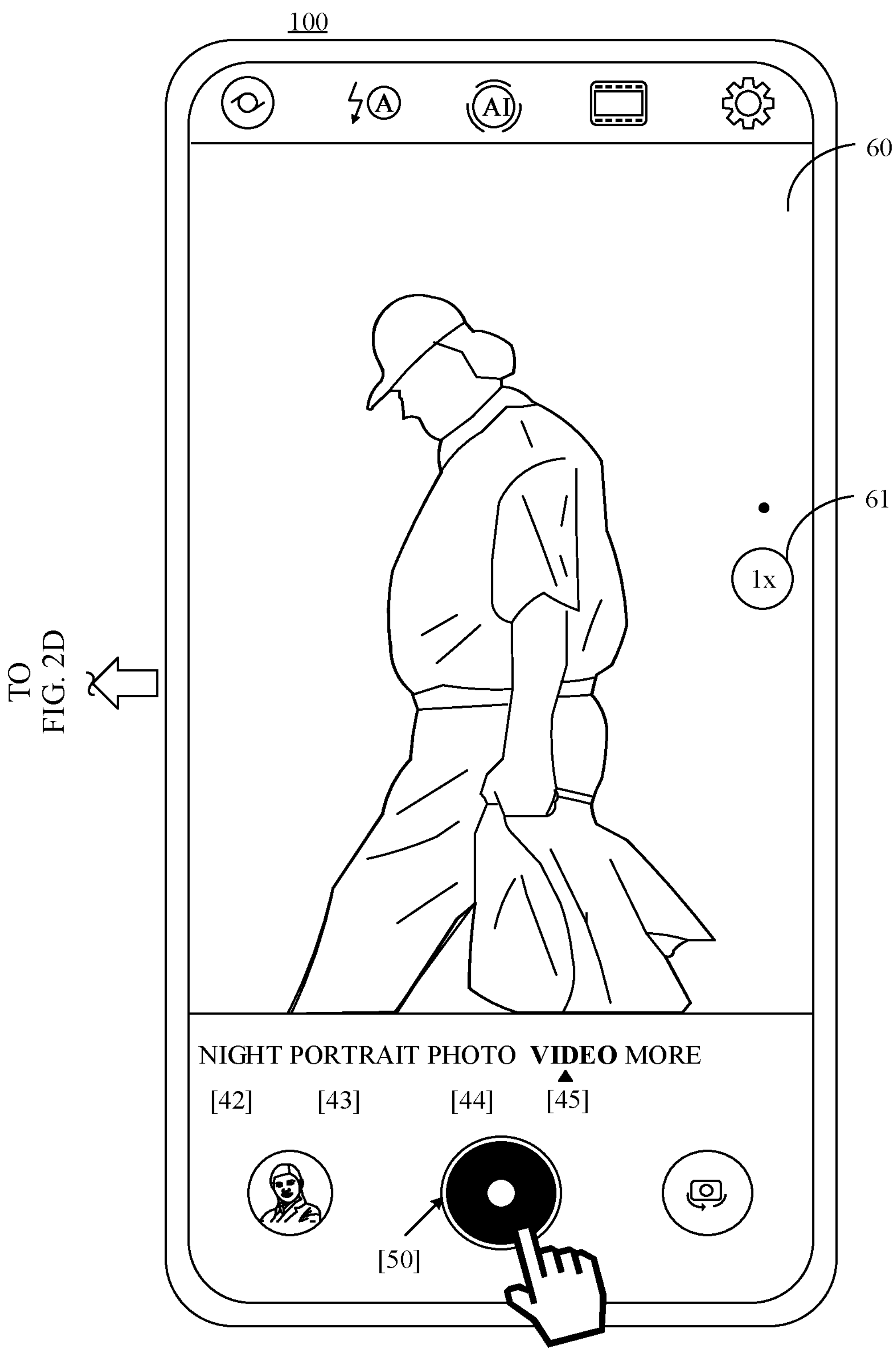

As shown in FIG. 2C, when the photographing mode is switched to the video mode 45, a viewfinder window 60 included in the photographing interface may be used to display, in real time, a preview image before video recording. For example, in response to a tap operation performed by the user on the photographing key 50, when the electronic device 100 starts video recording, the electronic device may display a video recording interface shown in FIG. 2D.

Figure 2D:
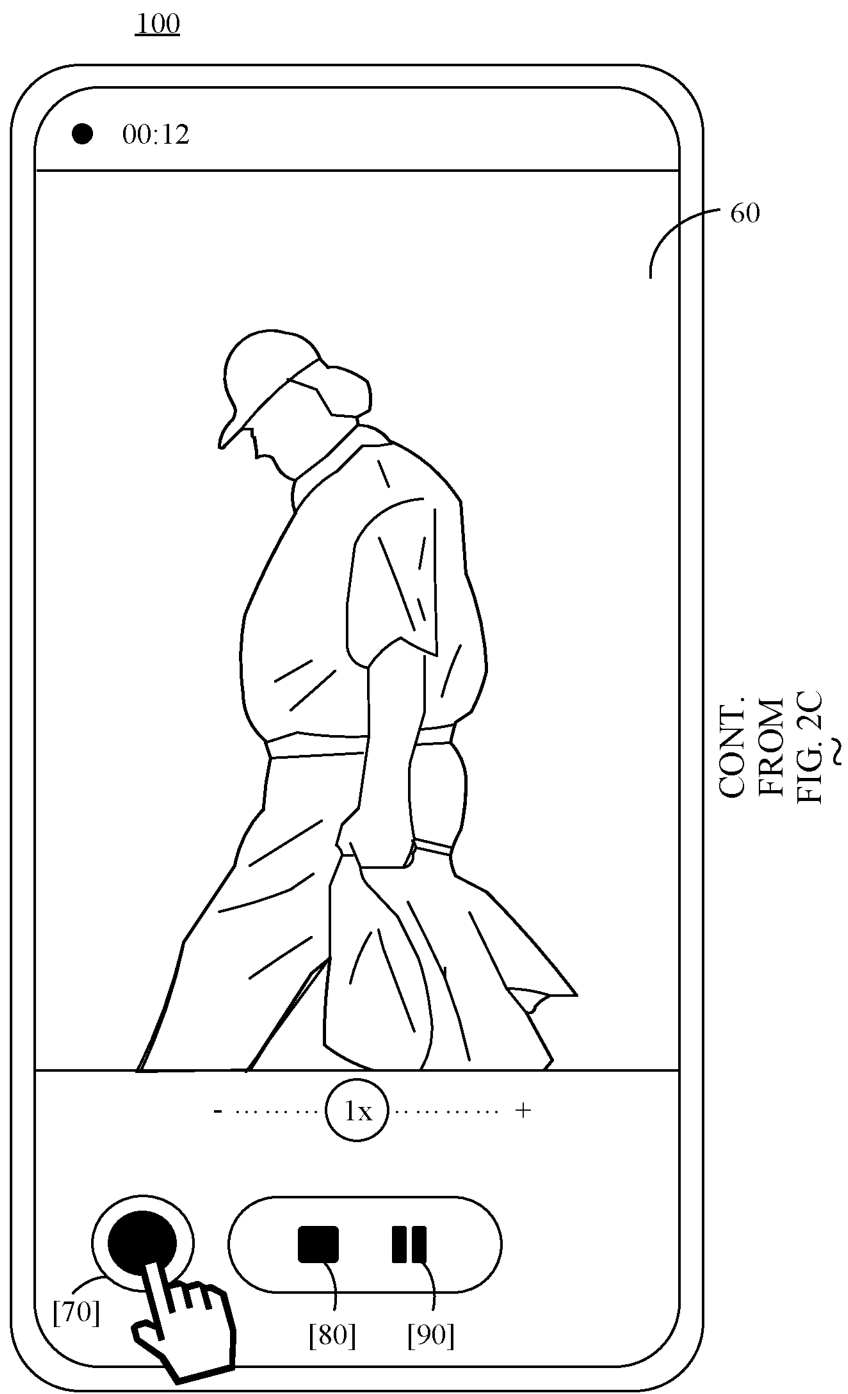

As shown in FIG. 2D, the video recording interface may display a currently shot video picture (for example, a man walking with a shopping bag shown in the figure), a photographing progress (for example, 00:12 shown in the figure), a status icon (for example, a photographing icon in front of the photographing progress shown in the figure is used to indicate that it is currently in a photographing state), and a third control, for example, a snapshot control 70. Certainly, the photographing interface may further include other controls, for example, a zoom option 61, an end control 80, and a pause/resume control 90. This is not limited in this embodiment of this application.

The pause/resume control 90 is configured to display a pause icon in a video shooting process (as shown in FIG. 2D), and is further configured to pause a current video shooting process when the pause icon is tapped and display the photographing icon when video shooting is paused. The current video shooting process continues when the user taps the photographing icon (not shown in FIG. 2A to FIG. 2D). The end control 80 is configured to end the current video shooting process. The snapshot control 70 is configured to capture a photo without pausing the current video shooting process and without ending the current video shooting process.

With reference to FIG. 2C and FIG. 2D, when the user wants to capture a picture of the man in a process of photographing the man walking with the shopping bag, the user may tap the snapshot control 70 in the photographing interface to obtain a captured photo. The captured photo is stored as an image in a gallery of the electronic device. If the user taps the snapshot control 70 in the video recording interface for a plurality of consecutive times, the electronic device may invoke the photographing method provided in this application, and adaptively select, based on a memory size, different photographing algorithms for processing. This can reduce pressure from a memory increment, improve snapshot processing efficiency, respond to a photographing requirement of the user in a timely manner, implement a fast snapshot, and avoid a case in which the background cannot respond to a photographing command in a related technology.

The foregoing provides two examples of description corresponding to the application scene, and does not limit the application scene of this application.

The following describes in detail the photographing method in the embodiments of this application with reference to FIG. 3 to FIG. 19A and FIG. 19B.

Figure 3:
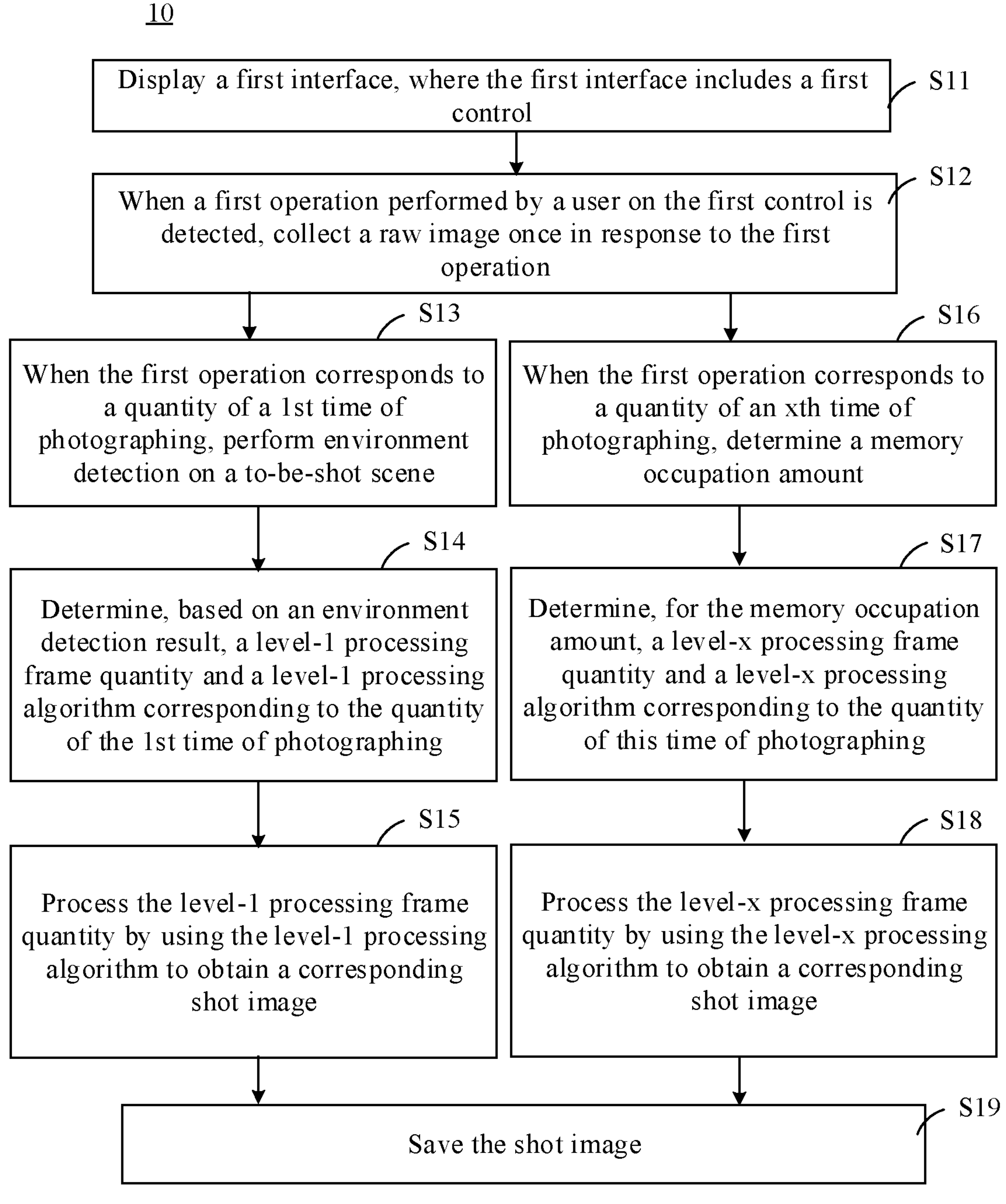
FIG. 3 is a schematic flowchart of a photographing method according to an embodiment of this application.

FIG. 3 is a schematic flowchart of a photographing method according to an embodiment of this application. The photographing method is applied to an electronic device including a camera, for example, a mobile phone. As shown in FIG. 3, the method may include the following S11 to S19.

S11: The electronic device displays a first interface, where the first interface includes a first control.

Optionally, as shown in FIG. 1B, the first interface may be the photographing interface, and the first control is configured to indicate the photographing key 50 in the photographing interface.

Optionally, as shown in FIG. 2D, the first interface may be the video recording interface, and the first control is configured to indicate the snapshot control 70 in the video recording interface.

Certainly, the first interface may alternatively be another interface, and the first control may correspondingly be a control that is in the another interface and that is configured to indicate photographing. This is not limited in this embodiment of this application.

S12: When detecting a first operation performed by a user on the first control, the electronic device collects a raw image once by using the camera in response to the first operation.

Optionally, the first operation may be a tap operation on the first control, or may be a voice indication operation or another operation that indicates the electronic device to perform photographing. This is not limited in this embodiment of this application.

The tap operation refers to a behavior of the user touching the first control at relatively short time and then leaving.

Figure 4A:
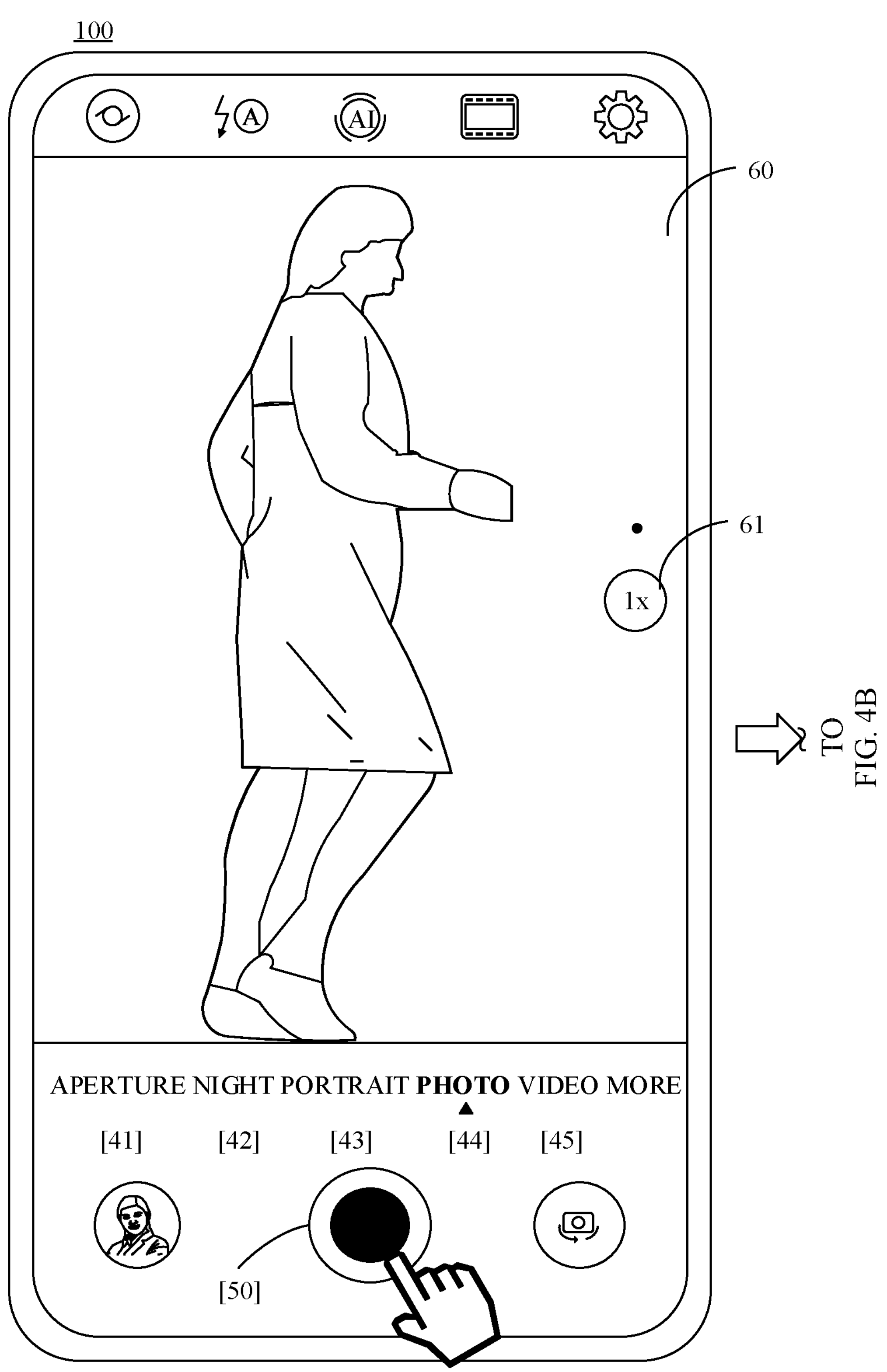
FIG. 4A and FIG. 4B are is a schematic diagram of an interface of a tap operation according to an embodiment of this application.
Figure 4B:
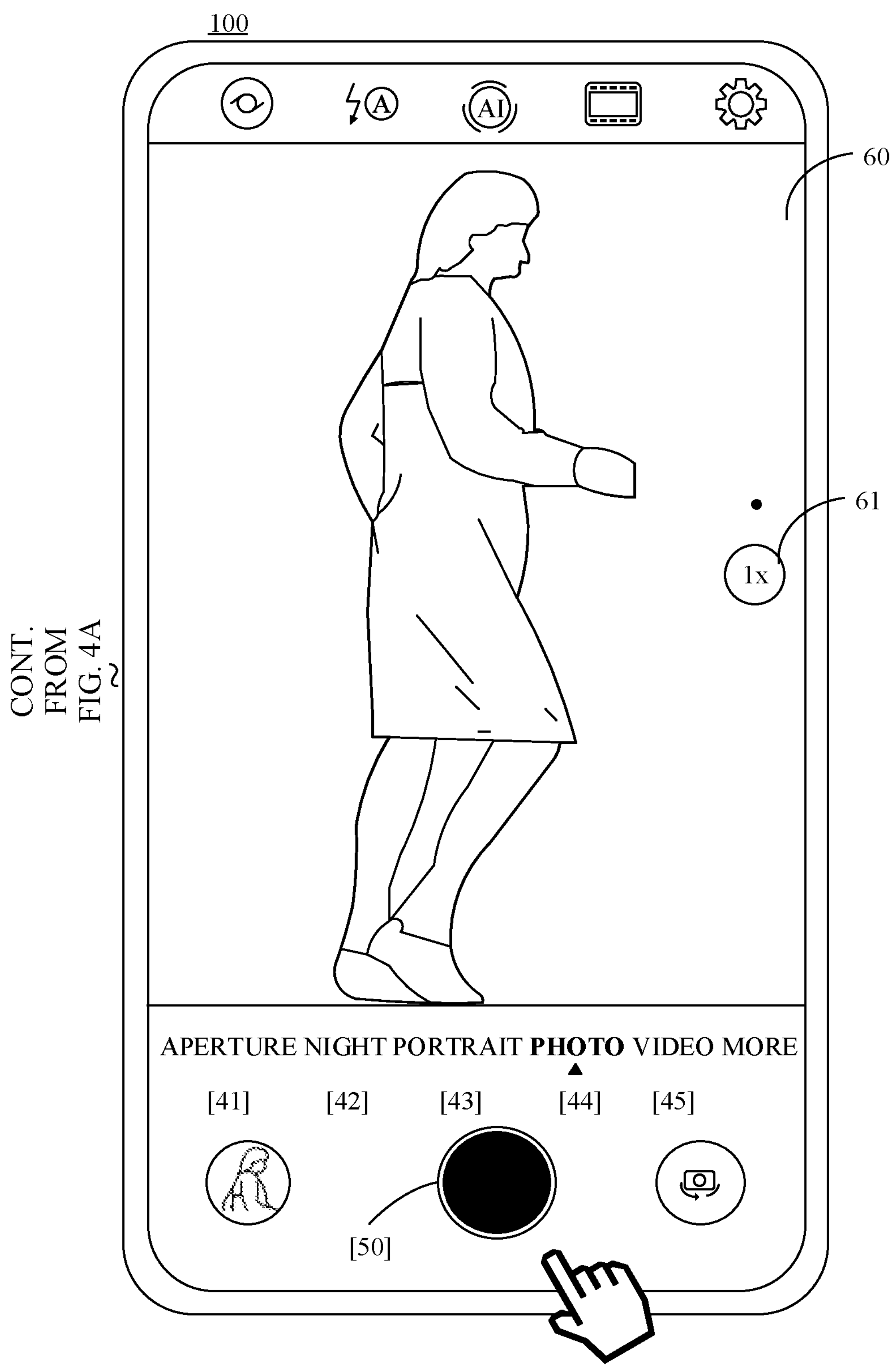

For example, FIG. 4A and FIG. 4B are a schematic diagram of an interface of a tap operation. As shown in FIG. 4A and FIG. 4B, a finger of the user pressing the photographing key 50 and then lifting is recorded as one tap operation, and time between pressing the photographing key 50 by the finger and lifting and leaving the photographing key 50 by the finger is duration of one tap operation. Usually, the duration is very short.

Figure 5:
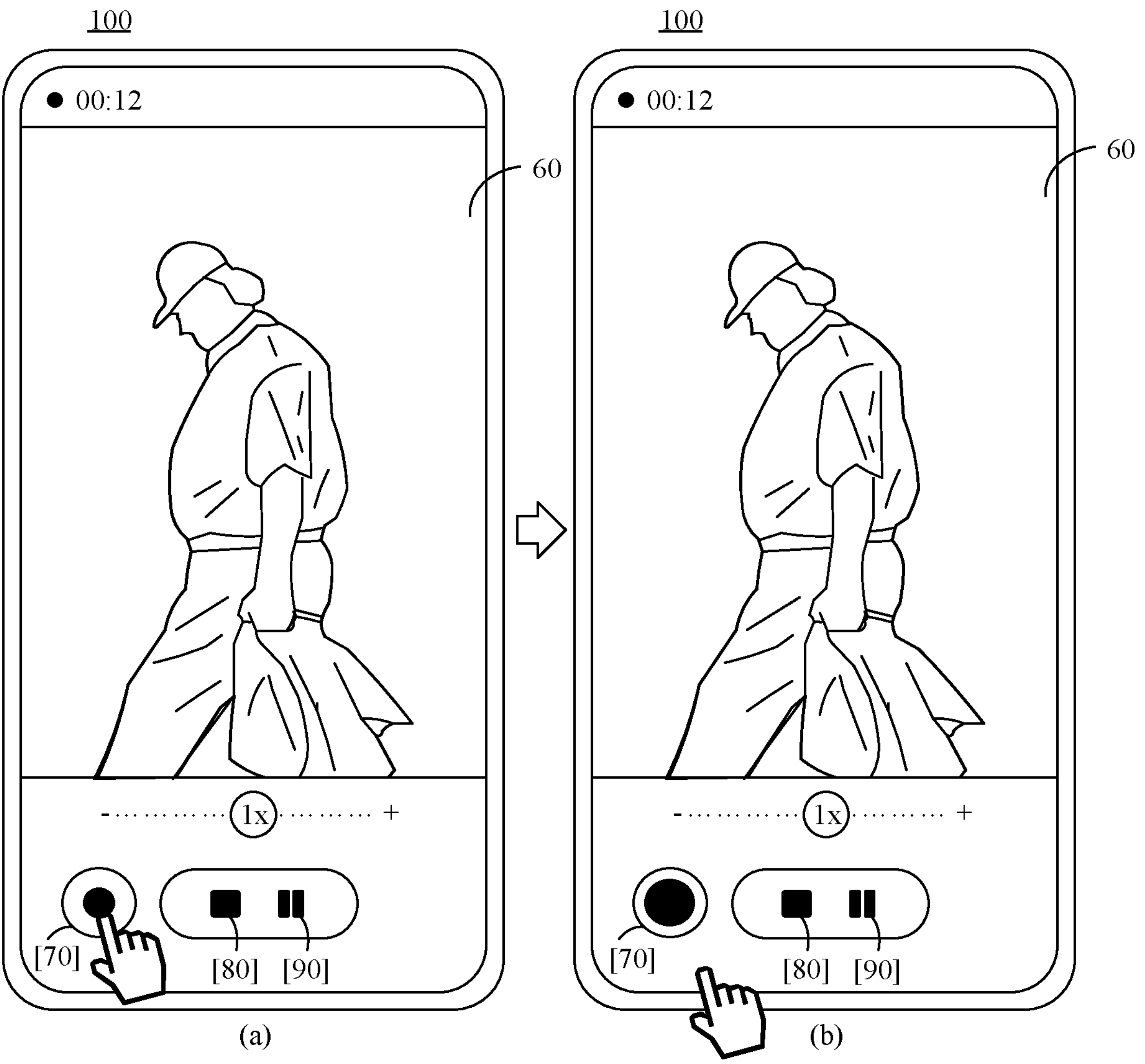
FIG. 5 is a schematic diagram of an interface of another tap operation according to an embodiment of this application.

For another example, FIG. 5 is a schematic diagram of an interface of another tap operation. As shown in (a) and (b) in FIG. 5, a finger of the user pressing the snapshot control 70 and then lifting is recorded as one tap operation, and time between pressing the snapshot control 70 by the finger and lifting and leaving the snapshot control 70 by the finger is duration of one tap operation.

With reference to FIG. 5, for example, when the camera is enabled to perform video recording, when the user performs one tap operation on the snapshot control 70, the electronic device collects a raw image once by using the camera in response to this time of tap operation.

When the user performs a plurality of times of tap operations on the snapshot control 70, the electronic device may collect raw images for a plurality of times by using the camera in response to the plurality of times of tap operations. It should be understood that, when the user performs the plurality of times of tap operations on the snapshot control 70, a 1st time of tap operation corresponds to a quantity of a 1st time of photographing, a 2nd time of tap operation corresponds to a quantity of a 2nd time of photographing, and a 3rd time of tap operation corresponds to a quantity of a 3rd time of photographing, and so on. Details are not described again in the following.

It should be noted herein that when the camera is re-enabled after being disabled, a quantity of photographing needs to be accumulated from 1 again. Alternatively, when interval duration between two adjacent times of tap operations exceeds first preset interval duration, and there is no data waiting for processing in the background, a quantity of photographing also needs to be accumulated from 1 again. The first preset interval duration is at least greater than processing duration of one time of photographing. Specific duration of the first preset interval duration may be set and modified as required. This is not limited in this embodiment of this application.

For example, after the user enables the camera for the first time and performs the 1st time of tap operation on the photographing key 50, the electronic device collects a raw image once by using the camera in response to this time of tap operation. A quantity of this time of photographing corresponds to the quantity of the 1st time of photographing. Then, the user disables and re-enables the camera, and performs another time of tap operation on the photographing key 50. The electronic device collects a raw image once again by using the camera in response to a current tap operation. In this case, because the camera is re-enabled, a quantity of this time of photographing should be re-recorded as the quantity of the 1st time of photographing.

Figure 6:
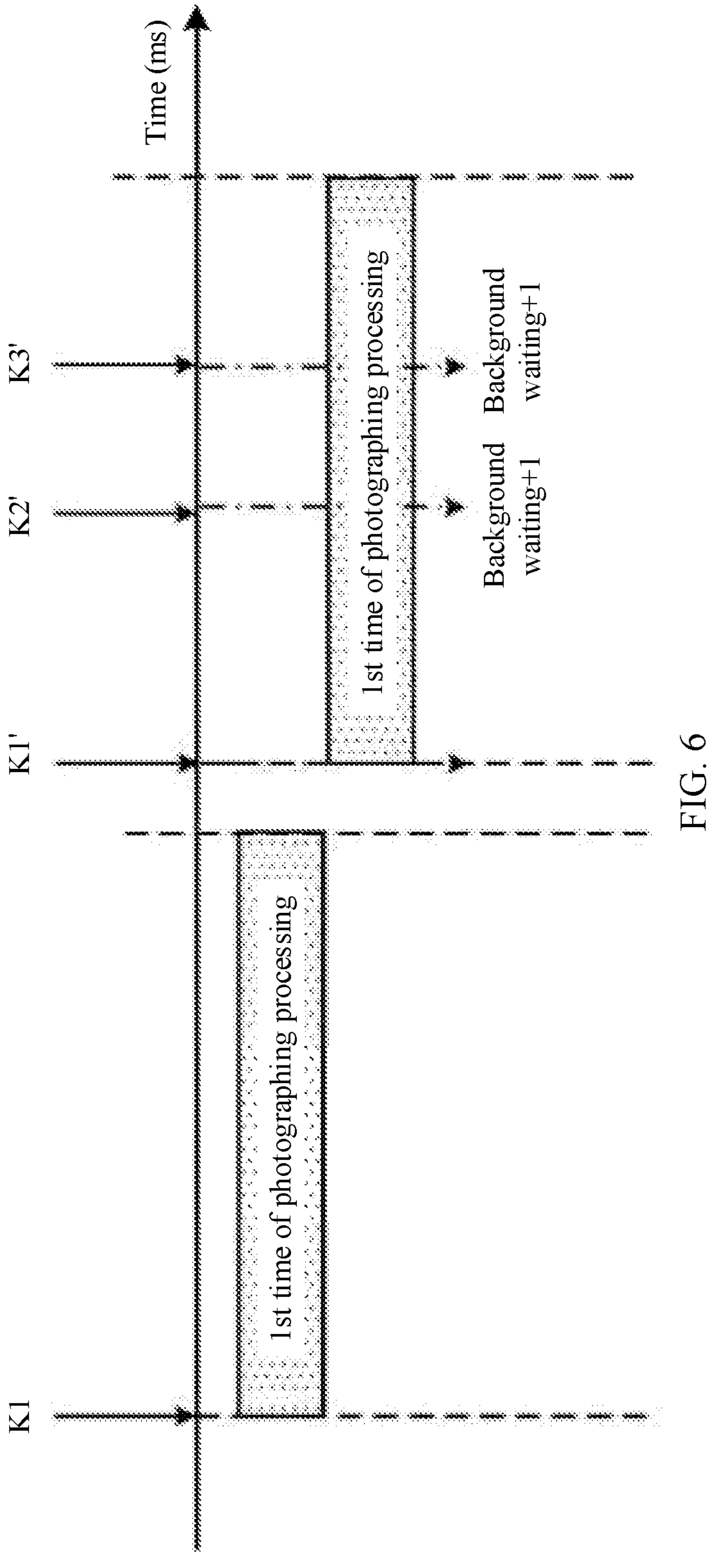
FIG. 6 is a schematic diagram of an image processing process according to an embodiment of this application.

For example, FIG. 6 is a schematic diagram of an image processing process.

As shown in FIG. 6, when the user enables a camera application and performs a 1st time of tap operation K1 on the photographing key 50, the electronic device collects a raw image once by using the camera in response to this time of tap operation K1. A quantity of this time of photographing may be recorded as the quantity of the 1st time of photographing. However, after relatively long time elapses, the user performs a next time of tap operation K1' on the photographing key 50. The electronic device collects a raw image once again by using the camera in response to the tap operation K1'. Because interval time between the tap operation K1 and the tap operation K1' exceeds the first preset interval duration, and there is no data waiting for processing in the background, a corresponding quantity of photographing needs to be accumulated from 1 again, that is, a quantity of this time of photographing is re-recorded as the quantity of the 1st time of photographing. When the user subsequently performs a tap operation K2' on the photographing key, the electronic device collects a raw image once again by using the camera in response to this time of tap operation K2'. Because interval time between the tap operation K2' and the tap operation K1' is less than the first preset interval duration, a quantity of this time of photographing may be recorded as the quantity of the 2nd time of photographing. When the user subsequently performs a tap operation K3' on the photographing key 50, the electronic device collects a raw image once again by using the camera in response to this time of tap operation K3'. Because interval time between the tap operation K3' and the tap operation K2' is less than the first preset interval duration, a quantity of this time of photographing may be recorded as the quantity of the 3rd time of photographing, and so on. Details are not described herein again.

It should be noted that, if interval duration between two adjacent times of tap operations exceeds the first preset interval duration, but there is data waiting for processing in the background, it indicates that the user performs many times of tap operations before. In this case, some data is not processed in time due to an excessively high tap frequency and relatively slow background processing. In this case, a quantity of photographing cannot be accumulated from 1 again, and an original recorded quantity should be maintained.

When the electronic device includes a plurality of cameras, in response to one tap operation, one or more cameras may be used to collect a raw image, and each camera may collect one or more frames of raw images. That is, one or more frames of raw images may be collected each time. A specific frame quantity may be set and modified as required. This is not limited in this embodiment of this application.

It should be further understood that the raw image may be an image located in a RAW domain. However, when the camera is a black and white camera, the raw image may be a gray image. When the camera is a multi-spectral camera, the raw image may be a multi-spectral image that includes a plurality of color channel signals. A format or a feature of the raw image changes with a change of the camera. This is not limited in this embodiment of this application.

In addition, the raw image collected once may further include at least one of a long-exposure raw image, a normal-exposure raw image, and a short-exposure raw image.

The long-exposure raw image is an image obtained after exposure of relatively long time during photographing. The short-exposure raw image is an image obtained after exposure of relatively short time during photographing. It should be understood that both "long" and "short" are relative to time of "normal" exposure. When exposure time corresponding to the normal-exposure raw image is different, long exposure and short exposure also change accordingly.

When the plurality of frames of raw images include the long-exposure raw image, and/or the normal-exposure raw image, and/or the short-exposure raw image, a frame quantity of long-exposure raw images, a frame quantity of normal-exposure raw images, and a frame quantity of short-exposure raw images may be selected and modified as required. This is not limited in this embodiment of this application.

S13: When the first operation corresponds to the quantity of the 1st time of photographing, perform environment detection on a to-be-shot scene.

The environment detection includes at least lightness (lightness value, LV) detection and dynamic range detection. Certainly, the environment detection may further include a detection item, which may be specifically set and modified as required. This is not limited in this embodiment of this application.

It should be understood that lightness detection refers to estimating ambient brightness in the to-be-shot scene. Lightness refers to a degree in which an object is illuminated, and specifically refers to energy of visible light accepted on an object in a unit area, which is referred to as lightness for short, and a unit is lux (Lux). A dark street, a dimly lit room, and the like are usually in low lightness. Relatively, a playground in sunlight, a stage under a spotlight, and the like may be referred to as being in medium and high lightness. If lightness of the to-be-shot scene is relatively low, when the to-be-shot scene is shot by using the electronic device, it may be blurry and an effect is relatively poor. If lightness of the to-be-shot scene is relatively high, when the to-be-shot scene is shot by using the electronic device, it is relatively clear and a photographing effect is good.

Herein, for example, a photoelectric sensor may be disposed in the electronic device, and the lightness of the to-be-shot scene is detected by using the photoelectric sensor. Alternatively, the lightness may be calculated based on exposure parameters of the camera, such as exposure time, photosensitivity, and an aperture, and a received response value by using the following formula:

$$LV = 10 \times \log_2\left(\frac{\text{Aperture}^2}{\text{Exposure}} \times \frac{100}{ISO} \times \frac{\text{Luma}}{46}\right),$$

Exposure is exposure time, Aperture is an aperture size, ISO is photosensitivity, and Luma is an average value of Y in XYZ color space.

When the exposure parameters are the same, a larger response value indicates that the lightness of the to-be-shot scene is higher, and therefore, a calculated value of the lightness is also larger.

It should be understood that the dynamic range (dynamic range) detection refers to detecting a dynamic range value of the to-be-shot scene. The dynamic range value is used to represent a brightness range of pixels in an image, namely, a level quantity of grayscale division from a "brightest" pixel to a "darkest" pixel in the image. A larger dynamic range value of an image indicates richer brightness levels, and a more realistic visual effect of the image. An expression of the dynamic range value may be:

$$\text{dynamic range} = 20\log_2\left(\frac{\text{bright}}{\text{dark}}\right),$$

where dynamic range refers to a dynamic range value, bright refers to brightness of a "brightest" pixel, and dark refers to brightness of a "darkest" pixel. A unit of the dynamic range is stop (stop).

Herein, based on a detected size of the dynamic range value, it may be determined whether the to-be-shot scene is a low dynamic range (low dynamic range, LDR) scene or a high dynamic range (high dynamic range, HDR) scene. The low dynamic scene is a scene in which ambient light intensity is all relatively low or all relatively high, and a dynamic range is relatively narrow. The high dynamic range scene is a scene in which one part of light intensity is relatively low, and the other part of light intensity is relatively high, and a dynamic range is relatively wide.

S14: Determine, based on an environment detection result, a level-1 processing frame quantity and a level-1 processing algorithm corresponding to the quantity of the 1st time of photographing.

Figure 7:
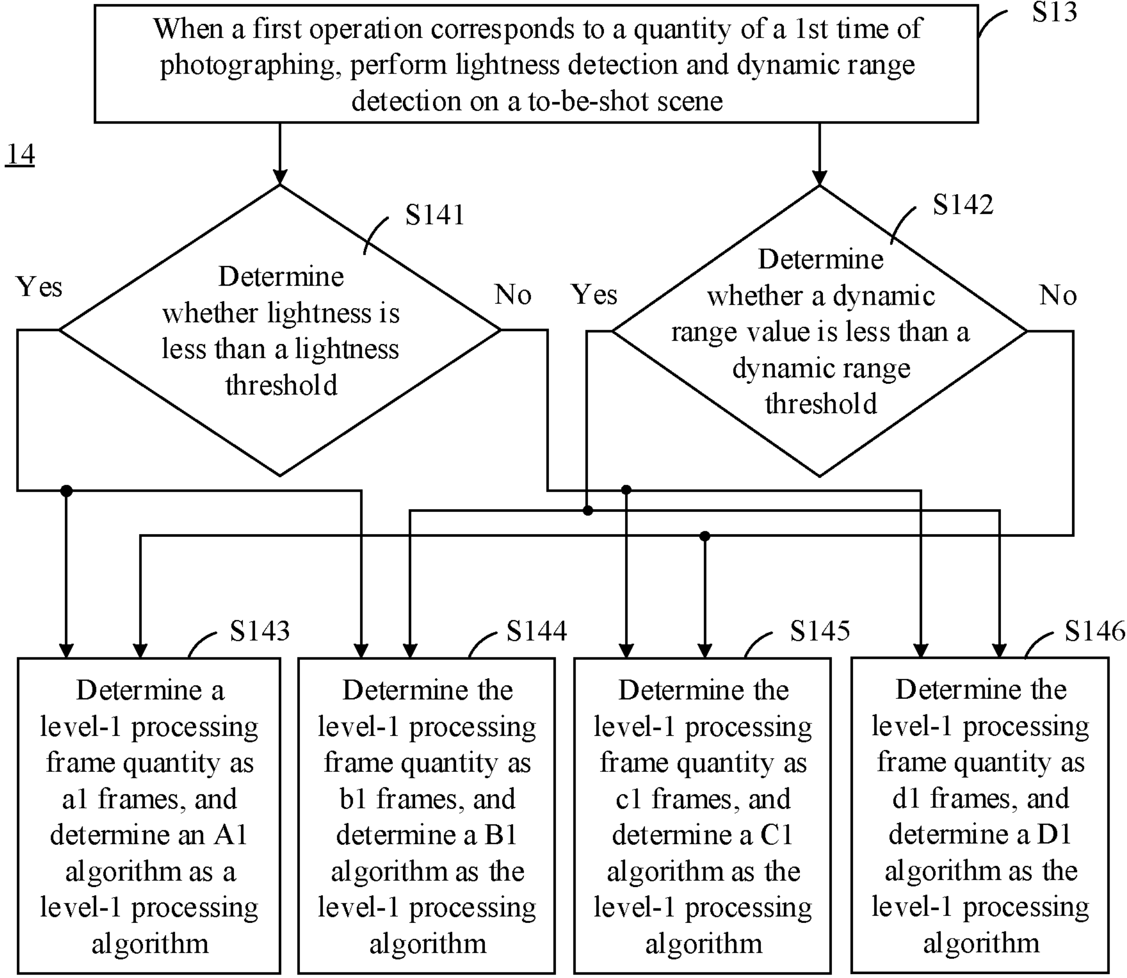
FIG. 7 is a schematic flowchart of environment detection according to an embodiment of this application.

With reference to the foregoing lightness detection method and the dynamic range detection method, FIG. 7 is a schematic flowchart of environment detection according to an embodiment of this application.

The foregoing S13 includes: when the first operation corresponds to the quantity of the 1st time of photographing, performing environment detection on a to-be-shot scene, where the environment detection includes the lightness detection. Therefore, correspondingly, the environment detection result includes detected lightness. Similarly, because the environment detection further includes the dynamic range detection, correspondingly, the environment detection result further includes a detected dynamic range value. For the lightness detection method and the dynamic range detection method, refer to the foregoing description. Details are not described herein again.

With reference to the detected lightness and the detected dynamic range value in the environment detection result, as shown in FIG. 7, the foregoing S14 may include the following S141 to S146.

S141: Determine whether the detected lightness is less than a lightness threshold.

The lightness threshold may be set and modified as required. This is not limited in this embodiment of this application.

S142: Determine whether the detected dynamic range value is less than a dynamic range threshold.

The dynamic range threshold may be set and modified as required. This is not limited in this embodiment of this application.

S143: As shown in FIG. 8, when the lightness is less than the lightness threshold and the dynamic range value is greater than or equal to the dynamic range threshold, or when the to-be-shot scene is a scene with low brightness and a high dynamic range, determine the level-1 processing frame quantity corresponding to the quantity of the 1st time of photographing as a1 frames, and determine an A1 algorithm as the level-1 processing algorithm, where a1 is all or a part of frames of raw images collected corresponding to the quantity of the 1st time of photographing.

S144: As shown in FIG. 8, when the lightness is less than the lightness threshold and the dynamic range value is less than the dynamic range threshold, or when the to-be-shot scene is a scene with low brightness and a low dynamic range, determine the level-1 processing frame quantity corresponding to the quantity of the 1st time of photographing as b1 frames, and determine a B1 algorithm as the level-1 processing algorithm, where b1 is all or a part of frames of raw images collected corresponding to the quantity of the 1st time of photographing.

S145: As shown in FIG. 8, when the lightness is greater than or equal to the lightness threshold and the dynamic range value is also greater than or equal to the dynamic range threshold, or when the to-be-shot scene is a scene with high brightness and a high dynamic range, determine the level-1 processing frame quantity corresponding to the quantity of the 1st time of photographing as c1 frames, and determine a C1 algorithm as the level-1 processing algorithm, where c1 is all or a part of frames of raw images collected corresponding to the quantity of the 1st time of photographing.

S146: As shown in FIG. 8, when the lightness is greater than or equal to the lightness threshold and the dynamic range value is less than the dynamic range threshold, or when the to-be-shot scene is a scene with high brightness and a low dynamic range, determine the level-1 processing frame quantity corresponding to the quantity of the 1st time of photographing as d1 frames, and determine a D1 algorithm as the level-1 processing algorithm, where d1 is all or a part of frames of raw images collected corresponding to the quantity of the 1st time of photographing.

It should be understood that A1, B1, C1, and D1 are used to refer to names of algorithms. The A1 algorithm, the B1 algorithm, the C1 algorithm, and the D1 algorithm may indicate a same algorithm, or may indicate different algorithms, which may be specifically set and modified as required. This is not limited in this embodiment of this application.

In addition, a1, b1, c1, and d1 are used to refer to a processing frame quantity, and a1, b1, c1, and d1 may indicate a same frame quantity, or may indicate different frame quantities. A specific frame quantity may be set and modified as required. This is not limited in this embodiment of this application.

The a1 frames, the b1 frames, the c1 frames, or the d1 frames may be selected from all the frames of the raw images based on a collection sequence for processing. Alternatively, the a1 frames, the b1 frames, the c1 frames, or the d1 frames may be randomly extracted from all the frames of the raw images for processing. Alternatively, images collected by one or more cameras selected in a manner of specifying the camera may be used as the a1 frames, the b1 frames, the c1 frames, or the d1 frames for processing. Certainly, a manner of selecting the a1 frames, the b1 frames, the c1 frames, or the d1 frames may be the same or different, and may be specifically set and modified as required. This is not limited in this embodiment of this application.

In addition, for the to-be-shot scene that is a scene with a high dynamic range, the determined a1 frames or c1 frames may include at least one of the long-exposure raw image, the normal-exposure raw image, and the short-exposure raw image, or may be additionally added with at least one of the long-exposure raw image, the normal-exposure raw image, and the short-exposure raw image, which may be specifically set and modified as required. This is not limited in this embodiment of this application.

It should be understood that, when processed raw images include the long-exposure raw image, the normal-exposure raw image, and the short-exposure raw image, a dynamic range of the image and an image detail may be adjusted, so that content presented by an obtained shot image is more real and image quality is relatively better.

It should be noted that a sequence of the foregoing S141 to S146 is only one example. When the environment detection is performed, the lightness detection may be first performed on the to-be-shot scene to determine whether the detected lightness is less than the lightness threshold, and then the dynamic range detection is performed on the to-be-shot scene to determine whether the detected dynamic range value is less than the dynamic range threshold. Alternatively, a sequence of the two may be exchanged. A specific execution process may be adjusted as required. In addition, another step may be added or some steps may be deleted on this basis. This is not limited in this embodiment of this application.

S15: As shown in FIG. 3, process the level-1 processing frame quantity by using the level-1 processing algorithm to obtain a corresponding shot image.

With reference to the example in the foregoing S14, when the lightness is less than the lightness threshold and the dynamic range value is greater than or equal to the dynamic range threshold, the a1 frames of the raw images collected corresponding to the quantity of the 1st time of photographing are processed by using the determined A1 algorithm, to obtain a corresponding shot image.

When the lightness is less than the lightness threshold and the dynamic range is less than the dynamic range threshold, the b1 frames of the raw images collected corresponding to the quantity of the 1st time of photographing are processed by using the determined B1 algorithm, to obtain a corresponding shot image.

When the lightness is greater than or equal to the lightness threshold and the dynamic range value is greater than or equal to the dynamic range threshold, the c1 frames of the raw images collected corresponding to the quantity of the 1st time of photographing are processed by using the determined C1 algorithm, to obtain a corresponding shot image.

When the lightness is greater than or equal to the lightness threshold and the dynamic range is less than the dynamic range threshold, the d1 frames of the raw images collected corresponding to the quantity of the 1st time of photographing are processed by using the determined D1 algorithm, to obtain a corresponding shot image.

For example, when the first operation is the quantity of the 1st time of photographing, the raw image is correspondingly collected once, and a total of 9 frames of raw images are collected this time. When the lightness is less than the lightness threshold and the dynamic range value is greater than or equal to the dynamic range threshold, 6 frames (in this case, a1=6) in the 9 frames may be processed by using the determined A1 algorithm to obtain a corresponding shot image.

When the lightness is less than the lightness threshold and the dynamic range is less than the dynamic range threshold, 5 frames (in this case, b1=5) in the 9 frames may be processed by using the determined B1 algorithm to obtain a corresponding shot image.

When the lightness is greater than or equal to the lightness threshold and the dynamic range value is also greater than or equal to the dynamic range threshold, 4 frames (in this case, c1=4) in the 9 frames may be processed by using the determined C1 algorithm to obtain a corresponding shot image.

When the lightness is greater than or equal to the lightness threshold and the dynamic range is less than the dynamic range threshold, 3 frames (in this case, d1=3) in the 9 frames may be processed by using the determined D1 algorithm to obtain a corresponding shot image.

It should be understood that in this application, different scenes may be determined by performing the environment detection on the to-be-shot scene. Then, different algorithms are selected based on different subdivided scenes, and different frame quantities are selected from a correspondingly collected raw image for processing, so that quality and an effect of the shot image obtained corresponding to the quantity of the 1st time of photographing in each scene can be adaptively improved.

S16: When the first operation corresponds to a quantity of an xth time of photographing, determine a memory occupation amount, where x is an integer greater than 1.

It should be understood that the memory occupation amount is an amount of stored data in a memory. Because, each time the camera collects a raw image or obtains a frame of shot image, some memory occupation increases, that is, the memory occupation amount relatively increases.

Therefore, as a quantity of photographing gradually increases, the memory occupation amount becomes increasingly large. In this case, when increasing of the memory occupation amount reaches some extent, a case in which a photographing command fails to be responded in a related technology may occur. To avoid this case, the memory occupation amount is monitored in real time in this application. Different processing algorithms and/or different processing frame quantities may be set for different memory occupation amounts, to reduce pressure from a memory increment. The memory occupation amount may be obtained by obtaining data inside the electronic device.

S17: Determine, for the memory occupation amount, a level-x processing frame quantity and a level-x processing algorithm corresponding to the quantity of this time of photographing.

The level-x processing algorithm is used to refer to an algorithm used in processing corresponding to the quantity of the xth time of photographing. The level-x processing frame quantity is used to refer to a frame quantity of a raw image used in processing corresponding to the quantity of the xth time of photographing. For example, when x=2, the quantity of the 2nd time of photographing corresponds to a level-2 processing frame quantity and a level-2 processing algorithm. When x=3, the quantity of the 3rd time of photographing corresponds to a level-3 processing frame quantity and a level-3 processing algorithm. A subsequent processing frame quantity and a name of a subsequent processing algorithm are deduced by analogy. Details are not described herein again.

Figure 9:
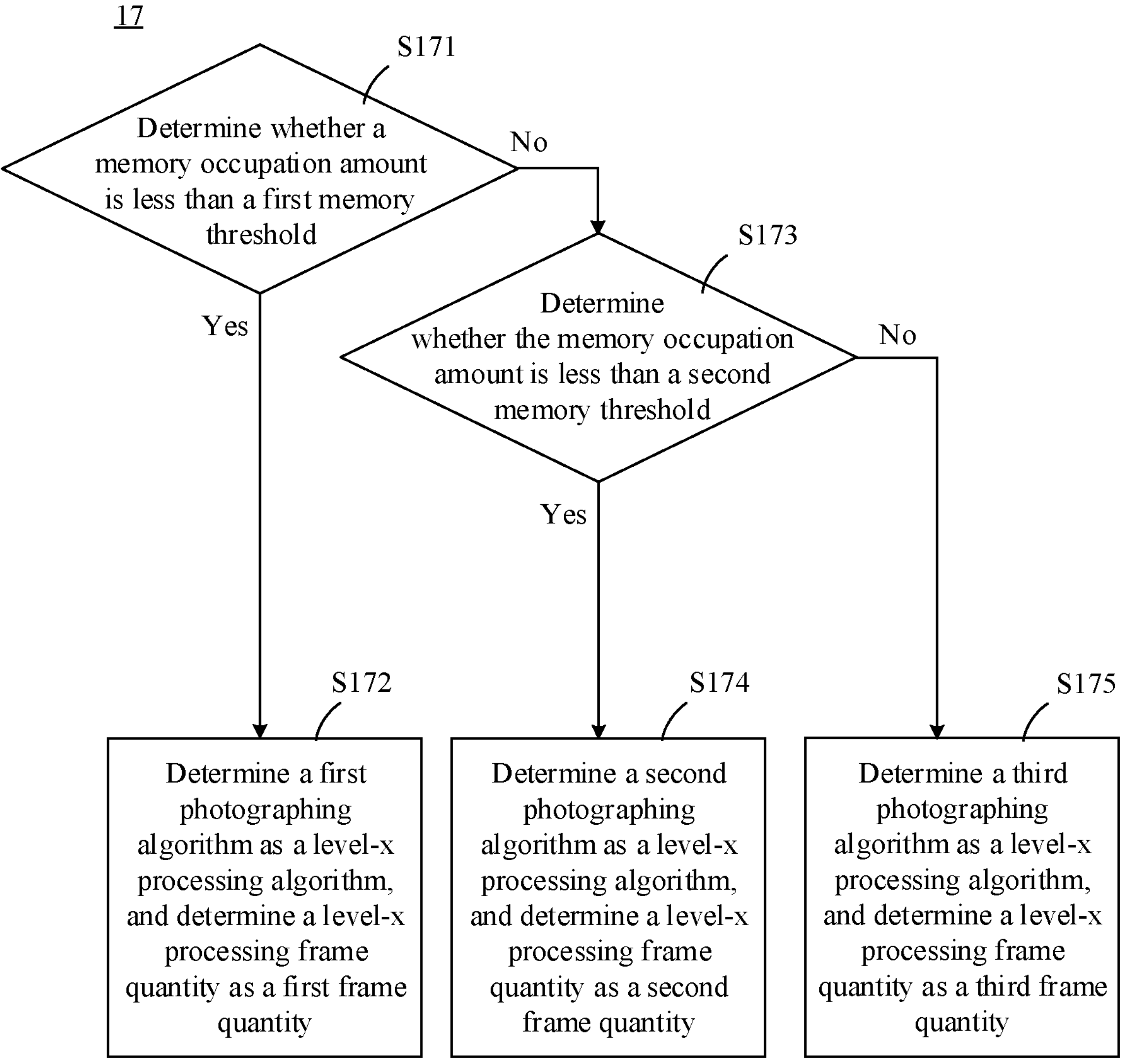
FIG. 9 is a schematic flowchart of determining a corresponding frame quantity and algorithm based on a memory occupation amount according to an embodiment of this application.

For example, FIG. 9 is a schematic flowchart of determining a corresponding processing frame quantity and a processing algorithm based on a memory occupation amount.

As shown in FIG. 9, the foregoing S17 may include the following S171 to S175.

S171: Determine, for the quantity of the xth time of photographing, whether the memory occupation amount is less than a first memory threshold.

S172: When the memory occupation amount is less than the first memory threshold, determine the level-x processing algorithm as a first photographing algorithm, and determine the level-x processing frame quantity as a first frame quantity.

The first frame quantity refers to all or a part of frames of raw images collected corresponding to the quantity of the xth time of photographing.

S173: When the memory occupation amount is greater than or equal to the first memory threshold, continue to determine whether the memory occupation amount is less than a second memory threshold.

S174: When the memory occupation amount is less than the second memory threshold, determine the level-x processing algorithm as a second photographing algorithm, and determine the level-x processing frame quantity as a second frame quantity.

The second frame quantity refers to all or a part of frames of raw images collected corresponding to the quantity of the xth time of photographing.

S175: When the memory occupation amount is greater than or equal to the second memory threshold, determine the level-x processing algorithm as a third photographing algorithm, and determine the level-x processing frame quantity as a third frame quantity.

The third frame quantity refers to all or a part of frames of raw images collected corresponding to the quantity of the xth time of photographing.

It should be understood that the first memory threshold is less than the second memory threshold, and the second memory threshold is less than a total memory amount. Herein, values of the first memory threshold and the second memory threshold may be set and modified as required. This is not limited in this embodiment of this application.

It should be understood that the first photographing algorithm, the second photographing algorithm, and the third photographing algorithm may be the same or different.

In an example, when the first photographing algorithm, the second photographing algorithm, and the third photographing algorithm are the same, the first frame quantity, the second frame quantity, and the third frame quantity gradually decrease.

In another example, when the first photographing algorithm, the second photographing algorithm, and the third photographing algorithm are different, processing duration of the first photographing algorithm, the second photographing algorithm, and the third photographing algorithm gradually decreases. In this case, values of the first frame quantity, the second frame quantity, and the third frame quantity may be the same or gradually decrease.

In the foregoing two cases, a decrease amount of the second frame quantity relative to the first frame quantity may be the same as or different from a decrease amount of the third frame quantity relative to the second frame quantity, which may be specifically set and modified as required. This is not limited in this embodiment of this application.

In the foregoing second case, processing steps included in the first photographing algorithm, the second photographing algorithm, and the third photographing algorithm gradually decrease, or complexity of the included processing steps gradually decreases, so that processing duration gradually decreases. Decreased processing duration of the second photographing algorithm relative to the first photographing algorithm may be the same as or different from decreased processing duration of the third photographing algorithm relative to the second photographing algorithm, which may be specifically set and modified as required. This is not limited in this embodiment of this application.

In this application, the first frame quantity, the second frame quantity, or the third frame quantity may be selected, in a collection sequence for processing, from all frames of raw images collected for a quantity of corresponding photographing. Alternatively, the first frame quantity, the second frame quantity, or the third frame quantity may be randomly extracted from all the frames of the raw images for processing. Alternatively, images collected by one or more cameras selected in a manner of specifying the camera may be used as the first frame quantity, the second frame quantity, or the third frame quantity for processing. Certainly, a manner of selecting the first frame quantity, the second frame quantity, or the third frame quantity may be the same or different, and may be specifically set and modified as required. This is not limited in this embodiment of this application.

In addition, selected raw images of the first frame quantity may include at least one of a long-exposure raw image, a normal-exposure raw image, and a short-exposure raw image. Selected raw images of the second frame quantity may include at least one of a long-exposure raw image, a normal-exposure raw image, and a short-exposure raw image. Similarly, selected raw images of the third frame quantity may also include a long-exposure raw image, a normal-exposure raw image, and a short-exposure raw image. Regardless of whether the first frame quantity, the second frame quantity, and the third frame quantity are the same, quantities of long-exposure raw images and short-exposure raw images included in each of the first frame quantity, the second frame quantity, and the third frame quantity may gradually decrease. In this way, when the memory occupation amount increases, maintenance of a dynamic range is discarded, to ensure a fast photographing requirement of the user as far as possible.

It should be understood that in the foregoing S171 to S175, only two memory thresholds are set, which are respectively the first memory threshold and the second memory threshold. By using the two memory thresholds, a memory size may be divided into three interval ranges. When the memory occupation amount meets one of the intervals, correspondingly, processing is performed by using an algorithm and a frame quantity corresponding to the interval range, to obtain a corresponding shot image. In addition, one memory threshold may be set, and the memory size is divided into two interval ranges. Alternatively, three, four, or more memory thresholds may be set, and the memory size is subdivided into a plurality of interval ranges, which may be specifically set and modified as required. This is not limited in this embodiment of this application.

Herein, the level-x processing frame quantity corresponding to the quantity of the xth time of photographing may be the same as the processing frame quantity corresponding to the quantity of the 1st time of photographing, or may be less than the processing frame quantity corresponding to the quantity of the 1st time of photographing. The level-x processing algorithm corresponding to the quantity of the xth time of photographing may be the same as the level-1 processing algorithm corresponding to the quantity of the 1st time of photographing, or may be with shorter processing duration than the level-1 processing algorithm corresponding to the quantity of the 1st time of photographing, which may be specifically set and modified as required. This is not limited in this embodiment of this application.

When the first photographing algorithm, the second photographing algorithm, and the third photographing algorithm are the same, the first photographing algorithm, the second photographing algorithm, and the third photographing algorithm may be the same as the level-1 processing algorithm, or may be with shorter processing duration than the level-1 processing algorithm. In this case, the first frame quantity, the second frame quantity, and the third frame quantity gradually decrease, and the first frame quantity may be the same as the level-1 processing frame quantity or less than the level-1 processing frame quantity. In this case, the second frame quantity and the third frame quantity each are less than the level-1 processing frame quantity.

When processing duration of the first photographing algorithm, the second photographing algorithm, and the third photographing algorithm gradually decreases, the first photographing algorithm may be the same as the level-1 processing algorithm corresponding to the quantity of the 1st time of photographing, or the first photographing algorithm is with shorter processing duration than the level-1 processing algorithm corresponding to the quantity of the 1st time of photographing. In this case, the second photographing algorithm and the third photographing algorithm each are with shorter processing duration than the level-1 processing algorithm. In this case, when the first frame quantity, the second frame quantity, and the third frame quantity are the same, the first frame quantity, the second frame quantity, and the third frame quantity are the same as or less than the level-1 processing frame quantity. When the first frame quantity, the second frame quantity, and the third frame quantity gradually decrease, and the first frame quantity is the same as or less than the level-1 processing frame quantity, the second frame quantity and the third frame quantity each are less than the level-1 processing frame quantity.

S18: Process the level-x processing frame quantity by using the level-x processing algorithm to obtain a corresponding shot image.

Figure 10:
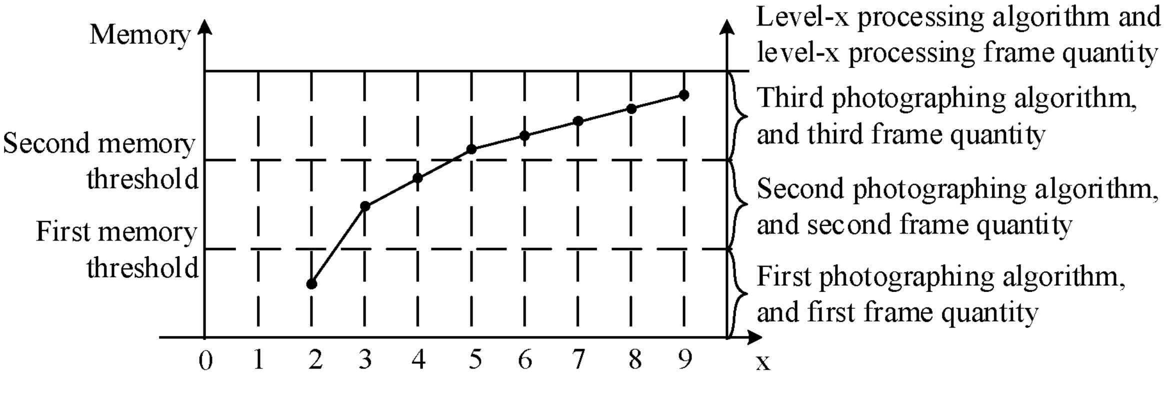
FIG. 10 is a schematic diagram of an increase of a memory occupation amount according to an embodiment of this application.

FIG. 10 is a schematic diagram of an increase of a memory occupation amount.

As shown in FIG. 10, with reference to the example in the foregoing S17, when x=2, a memory occupation amount corresponding to the quantity of the 2nd time of photographing is determined. If the memory occupation amount corresponding to the quantity of the 2nd time of photographing is less than the first memory threshold, the level-2 processing algorithm is determined as the first photographing algorithm, and the level-2 processing frame quantity is determined as the first frame quantity.

When x=3, a memory occupation amount corresponding to the quantity of the 3rd time of photographing is determined. If the memory occupation amount corresponding to the quantity of the 3rd time of photographing is greater than the first memory threshold but less than the second memory threshold, the level-3 processing algorithm is determined as the second photographing algorithm, and the level-3 processing frame quantity is determined as the second frame quantity.

When x=4, a memory occupation amount corresponding to a quantity of a 4th time of photographing is determined. If the memory occupation amount corresponding to the quantity of the 4th time of photographing is greater than the first memory threshold but less than the second memory threshold, a level-4 processing algorithm is determined as the second photographing algorithm, and a level-4 processing frame quantity is determined as the second frame quantity. In this case, processing of the quantity of the 4th time of photographing is equivalent to processing of the quantity of the 3rd time of photographing.

When x=5, a memory occupation amount corresponding to a quantity of a 5th time of photographing is determined. If the memory occupation amount corresponding to the quantity of the 5th time of photographing is greater than the second memory threshold, a level-5 processing algorithm is determined as the third photographing algorithm, and a level-5 processing frame quantity is determined as the third frame quantity. The following is deduced by analogy. Details are not described herein again.

It should be understood that, based on dividing the memory size into the plurality of interval ranges, when there is a larger memory occupation amount and a higher interval range is better met, a processing frame quantity gradually decreases if processing algorithms are the same; or processing duration of a processing algorithm decreases if processing frame quantities are the same; or both the processing duration of the processing algorithm and the processing frame quantity decrease. In this case, an increase speed of the memory occupation amount slows down rapidly, reducing pressure from a memory increment in the electronic device.

In this way, in comparison with the conventional technology in which each time of photographing is processed in a manner of a single processing algorithm and a single processing frame quantity, or a memory occupation amount increases at a fixed speed, in this application, the processing algorithm and the processing frame quantity can be adjusted in a timely manner based on the memory occupation amount, and when memory is larger, an increase speed of the memory occupation amount slows down and levels off, so that the electronic device can implement more times of photographing in a same memory size condition.

It should be further understood that a memory amount corresponding to the quantity of the 1st time of photographing is not shown in FIG. 10. In this case, the raw image collected for the quantity of the 1st time of photographing is processed based on the foregoing environment detection result. A processing method based on a result of the memory occupation amount is applicable to the quantity of the 2nd time of photographing and a quantity of subsequent photographing. Certainly, for the quantity of the 1st time of photographing, a method same as that of the quantity of the 2nd time of photographing and the quantity of subsequent photographing may alternatively be selected for processing. This is not limited in this embodiment of this application.

For example, x is 1, and a memory occupation amount corresponding to the quantity of the 1st time of photographing is determined. When the memory occupation amount is less than the first memory threshold, the level-1 processing algorithm is determined as the first photographing algorithm, and the level-1 processing frame quantity is determined as the first frame quantity. When the memory occupation amount is greater than or equal to the first memory threshold but less than the second memory threshold, the level-1 processing algorithm is determined as the second photographing algorithm, and the level-1 processing frame quantity is determined as the second frame quantity. When the memory occupation amount is greater than the second memory threshold, the level-1 processing algorithm is determined as the third photographing algorithm, and the level-1 processing frame quantity is determined as the third frame quantity. Then, the level-1 processing frame quantity is processed by using the determined level-1 processing algorithm to obtain a corresponding shot image.

S19: Save the shot image.

The shot image may be stored in a gallery or displayed.

With reference to the foregoing procedure, one frame of shot image may be obtained in response to one tap operation, and a plurality of frames of shot images may be obtained in response to a plurality of times of tap operations. A specific quantity of shot images is related to a quantity of user operations. This is not limited in this embodiment of this application.

This embodiment of this application provides the photographing method. When responding to the first operation performed by the user on the first control, the electronic device collects the raw image once by using the camera. When the first operation corresponds to the quantity of the 1st time of photographing, the environment detection is performed on the to-be-shot scene. Then, the level-1 processing frame quantity and the level-1 processing algorithm corresponding to the quantity of the 1st time of photographing are determined based on the environment detection result. When the first operation corresponds to the quantity of the 2nd time of photographing and a quantity of another subsequent time of photographing, the memory occupation amount is first detected, and a determined value of the memory occupation amount is compared with a preset memory threshold. Then, different processing frame quantities and different processing algorithms are selected based on different values of memory occupation amounts.

When processing is performed for the quantity of the 1st time of photographing, the scene is subdivided based on the environment detection result, and the different algorithms and the different frame quantities are selected based on the different scenes, so that quality and an effect of the shot image obtained corresponding to the quantity of the 1st time of photographing in each scene can be adaptively improved.

When processing is performed for the quantity of the 2nd time of photographing and another subsequent quantity, because subdivision is performed for the memory occupation amount, the different algorithms and the different frame quantities are selected based on different memory occupation amounts. When the memory occupation amount is larger, an algorithm with shorter processing duration is selected and/or the processing frame quantity decreases, thereby reducing pressure from a memory increment, improving processing efficiency, and implementing a fast photographing requirement.

Because very high heat is further generated gradually when the electronic device performs photographing and other work, a device temperature of the electronic device gradually increases. If fast photographing is continuously performed, the device temperature may be likely to rise exponentially. In this case, the electronic device cannot run normally in a case of overheating, and the case in which the photographing command fails to be responded may also occur.

In this case, in an embodiment of this application, before collected data is processed, the device temperature of the electronic device may be first detected. For an overheating case, a processing algorithm and a processing frame quantity are switched, to reduce workload and reduce pressure from a heat increment.

Figure 11:
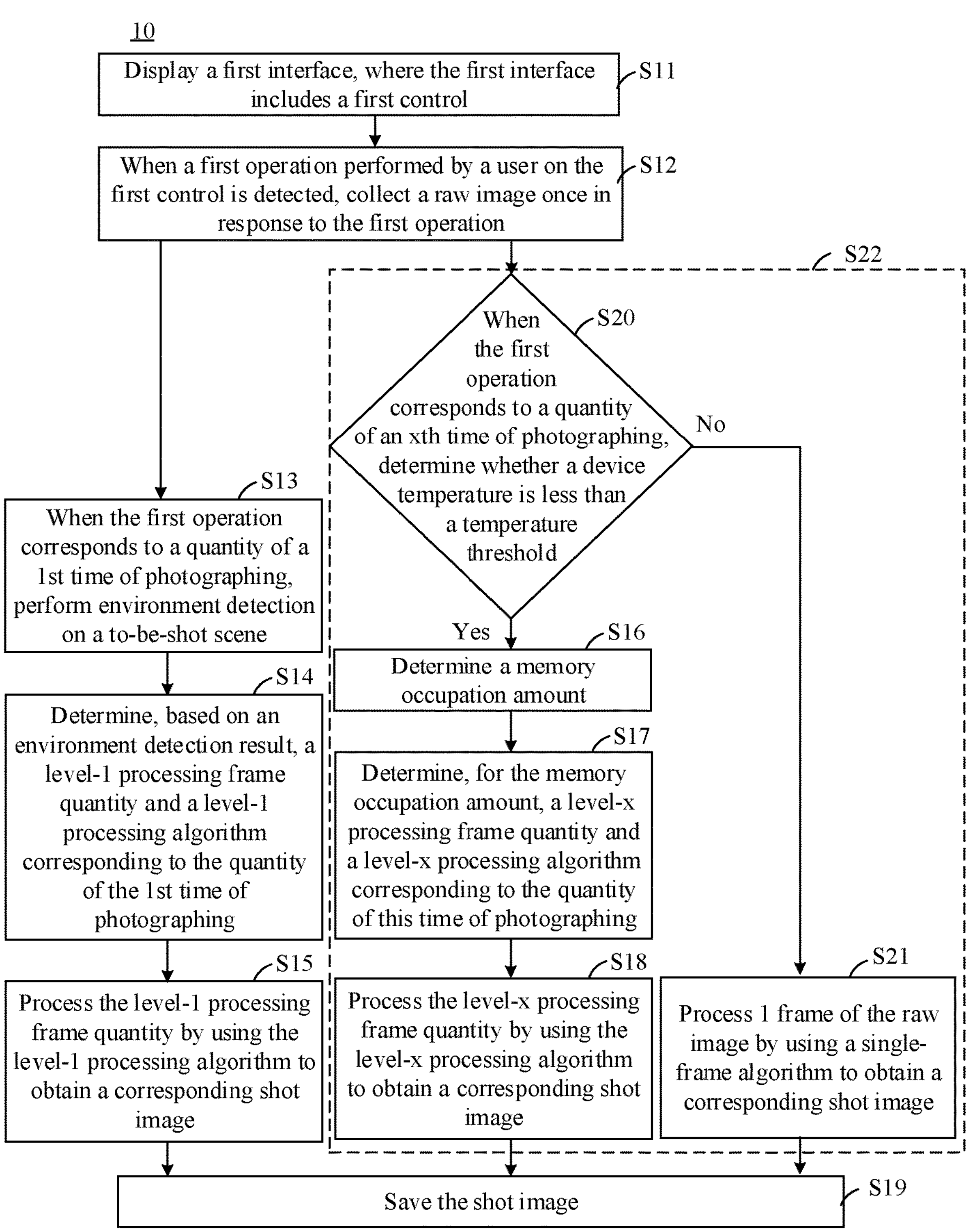
FIG. 11 is a schematic flowchart of another photographing method according to an embodiment of this application.

FIG. 11 is a schematic flowchart of another photographing method. As shown in FIG. 11, on a basis of FIG. 3, the method may further include the following S20 and S21.

For content of S11 to S19, refer to the foregoing descriptions for FIG. 3. Details are not described herein again.

S20: After the raw image is collected once in response to the first operation, when the first operation corresponds to the quantity of the 2nd time of photographing or a quantity of other subsequent photographing, determine whether the device temperature is less than a temperature threshold.

The device temperature is a temperature inside the electronic device. Usually, as the electronic device works, the electronic device generates a specific amount of heat. The heat causes the device temperature to increase. The device temperature may be collected by using a temperature sensor inside the electronic device.

S21: When the device temperature is greater than or equal to the temperature threshold, process, by using a single-frame algorithm, 1 frame of the raw image collected this time, to obtain a corresponding shot image. Then, the obtained shot image is saved.

The temperature threshold may be set and modified as required. This is not limited in this embodiment of this application. The device temperature may be obtained by obtaining data inside the electronic device.

It should be understood that the single-frame algorithm is an algorithm for processing 1 frame of raw image. The single-frame algorithm is different from the level-1 processing algorithm, and processing duration of the single-frame algorithm is shorter than that of the level-1 processing algorithm (the A1 algorithm, the B1 algorithm, the C1 algorithm, or the D1 algorithm).

Herein, the single-frame algorithm may include processing steps such as default pixel correction (default pixel correction, DPC), RAW domain noise filter (raw domain noise filter, RAWNF), black level correction (black level correction, BLC), lens shading correction (lens shading correction, LSC), auto white balance, demosaicing, color correction (color correction matrix, CCM), YUV domain noise filter, tone mapping (tone mapping), Gamma (Gamma) correction, color space conversion, and color enhancement (color enhancement, CE), and has a fast processing speed and short processing time.

The default pixel correction: Default pixels are white dots in an output image in an all-black environment and black dots in an output image in a high-brightness environment. Usually, three primary color channel signals should have a linear response relationship with ambient brightness. However, due to a poor signal outputted by an image sensor, the white dot or the black dot may appear. In this case, the default pixel may be automatically detected and automatically repaired, or a default pixel linked list may be established for repair of a default pixel at a fixed location. One dot refers to one pixel.

Noise reduction refers to a process of reducing a noise in an image. Common methods include average filtering, Gaussian filtering, bilateral filtering, and the like. The RAW domain noise filter refers to a process of reducing a noise in a RAW domain image. The YUV domain noise filter refers to a process of reducing a noise in a YUV domain image.

The black level correction: Due to there is a dark current in the image sensor, a pixel corresponds to a specific output voltage when there is no light shining, and pixels at different locations may correspond to different output voltages. Therefore, there is a need to correct the output voltage corresponding to the pixel when there is no light (for example, in black).

The lens shading correction may resolve a case in which a shadow occurs around a lens because the lens refracts light unevenly.

The auto white balance: To eliminate influence of a light source on imaging of the image sensor, color constancy of human vision is simulated to ensure that white seen in any scene is true white. Therefore, there is a need to correct a color temperature to automatically adjust white balance to an appropriate location.

Demosaicing: Because each pixel in the RAW field image corresponds to color information of only one channel, another color may be estimated by using surrounding pixel information. For example, in a linear interpolation manner, color information of two other channels missing for each pixel may be determined, to recover all channel information of all pixels in the image. A process of demosaicing is equivalent to converting an image from a RAW domain to an RGB domain. Herein, demosaicing may also be referred to as color interpolation.

The color correction: Because there is a specific different between an image obtained by a camera and a color a person expects, the color correction needs to be performed. Further, because the auto white balance calibrates white, the color correction can be used to calibrate another color than white.

Tone mapping refers to mapping all pixels in an image by using a spatial invariant mapping function. To be specific, when dynamic range conversion is performed on an image by using the tone mapping, pixels of the image use a same transformation function, and are in a one-to-one mapping relationship. Herein, tone mapping may also be referred to as dynamic range compression (dynamic range compression, DRC).

The Gamma correction refers to editing a gamma curve of an image, detecting a dark-colored part and a light-colored part of the image in a manner of performing non-linear tone editing on the image, and enabling the two to enlarge in proportion, thereby improving image contrast effect.

The color space conversion refers to converting an image from an RGB domain to a YUV domain. Therefore, an image obtained after processing in a previous step may be converted from the RGB domain to the YUV domain, to reduce an amount of data subsequently stored and transmitted, and reduce bandwidth.

The color enhancement enables original unsaturated color information to become saturated and rich. Herein, the color enhancement may also be referred to as color processing.

The foregoing is only an example. The single-frame algorithm may further delete or add some other steps. The level-1 processing algorithm (the A1 algorithm, the B1 algorithm, the C1 algorithm, or the D1 algorithm) may include another step on a basis of the single-frame algorithm. Certainly, the level-1 processing algorithm (the A1 algorithm, the B1 algorithm, the C1 algorithm, or the D1 algorithm) may alternatively be different from the steps included in the single-frame algorithm. This is not limited in this embodiment of this application.

It should be understood that, because the single-frame algorithm may run processing only in an image signal processor, the single-frame algorithm has a relatively fast processing speed and relatively short processing duration.

When the first photographing algorithm, the second photographing algorithm, and the third photographing algorithm are the same, the processing duration of the single-frame algorithm is shorter than the processing duration of the third photographing algorithm, and in this case, is also shorter than the processing duration of the first photographing algorithm and the second photographing algorithm.

When the processing duration of the first photographing algorithm, the second photographing algorithm, and the third photographing algorithm gradually decreases, the single-frame algorithm may be the same as the third photographing algorithm, or the processing duration of the single-frame algorithm may be relatively shorter than that of the third photographing algorithm.

With reference to the foregoing description, when the device temperature is higher than the temperature threshold, the single-frame algorithm may be switched according to the foregoing steps to process the 1 frame of the raw image. This reduces workload of the electronic device to a maximum extent, slows down an amplitude of a heat increase, and reduces pressure from a heat increment, so that quantities of some more times of photographing are implemented before the electronic device cannot work, to meet a photographing requirement of the user. When the device temperature is less than the temperature threshold, the memory occupation amount of the electronic device may be continued to determine according to processes described in the foregoing S16 to S19. The different algorithms and the different frame quantities are switched based on the different memory occupation amounts, to reduce pressure from a memory increment, so that quantities of some more times of photographing are implemented before the memory is full, to meet a photographing requirement of the user.

It should be noted that an execution sequence shown in FIG. 11 is only an example. Alternatively, after the raw image is collected once, when the first operation is determined as the quantity of the 1st time of photographing, the device temperature of the electronic device is detected. Then, when the device temperature of the electronic device is greater than or equal to the temperature threshold, the 1 frame of the raw image is processed by using the single-frame algorithm. When the device temperature of the electronic device is less than the temperature threshold, the environment detection is performed on the to-be-shot scene. Alternatively, device temperature detection and the environment detection on the to-be-shot scene may be simultaneously performed. The level-1 processing frame quantity and the level-1 processing algorithm corresponding to the quantity of the 1st time of photographing are determined based on both a device temperature detection result and the environment detection result. Alternatively, temperature detection may be performed on a quantity of each time of photographing, to determine whether it is less than the temperature threshold. Then, a subsequent related step is performed.

It should be understood that only one temperature threshold is set in the foregoing method. In this application, more or three or more than three temperature thresholds may be further set, which may be specifically set as required. For example, two temperature thresholds may be set, which are respectively a first temperature threshold and a second temperature threshold, and the first temperature threshold is less than the second temperature threshold. Based on the two temperature thresholds, a temperature range may be divided into three interval ranges. When the device temperature meets one of the intervals, correspondingly, processing is performed by using an algorithm and a frame quantity corresponding to the interval, to obtain a corresponding shot image. On this basis, different memory thresholds may be further set for different temperature intervals, to execute different determining procedures.

Figure 12:
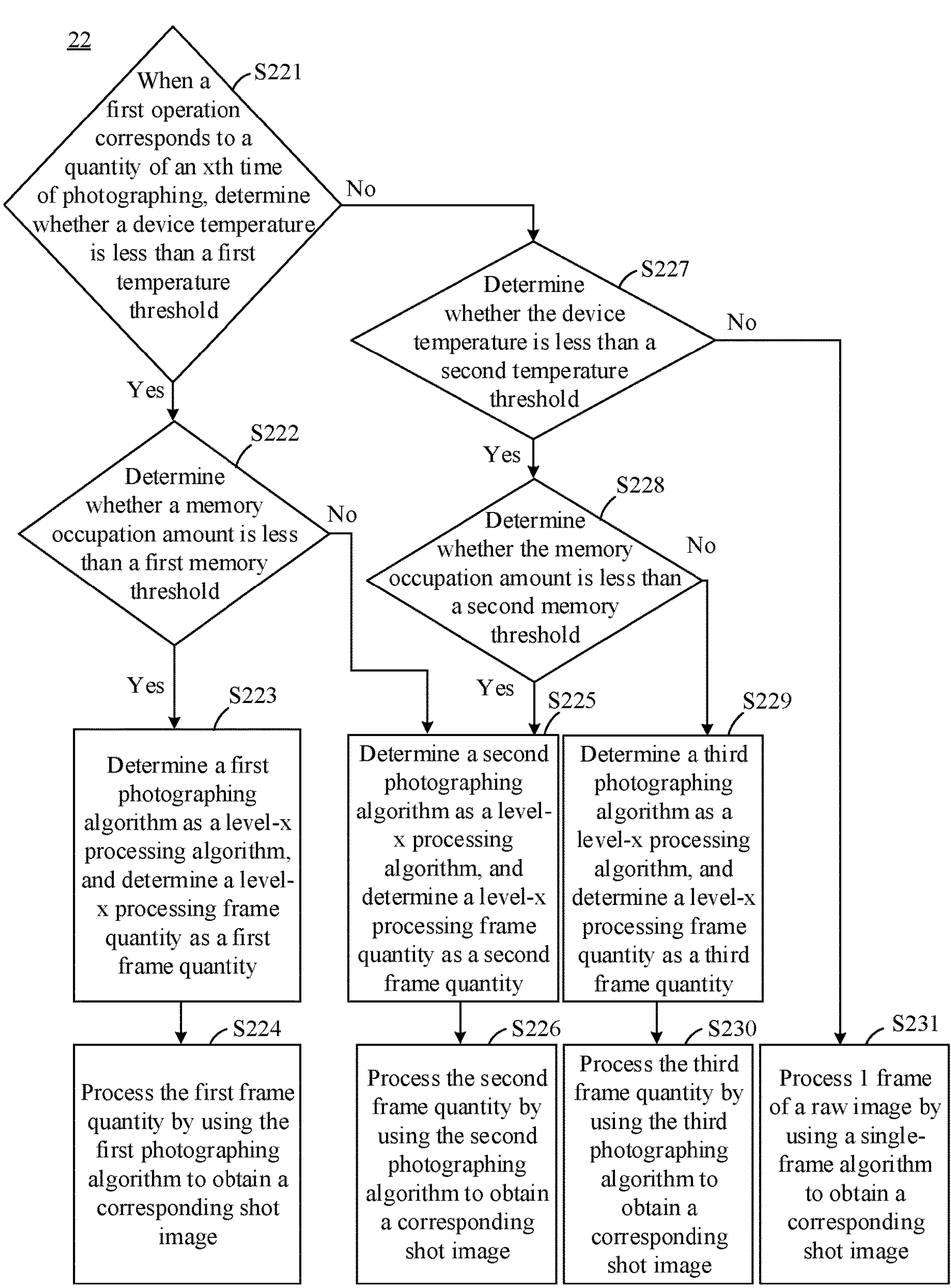
FIG. 12 is a schematic flowchart of still another photographing method according to an embodiment of this application.

FIG. 12 is a schematic flowchart of still another photographing method. When two temperature thresholds are set, which are respectively a first temperature threshold and a second temperature threshold, on a basis of FIG. 11, the method re-provides procedures included in S22, which are described below. As shown in FIG. 12, S22 may further include the following S221 to S231.

S221: After the raw image is collected once in response to the first operation, when the first operation corresponds to the quantity of the xth time of photographing (the quantity of the 2nd time of photographing and the quantity of the another subsequent time of photographing), determine whether the device temperature is less than the first temperature threshold.

S222: When the device temperature is less than the first temperature threshold, continue to determine whether the memory occupation amount is less than the first memory threshold.

S223: According to S222, when the device temperature is less than the first temperature threshold and the memory occupation amount is also less than the first memory threshold, determine the level-x processing algorithm as the first photographing algorithm, and determine the level-x processing frame quantity as the first frame quantity.

S224: Process, by using the first photographing algorithm, a first frame quantity in the raw image collected this time to obtain a corresponding shot image.

S225: According to S222, when the device temperature is less than the first temperature threshold but the memory occupation amount is greater than or equal to the first memory threshold, determine the second photographing algorithm as the level-x processing algorithm, and determine the level-x processing frame quantity as the second frame quantity.

S226: Process, by using the second photographing algorithm, a second frame quantity in the raw image collected this time to obtain a corresponding shot image.

S227: In the foregoing S221, when the device temperature is greater than or equal to the first temperature threshold, continue to determine whether the device temperature is less than the second temperature threshold.

S228: When the device temperature is greater than or equal to the first temperature threshold but less than the second temperature threshold, continue to determine whether the memory occupation amount is less than the second memory threshold.

In this case, when the device temperature is less than the second temperature threshold and the memory occupation amount is less than the second memory threshold, it indicates that the device temperature is not extremely high, and the memory is not full. Therefore, processing may be further continued by using an algorithm with relatively long processing duration or a relatively large frame quantity of raw images, for example, the foregoing S225 and S226 are performed.

S229: According to S228, when the device temperature is greater than or equal to the first temperature threshold but less than the second temperature threshold, but the memory occupation amount is greater than or equal to the second memory threshold, determine the third photographing algorithm is the level-x processing algorithm, and determine the level-x processing frame quantity as the third frame quantity.

S230: Process, by using the third photographing algorithm, the third frame quantity in the raw image collected this time to obtain a corresponding shot image.

S231: According to S227, when it is determined that the device temperature is greater than or equal to the first temperature threshold and also greater than the second temperature threshold, it indicates that the device temperature is extremely high. Therefore, in this case, 1 frame of the raw image collected this time may be processed by using the single-frame algorithm to obtain a corresponding shot image.

It should be understood that when the temperature range is divided into a plurality of interval ranges and the memory size is divided into a plurality of interval ranges, a temperature condition and a memory condition may be combined. In this way, when a temperature is relatively low and the memory occupation amount is relatively small, a plurality of frames of raw images are processed by using an algorithm with long processing time, to ensure relatively good image quality and a relatively good effect. When a temperature is relatively low and the memory occupation amount is relatively large, or a temperature is relatively high and the memory occupation amount is relatively small, adjustment is adaptively performed, and a relatively large quantity of frames of raw images are processed by using an algorithm with relatively short processing duration, to balance a relationship among image quality, the temperature, and the memory occupation amount. When a temperature is relatively high and the memory occupation amount is relatively large, an algorithm with relatively short processing duration is switched to process a relatively small quantity of frames of raw images, to reduce pressure of a temperature increment and a memory increment, ensuring normal photographing in a case of slightly degrading image quality. In addition, in a case of an extremely high temperature, regardless of the memory occupation amount, a simplest algorithm is directly switched to process a minimum quantity of frames of raw images. In this case, although image quality is degraded, the temperature increment is reduced to a maximum extent, to ensure response to a photographing command of the user, thereby implementing a photographing requirement of the user.

It should be understood that the foregoing is only an example, and a plurality of temperature thresholds and memory thresholds may alternatively be set to distinguish different cases, and may be specifically set and modified as required. This is not limited in this embodiment of this application.

According to the foregoing method provided in this application, when the user triggers a photographing command, determining may be performed based on a device temperature and a memory occupation amount of the electronic device at current triggering time. Then, a determined processing algorithm and a processing frame quantity are associated with a quantity of photographing. When a frequency of user triggering is not high, and background processing of the electronic device is relatively timely, the processing frame quantity may be processed based on the determined processing algorithm to obtain a corresponding shot image. When the background of the electronic device cannot perform processing in a timely manner, the determined processing algorithm and the processing frame quantity are associated with the quantity of photographing, and then which are all stored together with data such as the collected raw image, and then wait for subsequent invoking and processing by the electronic device.

However, when the user suddenly increases a frequency of triggering a photographing command, data obtained by the electronic device rapidly increases, causing serious data congestion. In this case, when data corresponding to a quantity of a specific time of photographing is subsequently invoked and processed, because some time elapses from a processing moment to a response moment, a memory occupation amount of the electronic device changes greatly in this period of time. In this case, an originally determined processing algorithm is not applicable, and adaptive adjustment needs to be performed.

Alternatively, when data corresponding to a quantity of a specific time of photographing is invoked for processing, a memory occupation amount is close to a memory upper limit. If processing this time is further performed based on a previously determined processing algorithm, an unresponsive case is inevitably caused. In this case, adaptive adjustment needs to be performed on the processing algorithm in a timely manner, to reduce a memory increment again.

For the foregoing two cases, an embodiment of this application further provides a photographing method, to switch a processing algorithm to adapt to a memory situation at an actual processing moment.

Figure 13:
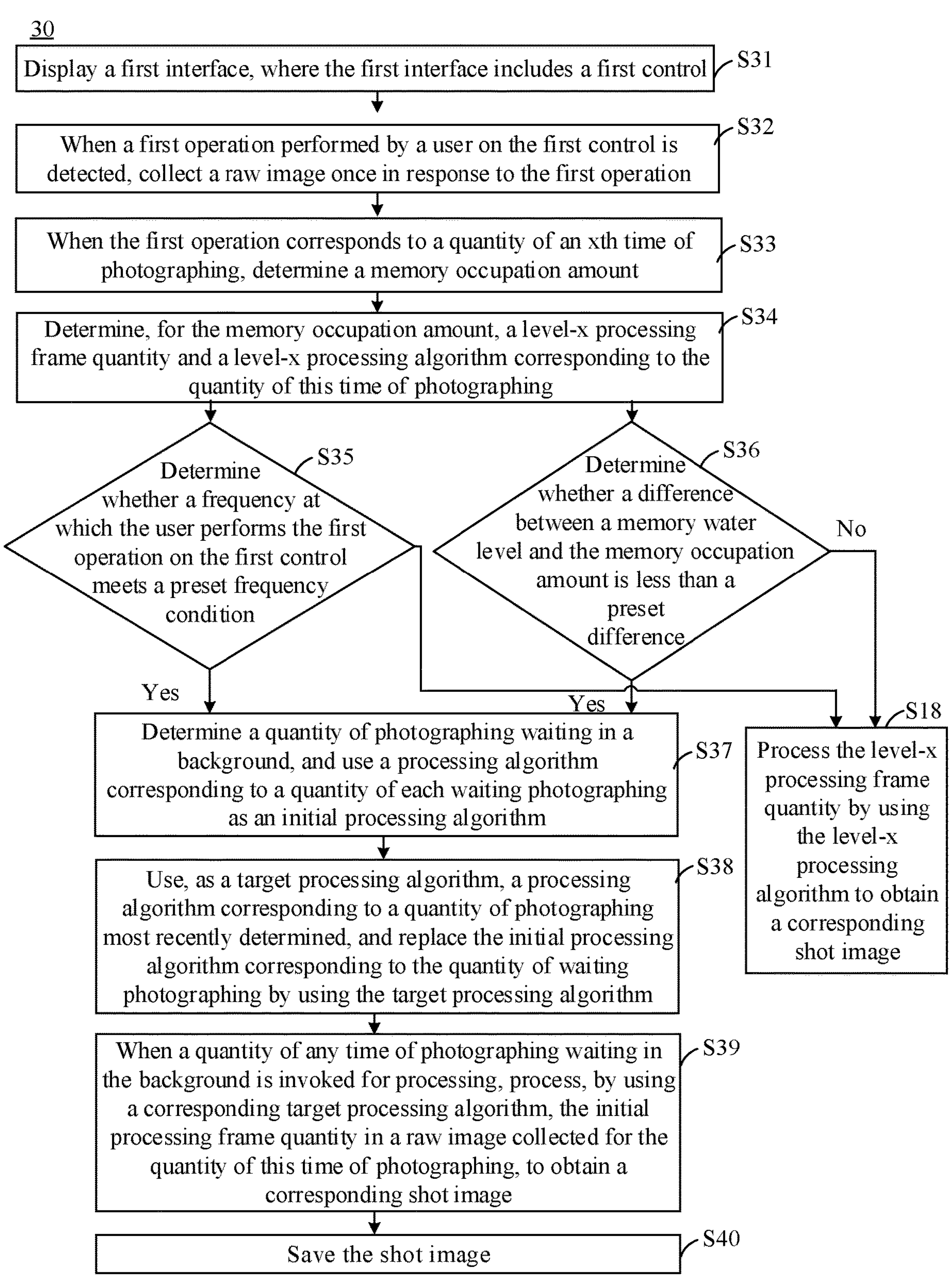
FIG. 13 is a schematic flowchart of still another photographing method according to an embodiment of this application.

FIG. 13 shows still another photographing procedure according to an embodiment of this application. As shown in FIG. 13, the method 30 may include the following 31 to S39.

S31: An electronic device displays a first interface, where the first interface includes a first control.

S32: When a first operation of a user on the first control is detected, the electronic device collects a raw image once by using a camera in response to the first operation.

S33: When the first operation corresponds to a quantity of an xth time of photographing, determine a memory occupation amount.

S34: Determine, for the memory occupation amount, a level-x processing frame quantity and a level-x processing algorithm corresponding to the quantity of this time of photographing, where x is an integer greater than 1.

A process of S31 to S34 is the same as a process of S11, S12, S16, and S17 included in the foregoing FIG. 3. For details, refer to the foregoing description. Details are not described herein again.

S35: Determine whether a frequency at which the user performs a first operation on the first control meets a preset frequency condition.

The frequency may indicate a speed at which the user performs the first operation, for example, a tap speed of tapping a photographing key. For example, detection is performed on interval duration between the two adjacent photographing commands delivered by the user. If it is continuously detected that interval duration for 10 times or 20 times is less than a second preset interval duration, it may indicate that the frequency meets the preset frequency condition. The second preset interval duration may be set as required, for example, may be 100 m or 200 ms. The second preset interval duration is less than first preset interval duration.

It should be understood that when the frequency does not meet the preset frequency condition, it indicates that a quantity that the user triggers photographing commands is relatively moderate, and the user performs normal photographing for a plurality of times. When the frequency does not meet the preset frequency condition, it indicates that a quantity that the user triggers photographing commands is relatively large, and the user expects to quickly perform photographing for a plurality of times. The preset frequency condition, namely, a quantity of continuously detecting interval duration of quantities of adjacent photographing, and the second preset interval duration may be set and modified as required. This is not limited in this embodiment of this application.

Optionally, in this embodiment of this application, it may be further determined whether the frequency at which the user performs the first operation on the first control meets the preset frequency condition. Then, when the preset frequency condition is met, the memory occupation amount is determined, and the level-x processing frame quantity and the level-x processing algorithm corresponding to the quantity of this time of photographing are determined according to the method shown in FIG. 3.

In an example, when the frequency meets the preset frequency condition, the memory occupation amount is determined, and the level-x processing frame quantity and the level-x processing algorithm corresponding to the quantity of this time of photographing are determined according to the method shown in FIG. 3, the level-x processing frame quantity may not include a long-exposure raw image and a short-exposure raw image, and the level-x processing algorithm does not include a high dynamic range (high dynamic range, HDR) algorithm.

It should be understood that when the frequency meets the preset frequency condition, it indicates that in this case, the user suddenly delivers frequent photographing commands quickly. In this case, a long-exposure raw image and a short-exposure raw image that are included in the level-x processing frame quantity may be removed, and the level-x processing algorithm is switched to a non-HDR algorithm. In this way, the non-HDR algorithm that processes only a normal-exposure raw image may be switched in a manner of abandoning protecting a dynamic range, to improve subsequent processing efficiency and achieve a fast photographing requirement of the user.

S36: Determine whether a difference between a memory water level and the memory occupation amount is less than a preset difference.

The memory water level refers to a maximum memory usage. A value of the memory water level may be learned by obtaining a parameter provided by a manufacturer, or may need to be set and modified. This is not limited in this embodiment of this application.

It should be understood that when the difference between the memory water level and the memory occupation amount is greater than the preset difference, it indicates that the memory occupation amount is far from reaching a level of the memory water level, and there is still much remaining available storage space. When the difference between the memory water level and the memory occupation amount is less than the preset difference, it indicates that the memory occupation amount is close to reaching the level of the memory water level, and there is little remaining available storage space. A value of the preset difference may be set and modified as required. This is not limited in this embodiment of this application.

S37: When the frequency meets the preset frequency condition or the difference between the memory water level and the memory occupation amount is less than the preset difference, determine a quantity of photographing waiting in a background, and use a level-x processing algorithm corresponding to a quantity of each waiting photographing as an initial processing algorithm.

Determining the quantity of photographing waiting in the background refers to determining quantities of which photographing waiting in the background, and the quantities of photographing waiting in the background include one, two, or more. For example, the two are included, which are respectively a quantity of a 5th level of photographing and a quantity of a 6th level of photographing. Then, a level-5 processing algorithm corresponding to the quantity of the 5th time of photographing is used as an initial processing algorithm corresponding to the quantity of the 5th time of photographing. A level-6 processing algorithm corresponding to the quantity of the 6th time of photographing is used as an initial processing algorithm corresponding to the quantity of the 6th time of photographing. Certainly, the background may not have the quantity of waiting photographing, and when there is no quantity of waiting photographing, no subsequent step is required.

It should be understood that when the frequency meets the preset frequency condition, it indicates that a frequency at which the user triggers the photographing command is increased. When the difference between the memory water level and the memory occupation amount is less than the preset difference, it indicates that memory is close to an upper limit. In the two cases, a processing algorithm needs to be switched. During switching, a processing algorithm that needs to be replaced needs to be determined first.

The foregoing is only two example conditions. Alternatively, another condition may be set to start a replacement procedure. Alternatively, the foregoing condition may be further canceled, and a processing algorithm is replaced twice when the quantity of photographing waiting in the background is processed, which may be specifically set and adjusted as required. This is not limited in this application.

S38: Use, as a target processing algorithm, a level-x processing algorithm corresponding to a quantity of photographing most recently determined, and replace the initial processing algorithm corresponding to the quantity of waiting photographing by using the target processing algorithm.

It should be understood that the quantity of most recent photographing is a quantity of photographing currently recorded in response to the first operation of the user. A process of determining a processing algorithm and a processing frame quantity corresponding to the quantity of most recent photographing may be determined by using the method described in the foregoing S17. Details are not described herein again.

The processing algorithm and the processing frame quantity corresponding to the quantity of photographing waiting in the background are determined based on a previous memory occupation amount, and the previous memory occupation amount is different from a current memory occupation amount. Therefore, a memory occupation amount currently determined can be taken into consideration, and each processing algorithm corresponding to the quantity of photographing waiting in the background is replaced with a currently determined processing algorithm, to adapt to a current memory status.

Optionally, before replacement is performed, the processing algorithm corresponding to the quantity of photographing most recently determined may be compared with the initial processing algorithm corresponding to the quantity of waiting photographing. If the two are the same, there is no need to perform the replacement. If the two are different, the replacement is performed. Therefore, by comparing the processing algorithms, replacement is performed only in a case of different processing algorithms, which can avoid invalid replacement and reduce workload.

Optionally, a processing frame quantity corresponding to the corresponding to the quantity of waiting photographing may be further used as an initial processing frame quantity, and the processing frame quantity corresponding to the quantity of photographing most recently determined is used as a target processing frame quantity. Then, the initial processing frame quantity corresponding to the quantity of waiting photographing is replaced by using the target processing frame quantity.

It should be understood that when the memory occupation amount currently determined is taken into consideration, each processing frame quantity corresponding to the quantity of photographing waiting in the background may be replaced with the target processing frame quantity.

Before replacement, the processing frame quantity corresponding to the quantity of photographing most recently determined may be further compared with the processing frame quantity corresponding to the quantity of waiting photographing. If the two are the same, there is no need to perform the replacement. If the two are different, the replacement is performed. Therefore, by comparing the processing frame quantities, replacement is performed only in a case of different frame quantities, which can avoid invalid replacement and reduce workload.

It may be learned from the content in FIG. 3 that, when a processing frame quantity corresponding to a quantity of photographing is determined for the first time, processing frame quantities are the same, or a processing frame quantity gradually decreases as a memory occupation amount increases. It may be learned from this that when the processing frame quantity corresponding to the quantity of photographing is determined for the second time, if replacement is needed, a case of a same processing frame quantity is definitely excluded. A relatively large processing frame quantity previous is replaced by using a relatively small processing frame quantity most recent. This is equivalent to each time reducing the processing frame quantity corresponding to the quantity of waiting photographing. A smaller processing frame quantity obtained after replacement indicates higher working efficiency obtained when a shot image is subsequently determined, and a smaller increase in a memory occupation amount.

It should be noted that when the initial processing frame quantity is replaced by using the target processing frame quantity, only a value of the processing frame quantity is changed, and a corresponding raw image is not replaced. For example, the quantity of waiting photographing is a quantity of a 10th time of photographing. When the first operation is responded, 9 frames of raw images are collected. When a processing frame quantity is determined, 5 frames of raw images in the 9 frames of raw images are screened as the processing frame quantity, and the "5 frames" is the initial processing frame quantity. Subsequently, if it is determined that the target processing frame quantity is 1 frame, the initial processing frame quantity "5 frames" may be replaced with the "1 frame", and a raw image corresponding to the 1 frame is 1 frame screened from the original 5 frames of raw images.

It should be further understood that after being started, the foregoing replacement method may be cyclically performed for a plurality of times. In other words, the processing algorithm and/or the processing frame quantity corresponding to the quantity of waiting photographing may be replaced once each time one photographing command is newly responded subsequently. Alternatively, for a processing algorithm and/or a processing frame quantity corresponding to a quantity of specific waiting photographing, the processing algorithm and/or the processing frame quantity may be replaced for a plurality of times before being used to obtain a corresponding shot image.

Therefore, the processing algorithm corresponding to the quantity of photographing waiting in the background is a processing algorithm determined based on the memory occupation amount when the first operation performed by the user on the first control is responded, or is a target processing algorithm obtained after last replacement in a waiting process.

For example, when the quantity of photographing most recently determined is a quantity of a 20th time of photographing, a processing algorithm corresponding to the quantity of the 20th time of photographing is used as the target processing algorithm, and a corresponding processing frame quantity is used as the target frame quantity. Then, a processing algorithm corresponding to quantities of a plurality of times of waiting photographing may be used as the initial processing algorithm, and a corresponding processing frame quantity is used as the initial processing frame quantity. Then, the initial processing algorithm is replaced with the target processing algorithm, and the initial processing frame quantity is replaced with the target processing frame quantity.

In response to another first operation of the user, if a quantity of a latest time of corresponding photographing is updated to a quantity of a 21st time of photographing, a processing algorithm corresponding to the quantity of the 21st time of photographing is used as the target processing algorithm, and a corresponding processing frame quantity is used as the target processing frame quantity. Then, a processing algorithm corresponding to quantities of a plurality of times of waiting photographing (the target processing algorithm corresponding to the quantity of the 20th time of photographing) may be used as the initial processing algorithm, and a corresponding processing frame quantity (the target processing frame quantity corresponding to the quantity of the 20th time of photographing) is used as the initial processing frame quantity. Then, the initial processing algorithm is replaced with the target processing algorithm of the quantity of the 21st time of photographing, and the initial processing frame quantity is replaced with the target processing frame quantity of the quantity of the 21st time of photographing. If the user continues to perform the first operation, a subsequent replacement process is deduced by analogy. Details are not described herein again.

S39: When a quantity of any time of photographing waiting in the background is invoked for processing, process, by using a corresponding target processing algorithm, a level-x processing frame quantity in a raw image collected for the quantity of this time of photographing, to obtain a corresponding shot image.

In addition, when the frequency does not meet the preset frequency condition or the difference is greater than or equal to the preset difference, there is no need to perform the foregoing steps, and processing is continued based on an originally determined processing algorithm. For example, as shown in S18, the level-x processing frame quantity is processed by using a previously determined level-x processing algorithm to obtain a corresponding shot image. Alternatively, although the foregoing frequency or difference condition is met, when there is no quantity of waiting photographing in the background, there is no need to perform the foregoing steps.

S40: Save the shot image.

The shot image may be stored in a gallery or displayed.

According to the foregoing photographing method provided in this embodiment of this application, when responding to the first operation performed by the user on the first control, the electronic device collects the raw image once by using the camera. When the frequency of performing the first operation on the first control meets the preset frequency condition or the difference between the memory water level and the memory occupation amount is less than the preset difference, the electronic device determines the quantity of photographing waiting in the background, and uses the processing algorithm corresponding to the quantity of each waiting photographing as the initial processing algorithm corresponding to the quantity of each waiting photographing. Then, the processing algorithm corresponding to the quantity of photographing most recently determined is used as the target processing algorithm, and the initial processing algorithm corresponding to the quantity of waiting photographing is replaced by using the target processing algorithm. In this way, when the quantity of waiting photographing is subsequently invoked for processing, the initial processing frame quantity in the raw image collected for the quantity of this time of photographing is processed by using the target processing algorithm obtained after replacement, to obtain the corresponding shot image. Because the processing algorithm corresponding to the quantity of photographing most recently determined is determined based on a current memory situation, the processing algorithm of the quantity of waiting photographing is accordingly adjusted, so that a memory accumulation degree can be controlled, the memory occupation amount can decrease, and continuous and fast photographing can be implemented.

In addition, the processing frame quantity may be further replaced. When a processing frame quantity decreases as a quantity of photographing increases, the processing frame quantity corresponding to the quantity of photographing most recently determined is used as the target processing frame quantity. The initial processing frame quantity corresponding to the quantity of waiting photographing is replaced by using the target processing frame quantity. After replacement, the processing frame quantity corresponding to the quantity of waiting photographing decreases. In this case, when the quantity of waiting photographing is invoked for processing, the shot image may be determined by using a decreased target processing frame quantity. Because the processing frame quantity corresponding to the quantity of photographing most recently determined is determined based on the current memory situation, the processing frame quantity of the quantity of waiting photographing is accordingly adjusted, so that a memory accumulation degree can be controlled, and the memory occupation amount can decrease.

On this basis, if the quantity of photographing waiting in the background waits for relatively long time for processing, the processing algorithm and/or the processing frame quantity corresponding to the quantity of photographing waiting in the background may be replaced for a plurality of times with a change of the quantity of photographing most recently determined; a last target processing algorithm corresponding to the quantity of photographing waiting in the background is replaced by using a latest target processing algorithm; and/or a last target processing frame quantity corresponding to the quantity of photographing waiting in the background is replaced by using a latest target processing frame quantity. Therefore, when the quantity of photographing waiting in the background is processed actually, the latest target processing algorithm can be used for processing. In this way, after a plurality of times of replacement, the memory occupation amount can decrease as much as possible by using latest data as a reference, to implement more times of continuous and fast photographing.

In comparison with previously only determining the processing algorithm and the processing frame quantity once, after twice replacement or even a plurality of times of replacement is performed in the method, the processing algorithm and/or the processing frame quantity can be updated and optimized in real time, to more flexibly adapt to the current memory condition, and ensure that photographing can be normally performed.

The foregoing provides an overall introduction to the procedure of the photographing method provided in this application. The following further illustrates by using embodiments.

Embodiment 1

FIG. 14 shows a table according to an embodiment of this application, which is used to illustrate a processing algorithm and a processing frame quantity corresponding to a quantity of each time of photographing.

With reference to FIG. 4A and FIG. 4B, when a user enables a camera application, a mobile phone displays a photographing interface, and the photographing interface includes a photographing key. When performing photographing, the user performs a plurality of times of tap operations on the photographing key by using a finger.

When the mobile phone detects a 1st time of tap operation of the user, the mobile phone collects a raw image once by using a camera in response to the 1st time of tap operation, for example, collects 9 frames of raw images located in a RAW domain. A quantity of this time of photographing may be recorded as a quantity of a 1st time of photographing.

Because this time of tap operation corresponds to the quantity of the 1st time of photographing, the mobile phone may perform environment detection on a to-be-shot scene, for example, perform lightness detection and dynamic range detection. In this case, based on an environment detection result, it is further determined whether detected lightness is less than a lightness threshold, and it is further determined whether a detected dynamic range value is less than a dynamic range threshold.

When the lightness is less than the lightness threshold and the dynamic range value is less than the dynamic range threshold, or when the to-be-shot scene is a scene with low brightness and a low dynamic range, as shown in FIG. 14, a level-1 processing algorithm may be determined as an A1 algorithm. The A1 algorithm is, for example, a first night scene algorithm. In addition, it may be determined that a level-1 processing frame quantity corresponding to the quantity of the 1st time of photographing is, for example, 6 frames. The 6 frames are 6 frames of raw images that are screened from the 9 frames of raw images collected corresponding to the quantity of the 1st time of photographing.

When the mobile phone detects a 2nd time of tap operation of the user, the mobile phone collects a raw image once by using the camera in response to this time of tap operation, which is still 9 frames of raw images. A quantity of this time of photographing may be recorded as a quantity of a 2nd time of photographing.

Because the quantity of this time of photographing corresponds to the quantity of the 2nd time of photographing, where x is greater than 1, the mobile phone continues to determine a memory occupation amount. Because the memory occupation amount at this time is less than a first memory threshold, it can be determined that a level-2 processing algorithm corresponding to the quantity of the 2nd time of photographing is a first photographing algorithm. For example, the first photographing algorithm is still the first night scene algorithm. In addition, it may be determined that a level-2 processing frame quantity corresponding to the quantity of the 2nd time of photographing is 6 frames. The 6 frames are a first frame quantity. The 6 frames are 6 frames of raw images that are screened from the 9 frames of raw images collected corresponding to the quantity of the 2nd time of photographing.

When the mobile phone detects a 3rd time of tap operation of the user, the mobile phone collects a raw image once by using the camera in response to this time of tap operation, which is still 9 frames of raw images. A quantity of this time of photographing may be recorded as a quantity of a 3rd time of photographing.

Because the quantity of this time of photographing corresponds to the quantity of the 3rd time of photographing, where x is greater than 1, the mobile phone determines a memory occupation amount at this time. The memory occupation amount at this time is greater than the first memory threshold but less than a second memory threshold. Therefore, it can be determined that a level-3 processing algorithm corresponding to the quantity of the 3rd time of photographing is a second photographing algorithm. The preset second photographing algorithm is the same as the first photographing algorithm, that is, the second photographing algorithm is the first night scene algorithm. In addition, it may be determined that a level-3 processing frame quantity corresponding to the quantity of the 3rd time of photographing is 5 frames. The 5 frames are a second frame quantity, and the second frame quantity is less than the first frame quantity. The 5 frames are 5 frames of raw images that are screened from the 9 frames of raw images collected corresponding to the quantity of the 3rd time of photographing.

When the mobile phone detects a 4th time of tap operation of the user, the mobile phone collects a raw image once by using the camera in response to this time of tap operation, which is still 9 frames of raw images. A quantity of this time of photographing may be recorded as a quantity of a 4th time of photographing.

Because the quantity of this time of photographing corresponds to the quantity of the 4th time of photographing, where x is greater than 1, the mobile phone determines a memory occupation amount at this time. The memory occupation amount at this time is greater than the second memory threshold. Therefore, it can be determined that a level-4 processing algorithm corresponding to the quantity of the 4th time of photographing is a third photographing algorithm. The preset third photographing algorithm is the same as the second photographing algorithm and the first photographing algorithm, that is, the third photographing algorithm is the first night scene algorithm. In addition, it may be determined that a level-4 processing frame quantity corresponding to the algorithm of the 4th time of photographing is 4 frames. The 4 frames are a third frame quantity, and the third frame quantity is less than the second frame quantity. The 4 frames are 4 frames of raw images that are screened from the 9 frames of raw images collected corresponding to the quantity of the 4th time of photographing.

A processing process of a quantity of subsequent photographing is deduced by analogy. Details are not described herein again.

For example, the first night scene algorithm may include all steps included in a single-frame algorithm, and a night scene algorithm module generated based on a Unet network model. The night scene algorithm module may fuse a plurality of frames of raw images located in the RAW domain into one frame of image located in the RAW domain. Certainly, the night scene algorithm module may alternatively be generated based on another model. The first night scene algorithm may further include another module or step. This is not limited in this embodiment of this application.

In addition, a decrease amount of the processing frame quantity corresponding to the quantity of each time of photographing may be the same or may be different, and may be specifically set and modified as required. This is not limited in this embodiment of this application.

In the foregoing embodiment, when the to-be-shot scene is the scene with low brightness and a low dynamic range, it indicates that ambient light in the to-be-shot scene is relatively dark. If a normal photographing algorithm is used for processing, an obtained shot image is unclear, and consequently, the user cannot clearly see detail content in the shot image. For this reason, in this embodiment of this application, the first night scene algorithm may be selected for processing, to improve image brightness in a processing process, so that a subsequently obtained shot image can present more details.

On this basis, based on dividing a memory size into a plurality of interval ranges, in a process of a plurality of times of photographing, processing frame quantities determined for quantities of photographing corresponding to different memory ranges gradually decrease as memory occupation amounts increase. In this case, although the selected processing algorithm is the same, during subsequent processing, processing duration of the processing algorithm is correspondingly shortened because the processing frame quantity decreases, and an increase speed of the memory occupation amount levels off. Therefore, in this embodiment of this application, for the quantities of the plurality of times of photographing, the processing frame quantity corresponding to the quantity of each time of photographing decreases based on the same algorithm as the quantity of photographing increases. This reduces processing duration of the processing algorithm, improves processing efficiency, reduces an increase speed of the memory occupation amount, and reduces a pressure from a memory increment.

Embodiment 2

FIG. 15 shows another table according to an embodiment of this application, which is used to illustrate a processing algorithm and a processing frame quantity corresponding to a quantity of each time of photographing.

With reference to FIG. 4A and FIG. 4B, when a user enables a camera application, a mobile phone displays a photographing interface, and the photographing interface includes a photographing key. When performing photographing, the user performs a plurality of times of tap operations on the photographing key by using a finger.

When the mobile phone detects a 1st time of tap operation of the user, the mobile phone collects a raw image once by using a camera in response to this time of tap operation, for example, collects 6 frames of raw images located in a RAW domain. A quantity of this time of photographing may be recorded as a quantity of a 1st time of photographing.

Because this time of tap operation corresponds to the quantity of the 1st time of photographing, the mobile phone may perform environment detection on a to-be-shot scene, for example, perform lightness detection and dynamic range detection. In this case, based on an environment detection result, it is further determined whether detected lightness is less than a lightness threshold, and it is further determined whether a detected dynamic range value is less than a dynamic range threshold.

When the lightness is greater than the lightness threshold and the dynamic range value is less than the dynamic range threshold, or when the to-be-shot scene is a scene with high brightness and a low dynamic range, as shown in FIG. 15, a level-1 processing algorithm may be determined as a D1 algorithm. The D1 algorithm is a first multi frame noise reduction (multi frame noise reduction, MFNR) algorithm. In addition, it may be determined that a level-1 processing frame quantity corresponding to the quantity of the 1st time of photographing is 6 frames. The 6 frames are all the 6 frames of raw images collected corresponding to the quantity of the 1st time of photographing.

When the mobile phone detects a 2nd time of tap operation of the user, the mobile phone collects a raw image once by using the camera in response to this time of tap operation, which is still 6 frames of raw images. A quantity of this time of photographing may be recorded as a quantity of a 2nd time of photographing.

Because the quantity of this time of photographing corresponds to the quantity of the 2nd time of photographing, where x is greater than 1, the mobile phone may then detect a device temperature and determine whether the device temperature is less than a temperature threshold. If the device temperature is less than the temperature threshold, the mobile phone continues to determine a memory occupation amount. In addition, because the memory occupation amount at this time is less than a first memory threshold, it can be determined that a level-2 processing algorithm corresponding to the quantity of the 2nd time of photographing is a first photographing algorithm. The first photographing algorithm is, for example, a second MFNR algorithm. In addition, it may be determined that a level-2 processing frame quantity corresponding to the quantity of the 2nd time of photographing is 6 frames. The 6 frames are a first frame quantity. The 6 frames are all the 6 frames of raw images collected corresponding to the quantity of the 2nd time of photographing.

When the mobile phone detects a 3rd time of tap operation of the user, the mobile phone collects a raw image once by using the camera in response to this time of tap operation, which is still 6 frames of raw images. A quantity of this time of photographing may be recorded as a quantity of a 3rd time of photographing.

Because the quantity of this time of photographing corresponds to the quantity of the 3rd time of photographing, where x is greater than 1, the mobile phone may then detect a device temperature and determine whether the device temperature is less than the temperature threshold. If the device temperature is less than the temperature threshold, the mobile phone continues to determine a memory occupation amount at this time. The memory occupation amount at this time is greater than the first memory threshold but less than a second memory threshold. Therefore, it can be determined that a level-3 processing algorithm corresponding to the quantity of the 3rd time of photographing is a second photographing algorithm. The preset second photographing algorithm is different from the first photographing algorithm, and processing duration of the second photographing algorithm is shorter than processing duration of the first photographing algorithm. The second photographing algorithm is, for example, a third MFNR algorithm. In addition, it may be determined that a level-3 processing frame quantity corresponding to the quantity of the 3rd time of photographing is 6 frames. The 6 frames are a second frame quantity, and the second frame quantity is the same as the first frame quantity. The 6 frames are all the 6 frames of raw images collected corresponding to the quantity of the 3rd time of photographing.

When the mobile phone detects a 4th time of tap operation of the user, the mobile phone collects a raw image once by using the camera in response to this time of tap operation, which is still 6 frames of raw images. A quantity of this time of photographing may be recorded as a quantity of a 4th time of photographing.

Because the quantity of this time of photographing corresponds to the quantity of the 4th time of photographing, where x is greater than 1, a device temperature may be detected and it is determined whether the device temperature is less than the temperature threshold. If the device temperature is less than the temperature threshold, the mobile phone continues to determine a memory occupation amount at this time. The memory occupation amount at this time is greater than the second memory threshold. Therefore, it can be determined that a level-4 processing algorithm corresponding to the quantity of the 4th time of photographing is a third photographing algorithm. The preset third photographing algorithm is different from the second photographing algorithm and the first photographing algorithm, and processing duration of the third photographing algorithm is shorter than the processing duration of the second photographing algorithm. The third photographing algorithm is, for example, a fourth MFNR algorithm. In addition, it may be determined that a level-4 processing frame quantity corresponding to the quantity of the 4th time of photographing is 6 frames. The 6 frames are a third frame quantity, and the third frame quantity is the same as the second frame quantity and the first frame quantity. The 6 frames are all the 6 frames of raw images collected corresponding to the quantity of the 4th time of photographing.

When the mobile phone detects a 5th time of tap operation of the user, the mobile phone collects a raw image once by using the camera in response to this time of tap operation, which is still 6 frames of raw images. A quantity of this time of photographing may be recorded as a quantity of a 5th time of photographing.

Because the quantity of this time of photographing corresponds to the quantity of the 5th time of photographing, where x is greater than 1, a device temperature may be detected and it is determined whether the device temperature is less than the temperature threshold. If the device temperature is greater than the temperature threshold, there is no need to determine a memory occupation amount, and a processing algorithm at this time is directly determined as a single-frame algorithm. A processing frame quantity is 1 frame. The 1 frame is 1 frame of raw image in the 6 frames of raw images collected corresponding to the quantity of the 5th time of photographing.

A processing process of a quantity of subsequent photographing is deduced by analogy. Details are not described herein again.

For example, the first MFNR algorithm may refer to a process of first aligning a plurality of frames of raw images, and then processing an aligned raw image by using a wavelet fusion algorithm. The second MFNR algorithm may be an optical flow algorithm, and the third MFNR algorithm and the fourth MFNR algorithm are other algorithms. This is not limited in this embodiment of this application.

In the foregoing embodiment, when the to-be-shot scene is the scene with high brightness and a low dynamic range, it indicates that ambient light in the to-be-shot scene is relatively strong, but a dynamic range is relatively small. In this case, if a normal photographing algorithm is used for processing, an obtained shot image has relatively large noise and a relatively small dynamic range. For this reason, in this embodiment of this application, the MFNR algorithm may be selected for processing, to reduce noise in the shot image and improve a dynamic range of the shot image.

On this basis, based on dividing a memory size into a plurality of interval ranges, in a process of a plurality of times of photographing, processing duration of processing algorithms determined for quantities of photographing corresponding to different memory ranges gradually decreases as memory occupation amounts increase. In this case, although the selected processing frame quantity is the same, during subsequent processing, because the processing duration of the processing algorithm gradually becomes shorter, an increase speed of the memory occupation amount levels off. Therefore, in this embodiment of this application, for the quantities of the plurality of times of photographing, the processing duration or performance of the processing algorithm corresponding to the quantity of each time of photographing may decrease or degrade based on the same processing frame quantity as the quantity of photographing increases. This can improve processing efficiency, reduce an increase speed of the memory occupation amount, and reduce a pressure from a memory increment.

In addition, when the device temperature is higher than the temperature threshold, the single-frame algorithm may be directly switched to process the 1 frame of the raw image, to reduce workload, slow down an amplitude of a heat increase, and reduce pressure from a heat increment, so that the mobile phone implements quantities of some more times of photographing, to meet a photographing requirement of the user.

Embodiment 3

Figure 17:
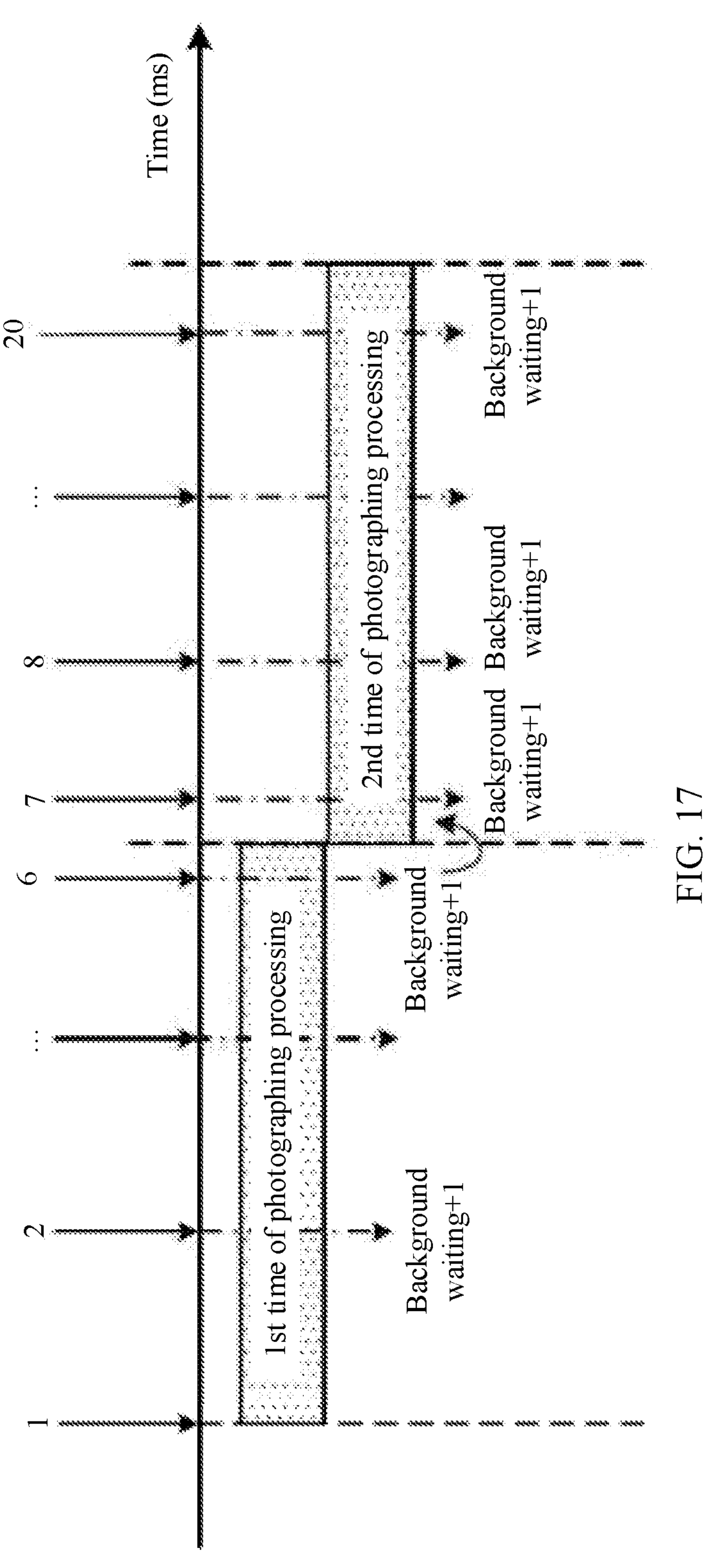
FIG. 17 is a schematic diagram of a processing process corresponding to FIG. 16A to FIG. 16C.

FIG. 16A to FIG. 16C show still another table according to an embodiment of this application, which is used to illustrate a processing algorithm and a processing frame quantity corresponding to a quantity of each time of photographing. FIG. 17 is a schematic diagram of a processing process corresponding to FIG. 16A to FIG. 16C.

With reference to FIG. 5, when a user enables a camera application to perform video recording, a mobile phone displays a video recording interface, and the video recording interface includes a snapshot control. The user performs a plurality of times of tap operations on the snapshot control by using a finger while performing video recording.

When the mobile phone detects a 1st time of tap operation of the user, the mobile phone collects a raw image once by using a camera in response to this time of tap operation, for example, collects 9 frames of raw images. The 9 frames of raw images include 6 frames of normal-exposure raw images, 1 frame of long-exposure raw image, and 2 frames of short-exposure raw images. A quantity of this time of photographing may be recorded as a quantity of a 1st time of photographing.

Because this time of tap operation corresponds to the quantity of the 1st time of photographing, the mobile phone performs environment detection on a to-be-shot scene, for example, performs lightness detection and dynamic range detection. In this case, based on a detection result, it is further determined whether detected lightness is less than a lightness threshold, and it is further determined whether a detected dynamic range value is less than a dynamic range threshold.

When the lightness is greater than the lightness threshold and the dynamic range value is greater than the dynamic range threshold, or when the to-be-shot scene is a scene with high brightness and a high dynamic range, as shown in FIG. 16A, a level-1 processing algorithm may be determined as a C1 algorithm. The C1 algorithm is a first HDR algorithm. In addition, it may be determined that a level-1 processing frame quantity corresponding to the quantity of the 1st time of photographing is 9 frames. The 9 frames are all the 9 frames of raw images collected corresponding to the quantity of the 1st time of photographing.

The first HDR algorithm may include an HDR algorithm module, and the electronic device may implement a processing process of the first HDR algorithm by using the HDR algorithm module.

For example, based on multi-exposure fusion processing and tone mapping model generation, the first HDR algorithm module may fuse a plurality of frames of raw images with different exposure values or different exposure degrees into one frame of image located in a RAW domain, and perform mapping conversion processing on a color of the image. A tone mapping model may be any one of a Unet network model, a Resnet network model, and an Hdrnet network model. Certainly, the tone mapping model may alternatively be another model. This is not limited in this embodiment of this application.

In this case, with reference to FIG. 17, the background starts to process the level-1 processing frame quantity by using the first HDR algorithm determined for the quantity of the 1st time of photographing, that is, process all the 9 frames of raw images collected corresponding to the quantity of the 1st time of photographing. This process may be referred to as 1st time of photographing processing.

When the mobile phone detects a 2nd time of tap operation of the user, the mobile phone collects a raw image once by using the camera in response to this time of tap operation, which is still 9 frames of raw images. The 9 frames of raw images include 7 frames of normal-exposure raw images, 1 frame of long-exposure raw image, and 1 frame of short-exposure raw image. A quantity of this time of photographing may be recorded as a quantity of a 2nd time of photographing.

Because the quantity of this time of photographing corresponds to the quantity of the 2nd time of photographing, where x is greater than 1, the mobile phone may then determine whether a frequency at which the user performs the tap operation on the snapshot control meets a preset frequency condition. If the frequency does not meet the preset frequency condition, the mobile phone continues to determine a memory occupation amount. In addition, because the memory occupation amount at this time is less than a first memory threshold, it can be determined that a level-2 processing algorithm corresponding to the quantity of the 2nd time of photographing is a first photographing algorithm. The first photographing algorithm is, for example, a second HDR algorithm, and the second HDR algorithm is different from the first HDR algorithm. In addition, it may be determined that a level-2 processing frame quantity corresponding to the quantity of the 2nd time of photographing is 8 frames. The 8 frames are a first frame quantity. The 8 frames are 5 frames of normal-exposure raw images, the 1 frame of the long-exposure raw image, and 2 frames of short-exposure raw images that are in the 9 frames of raw images collected corresponding to the quantity of the 2nd time of photographing. Alternatively, the 8 frames are 5 frames of normal-exposure raw images in the 9 frames of raw images collected corresponding to the quantity of the 2nd time of photographing, and refer to multiplexing the 1 frame of the long-exposure raw image and the 2 frames of short-exposure raw images that are collected for the quantity of the 1st time of photographing. Alternatively, the 8 frames refer to multiplexing the 1 frame of the long-exposure raw image and the 2 frames of short-exposure raw images that are collected for the quantity of the 1st time of photographing, and 5 frames of normal-exposure raw images whose collection time is relatively close to that of the long-exposure raw image or the short-exposure raw image.

It should be noted that, when the user taps a photographing quantity very quickly, that is, a frequency of triggering a photographing command is relatively high, a content difference between images is relatively small. Therefore, in this case, the raw images collected for the quantity of the 1st time of photographing may be partially multiplexed or all multiplexed. In this way, the electronic device does not need to re-output a frame, reducing workload and the memory occupation amount.

Subsequent processes of a quantity of a 3rd time of photographing to a quantity of a 5th time of photographing are similar to the foregoing process of determining the quantity of the 2nd time of photographing. Details are not described herein again.

When the mobile phone detects a 6th time of tap operation of the user, the mobile phone collects a raw image once by using the camera in response to this time of tap operation, which is still 9 frames of raw images. The 9 frames of raw images include 6 frames of normal-exposure raw images, 1 frame of long-exposure raw image, and 2 frames of short-exposure raw images. A quantity of this time of photographing may be recorded as a quantity of a 6th time of photographing.

Because the quantity of this time of photographing corresponds to the quantity of the 6th time of photographing, where x is greater than 1, the mobile phone may then determine whether a frequency at which the user performs the tap operation on the snapshot control meets the preset frequency condition. If the frequency does not meet the preset frequency condition, the mobile phone continues to determine a memory occupation amount at this time. The memory occupation amount at this time is greater than the first memory threshold but less than a second memory threshold. Therefore, it can be determined that a level-6 processing algorithm corresponding to the quantity of the 6th time of photographing is a second photographing algorithm. The preset second photographing algorithm is different from the first photographing algorithm, and processing duration of the second photographing algorithm is shorter than processing duration of the first photographing algorithm. The second photographing algorithm is, for example, a third HDR algorithm, and the third HDR algorithm is different from the first HDR algorithm and the second HDR algorithm. In addition, it may be determined that a level-6 processing frame quantity corresponding to the quantity of the 6th time of photographing is 7 frames. The 7 frames are a second frame quantity, and the second frame quantity is less than the first frame quantity. The 7 frames are 4 frames of normal-exposure raw images, the 1 frame of the long-exposure raw image, and the 2 frames of short-exposure raw images that are in the 9 frames of raw images collected corresponding to the quantity of the 6th time of photographing. Alternatively, the 7 frames are 4 frames of normal-exposure raw images in the 9 frames of raw images collected corresponding to the quantity of the 6th time of photographing, and refer to multiplexing the 1 frame of the long-exposure raw image and the 2 frames of short-exposure raw images that are collected for the quantity of the 1st time of photographing. Alternatively, the 7 frames refer to multiplexing the 1 frame of the long-exposure raw image and the 2 frames of short-exposure raw images that are collected for the quantity of the 1st time of photographing, and 5 frames of normal-exposure raw images whose collection time is relatively close to that of the long-exposure raw image or the short-exposure raw image.

With reference to FIG. 17, when the user performs the 2nd time to the 6th time of tap operations, because 1st time of photographing processing is still in progress, related data such as all the raw images collected corresponding to the quantities of the 2nd time to the 6th time of photographing, a determined processing algorithm at each level, and a determined processing frame quantity at each level can be only stored to enter a background waiting state.

Then, after 1st time of photographing processing ends, for the quantities of the 2nd time to the 6th time of photographing waiting in the background, data related to the quantity of the 6th time of photographing is first processed according to a principle of time from close to far. For the quantity of the 6th time of photographing, the background starts to process the 7 frames of raw images by using the determined third HDR algorithm, to be specific, process the 4 frames of normal-exposure raw images, the 1 frame of long-exposure raw image, and the 2 frames of short-exposure raw images collected corresponding to the quantity of the 6th time of photographing. This process may be referred to as 2nd time of photographing processing.

Then, while the data related to the quantity of the 6th time of photographing is processed, when the mobile phone detects a 7th time of tap operation of the user, the mobile phone collects a raw image once by using the camera in response to this time of tap operation, which is still 9 frames of raw images. The 9 frames of raw images include 6 frames of normal-exposure raw images, 1 frame of long-exposure raw image, and 2 frames of short-exposure raw images. A quantity of this time of photographing may be recorded as a quantity of a 7th time of photographing.

Because the quantity of this time of photographing corresponds to the quantity of the 7th time of photographing, where x is greater than 1, the mobile phone may then determine whether a frequency at which the user performs the tap operation on the snapshot control meets the preset frequency condition. If the frequency meets the preset frequency condition, in this case, it is necessary to abandon protecting a dynamic range, and a non-HDR algorithm that processes only a normal-exposure raw image is switched. For example, a memory occupation amount at this time may be determined. If the memory occupation amount at this time is greater than the first memory threshold but less than the second memory threshold, in this case, a level-7 processing algorithm corresponding to the quantity of the 7th time of photographing may be switched from the third HDR algorithm to a third MFNR algorithm. In addition, it may be determined that a level-7 processing frame quantity corresponding to the quantity of the 7th time of photographing is 4 frames of normal-exposure raw images, and another long-exposure raw image and short-exposure raw image are removed.

In addition, because the frequency meets the preset frequency condition, it may be further determined that in this case, quantities of photographing waiting in the background are the quantity of the 2nd time of photographing to the quantity of the 5th time of photographing. Based on this, a previously stored processing algorithm corresponding to each of the quantities of the 2nd time to the 5th time of photographing may be used as an initial processing algorithm, and the level-7 processing algorithm determined for the quantity of the 7th time of photographing is used as a target processing algorithm. Then, the initial processing algorithm corresponding to the quantity of waiting photographing is replaced by using the target processing algorithm.

As shown in FIG. 16B, the level-7 processing algorithm determined for the quantity of the 7th time of photographing is the third MFNR algorithm, and in this case, the third MFNR algorithm is the target processing algorithm. With reference to FIG. 16A, the second HDR algorithm originally corresponding to the quantity of the 2nd time of photographing is the initial processing algorithm. After the initial processing algorithm is replaced by using the target processing algorithm, the level-2 processing algorithm corresponding to the quantity of the 2nd time of photographing changes to the third MFNR algorithm. A replacement process of the quantities of the 3rd time to the 5th time of photographing is similar. Details are not described herein again.

With reference to FIG. 17, when the user performs the 7th time of tap operation, because 2nd time of photographing processing is still in progress, related data such as all the raw images collected corresponding to the quantity of the 7th time of photographing, the determined level-7 processing algorithm, and the determined level-7 processing frame quantity can be only stored to enter a background waiting state.

When the mobile phone detects an 8th time of tap operation of the user, the mobile phone collects a raw image once by using the camera in response to this time of tap operation, which is still 9 frames of raw images. The 9 frames of raw images include 6 frames of normal-exposure raw images, 1 frame of long-exposure raw image, and 2 frames of short-exposure raw images. A quantity of this time of photographing may be recorded as a quantity of an 8th time of photographing.

Because the quantity of this time of photographing corresponds to the quantity of the 8th time of photographing, where x is greater than 1, the mobile phone may then determine whether a frequency at which the user performs the tap operation on the snapshot control meets the preset frequency condition. If the frequency meets the preset frequency condition, in this case, it is necessary to abandon protecting a dynamic range, and a non-HDR algorithm that processes only a normal-exposure raw image is switched. For example, a memory occupation amount at this time may be determined. If the memory occupation amount at this time is greater than the second memory threshold, in this case, a level-8 processing algorithm corresponding to the quantity of the 8th time of photographing may be switched from the third HDR algorithm to a fourth MFNR algorithm. The fourth MFNR algorithm is different from the third MFNR algorithm. In addition, it may be determined that a level-8 processing frame quantity corresponding to the quantity of the 8th time of photographing is 3 frames of normal-exposure raw images, and another long-exposure raw image and short-exposure raw image are removed.

In addition, because the frequency meets the preset frequency condition, it may be further determined that in this case, quantities of photographing waiting in the background are the quantity of the 2nd time of photographing to the quantity of the 5th time of photographing, and the quantity of the 7th time of photographing. Based on this, a processing algorithm that is obtained after last replacement and that is of the quantity of the 2nd time of photographing to the quantity of the 5th time of photographing may be used as an initial processing algorithm, the level-7 processing algorithm determined for the quantity of the 7th time of photographing is used as an initial processing algorithm, and the level-8 processing algorithm determined for the quantity of the 8th time of photographing is used as a target processing algorithm. Then, the initial processing algorithm corresponding to the quantity of waiting photographing is replaced by using the target processing algorithm.

With reference to FIG. 16C, the level-8 processing algorithm determined for the quantity of the 8th time of photographing is the fourth MFNR algorithm, and the fourth MFNR algorithm is the target processing algorithm. The third MFNR algorithm originally corresponding to the quantity of the 2nd time of photographing is the initial processing algorithm. After the initial processing algorithm is replaced by using the target processing algorithm, the level-2 processing algorithm corresponding to the quantity of the 2nd time of photographing changes to the fourth MFNR algorithm. A replacement process of the quantities of the 3rd time to the 5th time, and the 7th time of photographing is similar. Details are not described herein again.

With reference to FIG. 17, when the user performs the 8th time of tap operation, because 2nd time of photographing processing is still in progress, related data such as all the raw images collected corresponding to the quantity of the 8th time of photographing, the determined level-8 processing algorithm, and the determined level-8 processing frame quantity can be only stored to enter a background waiting state.

Then, when the user performs a 9th time of tap operation to a 20th time of tap operation, a processing algorithm corresponding to a quantity of photographing waiting in the background may continue to be replaced by using, as a target processing algorithm, a level-x processing algorithm corresponding to a quantity of photographing most recently determined. When the quantity of photographing waiting in the background is processed, processing may be performed based on a processing algorithm obtained after last replacement.

In the foregoing embodiment, in this application, processing algorithms and processing frame quantities of quantities of photographing in different cases change with reference to a plurality of types of factors such as the environment detection result of the to-be-shot scene, a user operation frequency, and the memory occupation amount.

On this basis, processing cannot be performed in a timely manner when there is a relatively large quantity of photographing. Therefore, in this application, the processing algorithm of the quantity of waiting photographing is further replaced in a timely manner with a most recently determined processing algorithm. In this way, processing can be performed by using latest data as a reference, to adapt to a current memory condition as much as possible, reduce a memory increment, and implement more times of continuous and fast photographing.

The foregoing describes in detail the photographing method provided in the embodiments of this application. With reference to a display interface of an electronic device, the following describes how a user enables the photographing method provided in the embodiments of this application.

Figure 18A:
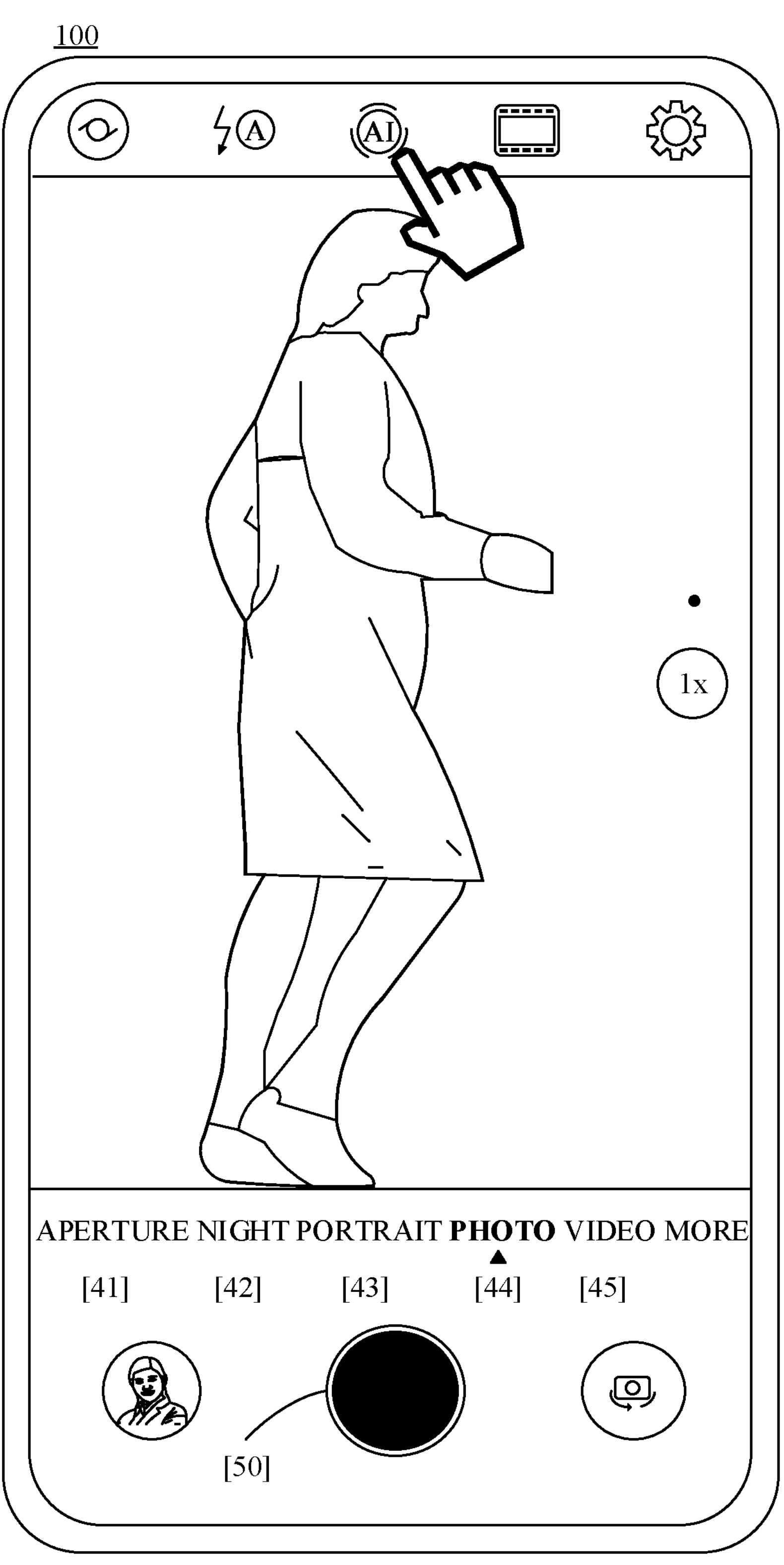
FIG. 18A and FIG. 18B are a schematic diagram of a display interface of an electronic device according to an embodiment of this application.
Figure 18B:
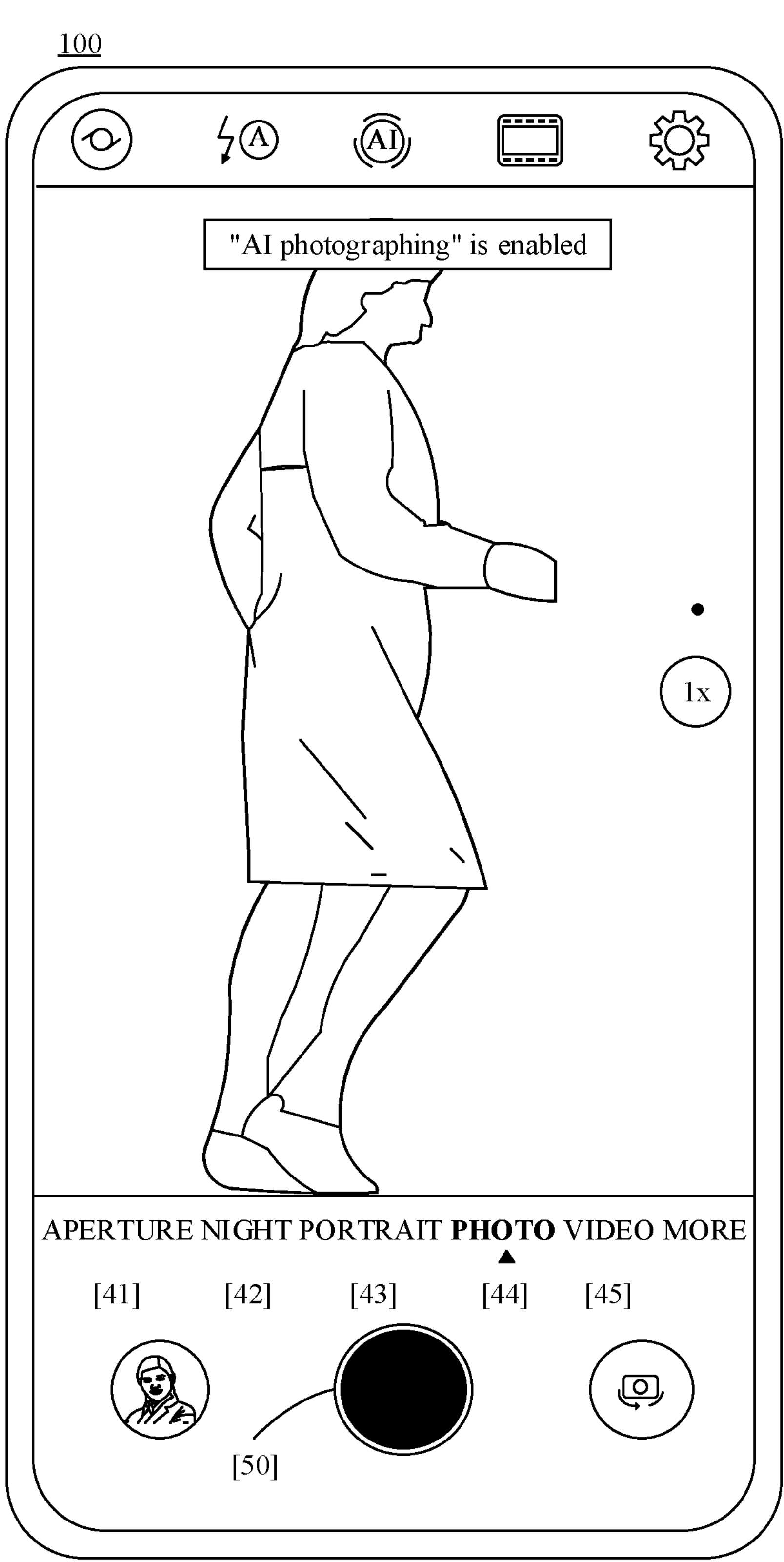

FIG. 18A and FIG. 18B are a schematic diagram of a display interface of an electronic device according to an embodiment of this application.

For example, when an electronic device 100 runs a camera application in response to a tap operation of a user, the electronic device 100 displays a photographing interface shown in FIG. 18A. A navigation bar is displayed on an upper part of the interface, and an icon used to indicate "AI photographing" is displayed at a middlemost location.

In response to a tap operation performed by the user on the "AI photographing", the electronic device 100 displays a prompt box shown in FIG. 18B, and displays, in the interface, prompt information that "AI photographing" is enabled. In this case, the electronic device 100 may enable, when performing photographing, a program related to the photographing method provided in the embodiments of this application.

It should be understood that the foregoing provides only an example in which the user enables the photographing method provided in the embodiments of this application from the display interface of the electronic device. Certainly, the photographing method provided in the embodiments of this application may be enabled in another manner, or the photographing method provided in the embodiments of this application may be directly used in a photographing process by default. This is not limited in this embodiment of this application.

Figure 19A:
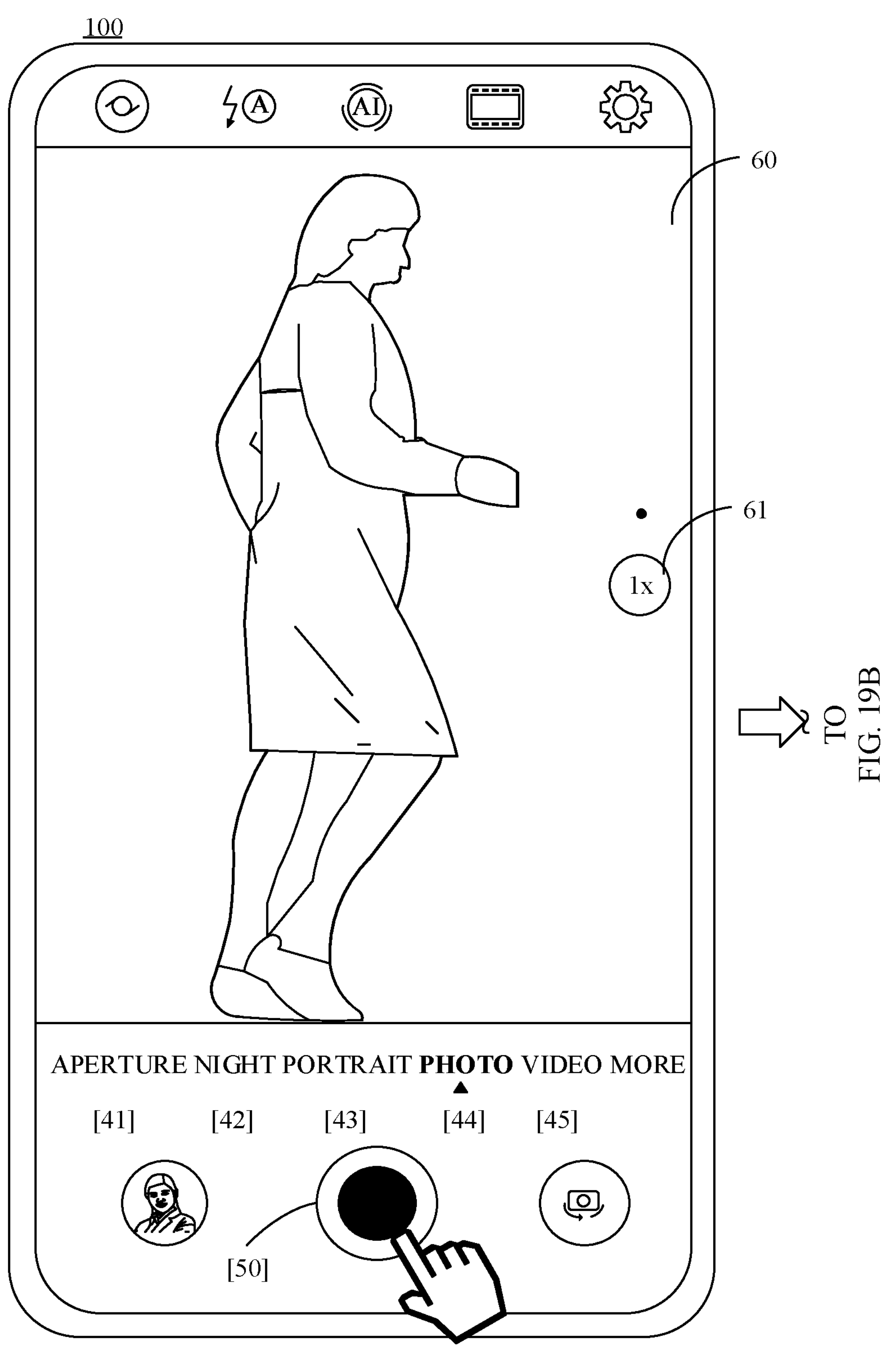
FIG. 19A and FIG. 19B are a schematic diagram of another display interface of an electronic device according to an embodiment of this application.
Figure 19B:
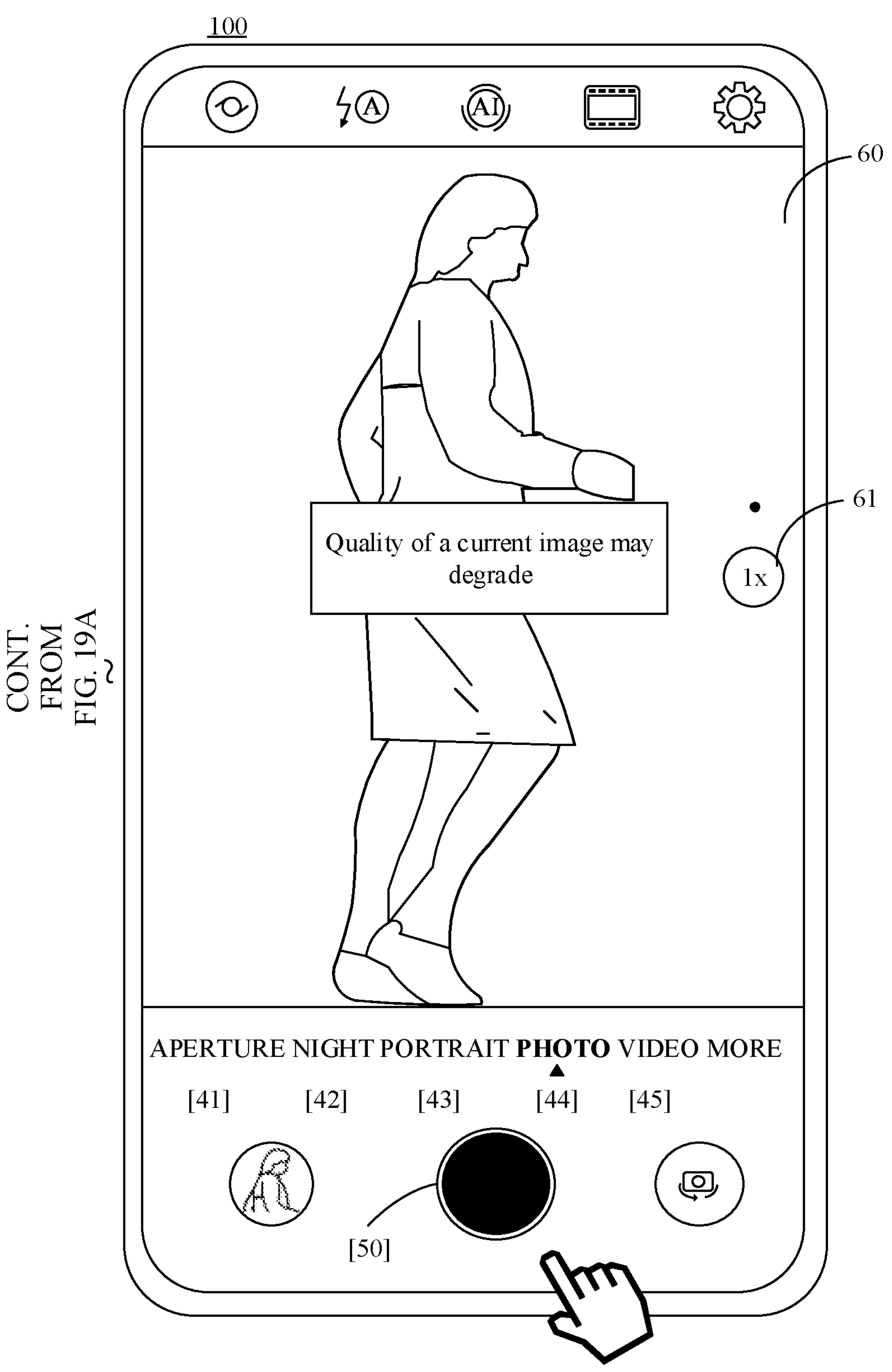

FIG. 19A and FIG. 19B are a schematic diagram of another display interface of an electronic device according to an embodiment of this application.

With reference to FIG. 18A and FIG. 18B and FIG. 19A and FIG. 19B, after "AI photographing" is enabled, if the user enables the camera application and quickly and continuously taps a photographing key in the photographing interface for a plurality of times, in a process of this tapping, because the background performs processing by using the photographing method provided in the embodiments of this application, a processing algorithm with shorter processing duration and/or fewer processing frame quantities is used to perform processing when a memory occupation amount increases. Therefore, quality of a shot image obtained after subsequent processing degrades to some extent. For this reason, to prompt the user that picture quality changes, a prompt that "picture quality of a current image may degrade" may be displayed on a preview image in the photographing interface.

Certainly, the foregoing is only an example. Another prompt may alternatively be displayed to prompt the user. Alternatively, no prompt may be displayed. Alternatively, the user may be reminded in another manner. This is not limited in this embodiment of this application.

Figure 20:
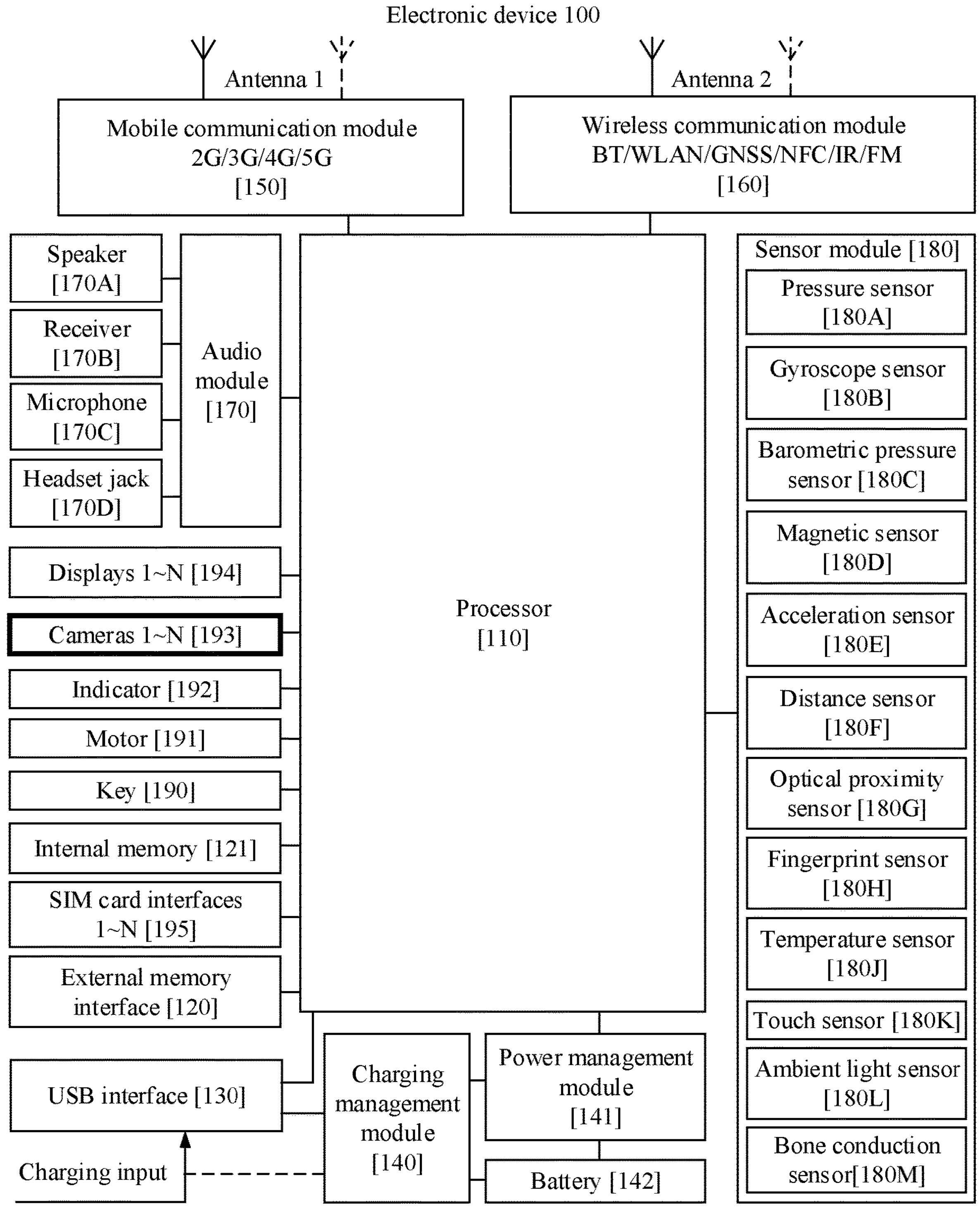
FIG. 20 is a schematic diagram of a hardware structure of an electronic device according to an embodiment of this application.

With reference to FIG. 1 to FIG. 19A and FIG. 19B, the foregoing describes in detail the photographing method and the related display interface that are provided in the embodiments of this application. The following describes in detail an electronic device, an apparatus, and a chip provided in embodiments of this application with reference to FIG. 20 to FIG. 23. FIG. 20 shows a hardware system of an electronic device applicable to this application.

An electronic device 100 may be a mobile phone, a smart screen, a tablet computer, a wearable electronic device, an onboard electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that, the structure shown in FIG. 20 does not constitute a specific limitation on the electronic device 100. In some other embodiments of this application, the electronic device 100 may include more or fewer components than those shown in FIG. 20, or the electronic device 100 may include a combination of some of the components shown in FIG. 20, or the electronic device 100 may include sub-components of some of the components shown in FIG. 20. The components shown in FIG. 20 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and a neural-network processing unit (neural-network processing unit, NPU). Different processing units may be independent devices, or may be an integrated device. The controller may generate an operation control signal based on instruction operation code and a timing signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

For example, the processor 110 may be configured to perform the photographing method in the embodiments of this application. The photographing method includes: displaying a first interface, where the first interface includes a first control; when a first operation on the first control is detected, collecting a raw image once in response to the first operation; determining a memory occupation amount for a quantity of an xth time of photographing; when the memory occupation amount is less than a first memory threshold, determining a level-x processing algorithm as a first photographing algorithm, and determining a level-x processing frame quantity as a first frame quantity, where x is an integer greater than 1; when the memory occupation amount is greater than or equal to the first memory threshold but less than a second memory threshold, determining the level-x processing algorithm as a second photographing algorithm, and determining the level-x processing frame quantity as a second frame quantity; or when the memory occupation amount is greater than the second memory threshold, determining the level-x processing algorithm as a third photographing algorithm, and determining the level-x processing frame quantity as a third frame quantity, where the first memory threshold is less than the second memory threshold; processing the level-x processing frame quantity in the raw image by using the level-x processing algorithm to obtain a corresponding shot image; and saving the shot image.

A connection relationship between the modules shown in FIG. 20 is an example for description and does not constitute a limitation on the connection relationship between the modules of the electronic device 100. Optionally, the modules of the electronic device 100 may alternatively use a combination of a plurality of connection manners in the foregoing embodiments.

The charging management module 140 is configured to receive a charging input from a charger. The charger may be a wireless charger or a wired charger.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 is further configured to detect parameters such as a battery capacity, a quantity of battery cycles, and a battery health status (leakage or impedance).

The electronic device 100 implements a display function by using the GPU, the display 194, the application processor, and the like. The GPU is a microprocessor for image processing and is connected to the display 194 and the application processor. The GPU is configured to perform mathematical and geometric calculation for graphics rendering. The processor 110 may include one or more GPUs, and the one or more GPUs execute program instructions to generate or change displayed information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode or active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, light is transmitted to a photosensitive element of the camera through a lens, an optical signal is converted into an electrical signal, and the photosensitive element of the camera transmits the electrical signal to the ISP for processing, to convert the electrical signal into an image visible to naked eyes. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a still image or a video, and may be enabled through triggering by using an application instruction, to implement a photographing function, for example, obtaining an image of any scene through photographing. The camera may include parts such as an imaging lens, a light filter, and an image sensor. Light emitted or reflected by an object enters the imaging lens, passes through the light filter, and finally converges on the image sensor. The imaging lens is mainly configured to converge and image light emitted or reflected by all objects (which may also be referred to as a to-be-shot scene or a target scene, or may be understood as a scene image expected to be shot by a user) in an angle of view for photographing. The light filter is mainly configured to filter out excess light waves (for example, light waves other than visible light, such as infrared) in light. The image sensor may be a charge coupled device (charge coupled device, CCD) or a complementary metal-oxide-semiconductor (complementary metal-oxide-semiconductor, CMOS) phototransistor. The image sensor is mainly configured to perform photoelectric conversion on a received optical signal to convert the received optical signal into an electrical signal, and then transmit the electrical signal to the ISP to convert the electrical signal into a digital image signal. The ISP outputs the digital image signal to the DSP for processing. The DSP converts the digital image signal into an image signal in a standard format, for example, RGB or YUV In some embodiments, the electronic device 100 may include one or N cameras 193, where N is a positive integer greater than 1.

The camera 193 may be located on a front of the electronic device 100 or may be located on a back of the electronic device 100. A specific quantity and arrangement of cameras may be set as required, which are not limited in this application.

For example, the electronic device 100 includes a front-facing camera and a rear-facing camera. For example, the front-facing camera or the rear-facing camera may each include one or more cameras. For example, the electronic device 100 includes 4 rear-facing cameras. In this way, when the electronic device 100 enables the 4 rear-facing cameras for photographing, the photographing method provided in the embodiments of this application may be used. Alternatively, the camera is disposed on an external component of the electronic device 100. The external component is rotatably connected to a frame of the mobile phone, and an angle formed between the external component and the display 194 of the electronic device 100 is any angle between 0-360 degrees. For example, when the electronic device 100 is in self-photographing, the external component drives the camera to rotate to a location toward the user. Certainly, when the mobile phone has a plurality of cameras, only some of the cameras may be disposed on the external component, and the remaining cameras may be disposed on a body of the electronic device 100. This is not limited in this embodiment of this application.

The digital signal processor is configured to process a digital signal, and may process another digital signal in addition to a digital image signal. For example, when the electronic device 100 selects a frequency, the digital signal processor is configured to perform Fourier transform and the like on frequency energy.

The internal memory 121 may be configured to store computer-executable program code, and the executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) and the like created in a use process of the electronic device 100. In addition, the internal memory 121 may include a high-speed random access memory, and may further include a non-volatile memory, for example, at least one disk storage device, a flash memory device, or a universal flash storage (universal flash storage, UFS). The processor 110 performs various function applications and data processing of the electronic device 100 by running the instructions stored in the internal memory 121 and/or instructions stored in the memory disposed in the processor.

The internal memory 121 may further store software code of the photographing method provided in the embodiments of this application. When the processor 110 runs the software code, the procedure steps of the photographing method are performed, to implement fast and continuous photographing.

The internal memory 121 may further store a shot image.

The external memory interface 120 may be configured to connect to an external memory card, for example, a Micro SD card, to expand a storage capability of the electronic device 100. The external memory card communicates with the processor 110 by using the external memory interface 120, to implement a data storage function, for example, files such as music are stored in the external memory card.

Certainly, the software code of the photographing method provided in the embodiments of this application may alternatively be stored in an external memory. The processor 110 may run the software code by using the external memory interface 120 to perform the procedure steps of the photographing method to obtain a plurality of frames of shot images. The shot image obtained by the electronic device 100 may alternatively be stored in the external memory.

It should be understood that the user may specify whether the image is stored in the internal memory 121 or the external memory. For example, when the electronic device 100 is connected to the external memory, if the electronic device 100 shoots 1 frame of image, prompt information may be popped up to prompt the user whether to store the image in the external memory or the internal memory. Certainly, there may be other manners for specifying, which are not limited in this embodiment of this application. Alternatively, when the electronic device 100 detects that a memory amount of the internal memory 121 is less than a preset amount, the image may be automatically stored in the external memory.

The electronic device 100 may implement an audio function by using the audio module 170, the speaker 170A, the receiver 170B, the microphone 170C, the headset jack 170D, the application processor, and the like. For example, music playing and audio recording is implemented.

The pressure sensor 180A is configured to sense a pressure signal, and may convert the pressure signal into an electrical signal. In some embodiments, the pressure sensor 180A may be disposed on the display 194.

The gyroscope sensor 180B may be configured to determine a motion posture of the electronic device 100. In some embodiments, angular velocities of the electronic device 100 around three axes (namely, an x axis, a y axis, and a z axis) may be determined by using the gyroscope sensor 180B. The gyroscope sensor 180B may be configured to implement image stabilization during photographing.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening/closing of a flip leather case by using the magnetic sensor 180D. In some embodiments, when the electronic device 100 is a flip phone, the electronic device 100 may detect opening/closing of a flip cover based on the magnetic sensor 180D, and further set features such as automatic unlocking of the flip cover based on a detected opening/closing state of the leather case or a detected opening/closing state of the flip cover.

The acceleration sensor 180E may detect magnitudes of acceleration in various directions (usually on three axes) of the electronic device 100, may detect a magnitude and a direction of gravity when the electronic device 100 is still, and may be further configured to identify a posture of the electronic device, and is applied to applications such as switching between a landscape mode and a portrait mode and a pedometer.

The distance sensor 180F is configured to measure a distance. The electronic device 100 may measure a distance by using infrared or laser. In some embodiments, in a photographing scene, the electronic device 100 may measure a distance by using the distance sensor 180F, to implement fast focusing.

The optical proximity sensor 180G may include, for example, a light-emitting diode (LED) and an optical detector, for example, a photodiode. The light-emitting diode may be an infrared light-emitting diode. The electronic device 100 emits infrared light to the outside by using the light-emitting diode. The electronic device 100 uses the photodiode to detect reflected infrared light from a nearby object. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to implement automatic screen-off to save power. The optical proximity sensor 180G may alternatively be used in a leather case mode or a pocket mode to automatically unlock or lock a screen.

The ambient light sensor 180L is configured to sense brightness of ambient light. The electronic device 100 may adaptively adjust brightness of the display 194 based on the sensed ambient light brightness. The ambient light sensor 180L may be further configured to automatically adjust white balance during photographing. The ambient light sensor 180L may further cooperate with the optical proximity sensor 180G to detect whether the electronic device 100 is in a pocket to prevent an accidental touch.

The fingerprint sensor 180H is configured to collect a fingerprint. The electronic device 100 may implement fingerprint unlocking, application lock accessing, fingerprint-based photographing, fingerprint-based call answering, and the like by using a feature of the collected fingerprint.

The temperature sensor 180J is configured to detect temperature. In some embodiments, the electronic device 100 executes a temperature processing policy by using the temperature detected by the temperature sensor 180J. For example, when the temperature reported by the temperature sensor 180J exceeds a threshold, the electronic device 100 degrades performance of a processor located near the temperature sensor 180J, to reduce power consumption and implement thermal protection. In some other embodiments, when the temperature is less than another threshold, the electronic device 100 heats the battery 142, to prevent the electronic device 100 from being abnormally powered off due to a low temperature. In some other embodiments, when the temperature is less than still another threshold, the electronic device 100 boosts an output voltage of the battery 142, to avoid abnormal power-off due to a low temperature.

The touch sensor 180K is also referred to as a "touch device". The touch sensor 180K may be disposed on the display 194. The touch sensor 180K and the display 194 form a touchscreen, also referred to as a "touch control screen". The touch sensor 180K is configured to detect a touch operation performed on or near the touch sensor 180K. The touch sensor may transmit the detected touch operation to the application processor to determine a type of a touch event. A visual output related to the touch operation may be provided by using the display 194. In some other embodiments, the touch sensor 180K may alternatively be disposed on a surface of the electronic device 100, at a location different from that of the display 194.

The bone conduction sensor 180M may obtain a vibration signal. In some embodiments, the bone conduction sensor 180M may obtain a vibration signal of a vibration bone in a human vocal-cord part. The bone conduction sensor 180M may also be in contact with a human pulse to receive a blood pressure pulse signal. In some embodiments, the bone conduction sensor 180M may alternatively be disposed in a headset, to form a bone conduction headset in combination with the headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure pulse signal obtained by the bone conduction sensor 180M, to implement a heart rate detection function.

The key 190 includes a power-on/off key, a volume key, and the like. The key 190 may be a mechanical key, or may be a touch key. The electronic device 100 may receive a key input and generate a key signal input related to user settings and function control of the electronic device 100.

The motor 191 may generate a vibration prompt. The motor 191 may be configured to provide a vibration prompt for an incoming call, and may be further configured to provide vibration feedback for a touch. For example, touch operations performed on different applications (for example, photographing and audio playing) may correspond to different vibration feedback effects.

The indicator 192 may be an indicator light, may be configured to indicate a charging status or a power change, and may be further configured to indicate a message, a missed call, a notification, and the like.

The SIM card interface 195 is configured to connect to a SIM card. The SIM card may be inserted into the SIM card interface 195 or removed from the SIM card interface 195 to implement contact with and separation from the electronic device 100.

It may be understood that the structure illustrated in this embodiment of this application constitutes no specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The hardware system of the electronic device 100 is described in detail above, and a software system of the electronic device 100 is described below.

Figure 21:
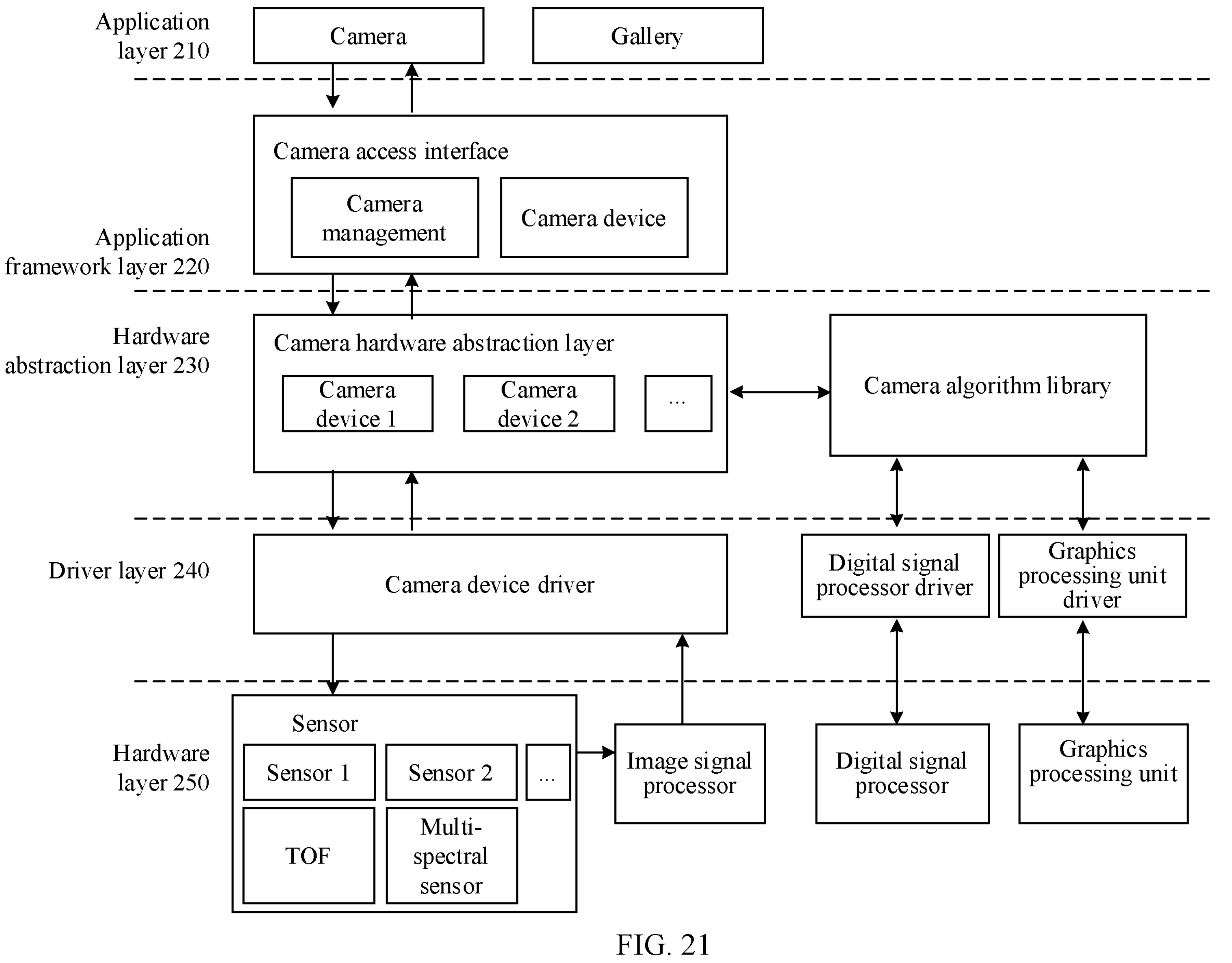
FIG. 21 is a schematic diagram of a software structure of an electronic device according to an embodiment of this application.

FIG. 21 is a schematic diagram of a software system of an electronic device according to an embodiment of this application.

As shown in FIG. 21, a system architecture may include an application layer (application, APP) 210, an application framework layer 220, a hardware abstraction layer (hardware abstract layer, HAL) 230, a driver layer 240, and a hardware layer 250.

The application layer 210 may include a camera application or another application, and the another application includes but is not limited to an application such as a camera or a gallery.

The application layer 210 is at the top of the whole framework and bears a responsibility of directly interacting with a user. Once a direct or indirect requirement of the user such as taking photos is received, the application layer 210 sends the requirement to the application framework layer 220 by using an interface, and waits for the application framework layer 220 to return a processing result. The result includes image data, a camera parameter, and the like. Then, the application layer 210 feeds back the result to the user.

The application framework layer 220 may provide an application programming interface (application programming interface, API) and a programming framework for the application at the application layer. The application framework layer may include some predefined functions.

For example, the application framework layer 220 may include a camera access interface. The camera access interface may include camera management and a camera device. The camera management may be configured to provide an access interface for managing a camera. The camera device may be configured to provide an interface for accessing the camera.

The hardware abstraction layer 230 is configured to perform hardware abstraction. For example, the hardware abstraction layer may include a camera hardware abstraction layer and another hardware device abstraction layer. The camera hardware abstraction layer may include a camera device 1, a camera device 2, and the like. The camera hardware abstraction layer may be connected to a camera algorithm library, and the camera hardware abstraction layer may invoke an algorithm in the camera algorithm library.

In this application, a sensing engine used to perform various types of detection may be disposed at the hardware abstraction layer.

The driver layer 240 is configured to provide a driver for different hardware devices. For example, the driver layer may include a camera device driver, a digital signal processor driver, and a graphics processing unit driver.

The hardware layer 250 may include a plurality of image sensors (sensor), a plurality of image signal processors, digital signal processors, graphics processing units, and other hardware devices.

For example, the hardware layer 250 includes a sensor and an image signal processor. The sensor may include a sensor 1, a sensor 2, a time of flight (time of flight, TOF), a multi-spectral sensor, and the like. The image signal processor may include an image signal processor 1, an image signal processor 2, and the like.

In this application, by invoking a hardware abstraction layer interface at the hardware abstraction layer 230, a connection among the application layer 210 and the application framework layer 220 above the hardware abstraction layer 230, and the driver layer 240 and the hardware layer 250 below may be implemented, to implement camera data transmission and function control.

At a camera hardware interface layer at the hardware abstraction layer 230, a manufacturer may customize a function herein as required. The camera hardware interface layer is more efficient, flexible, and low-latency than the hardware abstraction layer interface, and can also be more abundant to invoke the ISP and the GPU to implement image processing. An image input to the hardware abstraction layer 230 may be from the image sensor, or may be from a stored picture.

A scheduling layer at the hardware abstraction layer 230 includes a generic functional interface for implementing management and control.

A camera service layer at the hardware abstraction layer 230 is configured to access interfaces of the ISP and other hardware.

The following describes example working procedures of software and hardware of the electronic device 100 with reference to a capturing and photographing scene.

The camera application at the application layer may be displayed on a screen of the electronic device 100 in an icon manner. When the icon of the camera application is tapped by the user for triggering, the electronic device 100 starts to run the camera application. When the camera application is run on the electronic device 100, the camera application invokes an interface corresponding to the camera application at the application framework layer 210, and then enables a camera driver by invoking the hardware abstraction layer 230 to enable the camera 193 of the electronic device 100. Simultaneously, the camera algorithm library starts to load the photographing method used in the embodiments of this application.

Then, after one or more frames of raw images are collected by using the image sensor, the collected raw images may be processed by using the image signal processor, then, returned to the hardware abstraction layer, and processed by using a specific processing algorithm invoked from the camera algorithm library, to generate a shot image. Then, the shot image is saved and/or transmitted to the display for display.

Figure 22:
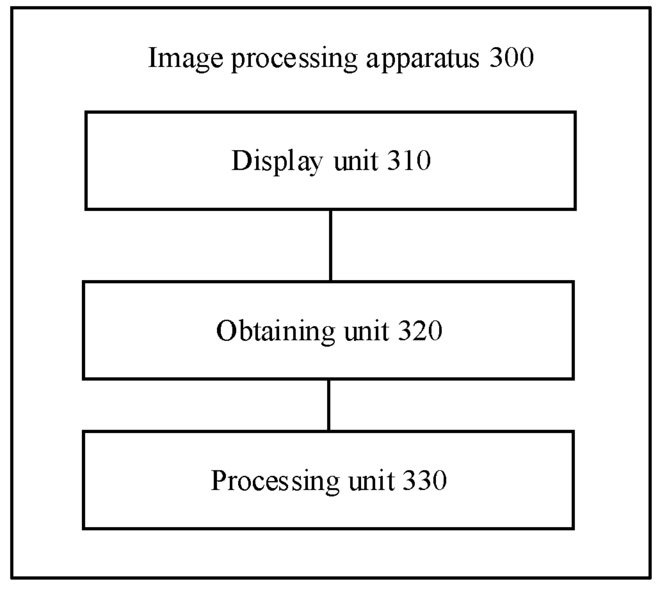
FIG. 22 is a schematic diagram of a structure of an image processing apparatus according to an embodiment of this application.

The following describes an image processing apparatus 300 configured to implement the foregoing photographing method according to an embodiment of this application. FIG. 22 is a schematic diagram of an image processing apparatus 300 according to an embodiment of this application.

As shown in FIG. 22, the image processing apparatus 300 includes a display unit 310, an obtaining unit 320, and a processing unit 330.

The display unit 310 is configured to display a first interface, and the first interface includes a first control.

The obtaining unit 320 is configured to detect a first operation performed by a user on the first control.

The processing unit 330 is configured to collect a raw image once in response to the first operation.

The processing unit 330 is further configured to: determine a memory occupation amount for a quantity of an xth time of photographing; when the memory occupation amount is less than a first memory threshold, determine a level-x processing algorithm as a first photographing algorithm, and determine a level-x processing frame quantity as a first frame quantity, where x is an integer greater than 1; when the memory occupation amount is greater than or equal to the first memory threshold but less than a second memory threshold, determine the level-x processing algorithm as a second photographing algorithm, and determine the level-x processing frame quantity as a second frame quantity; or when the memory occupation amount is greater than the second memory threshold, determine the level-x processing algorithm as a third photographing algorithm, and determine the level-x processing frame quantity as a third frame quantity, where the first memory threshold is less than the second memory threshold; process the level-x processing frame quantity in the raw image by using the level-x processing algorithm to obtain a corresponding shot image; and save the shot image.

It should be noted that the foregoing image processing apparatus 300 is embodied in a form of a functional unit. The term "unit" herein may be implemented in a form of software and/or hardware. This is not specifically limited.

For example, the "unit" may be a software program, a hardware circuit, or a combination of both the software program and the hardware circuit for implementing the foregoing functions. The hardware circuit may include an application specific integrated circuit (application specific integrated circuit, ASIC), an electronic circuit, a processor (for example, a shared processor, a dedicated processor, or a processor group) and a memory configured to execute one or more software or firmware programs, a combinational logic circuit, and/or another proper component that supports the described functions.

Therefore, the units in the examples described in the embodiments of this application can be implemented by electronic hardware, or a combination of computer software and electronic hardware. Whether these functions are performed by hardware or software depends on specific applications and design constraints of the technical solutions. A person skilled in the art may use different methods to implement the described functions for each specific application, but it should not be considered that such an implementation goes beyond the scope of this application.

An embodiment of this application further provides a computer-readable storage medium, and the computer-readable storage medium stores computer instructions. When the computer-readable storage medium runs on the image processing apparatus 300, the image processing apparatus 300 is enabled to perform the foregoing photographing method.

The computer instructions may be stored in a computer-readable storage medium or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) manner or a wireless (for example, infrared, radio, or microwave) manner. The computer-readable storage medium may be any usable medium accessible by a computer, or a data storage device, for example, a server or a data center, integrating one or more usable media. The available medium may be a magnetic medium (for example, a floppy disk, a hard disk, or a magnetic tape), an optical medium, a semiconductor medium (for example, a solid state disk (solid state disk, SSD)), or the like.

An embodiment of this application further provides a computer program product that includes computer instructions. When the computer program product runs on the image processing apparatus 300, the image processing apparatus 300 may perform the foregoing photographing method.

Figure 23:
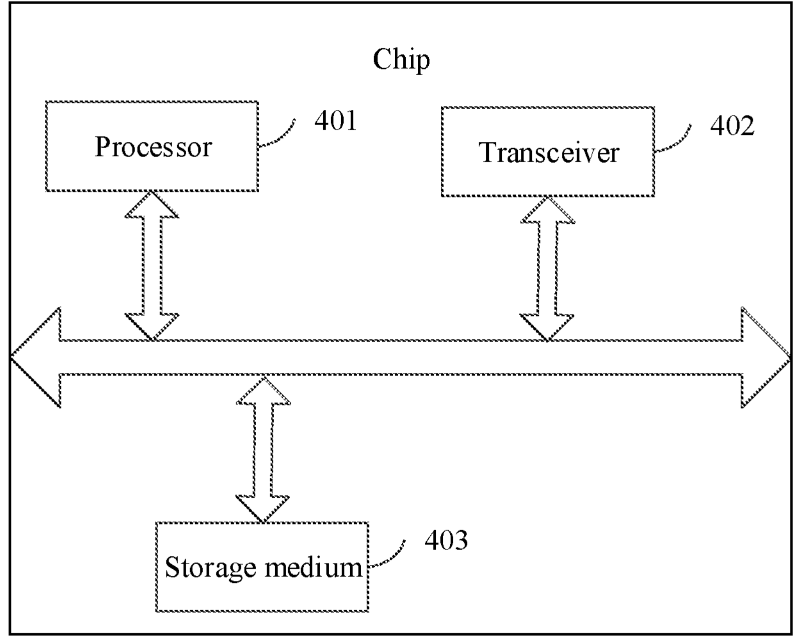
FIG. 23 is a schematic diagram of a structure of a chip according to an embodiment of this application.

FIG. 23 is a schematic diagram of a structure of a chip according to an embodiment of this application. The chip shown in FIG. 23 may be a general-purpose processor, or may be a dedicated processor. The chip includes a processor 401. The processor 401 is configured to support the image processing apparatus 300 to execute the foregoing technical solutions.

Optionally, the chip further includes a transceiver 402. The transceiver 402 is configured to accept control of the processor 401, and is configured to support the image processing apparatus 300 in executing the foregoing technical solutions.

Optionally, the chip shown in FIG. 23 may further include a storage medium 403.

It should be noted that the chip shown in FIG. 23 may be implemented by using the following circuits or devices: one or more field programmable gate arrays (field programmable gate array, FPGA), a programmable logic device (programmable logic device, PLD), a controller, a state machine, gate logic, a discrete hardware component, any other suitable circuit, or any combination of circuits that can perform various functions described in the full text of this application.

The electronic device, the image processing apparatus 300, the computer storage medium, the computer program product, and the chip provided in the embodiments of this application are all configured to perform the method provided above. Therefore, for beneficial effects achieved by the electronic device, the image processing apparatus 300, the computer storage medium, the computer program product, and the chip provided in the embodiments of this application, refer to beneficial effects corresponding to the method provided above. Details are not described herein again.

It should be understood that the foregoing descriptions are intended to help persons skilled in the art better understand the embodiments of this application, but not to limit the scope of the embodiments of this application. Persons skilled in the art may obviously perform various equivalent modifications or changes based on the foregoing examples. For example, some steps in the foregoing embodiments of the detection method may be unnecessary, or some new steps may be added. Alternatively, any two or more of the foregoing embodiments may be combined. Such modifications, changes, or combined solutions also fall within the scope of the embodiments of this application.

It should be further understood that the foregoing descriptions of the embodiments of this application focuses on highlighting differences between the embodiments. For same or similar parts that are not mentioned, reference may be made to each other. For brevity, details are not described herein.

It should be further understood that sequence numbers of the processes do not mean execution sequences. The execution sequences of the processes should be determined based on functions and internal logic of the processes, and should not be construed as any limitation on the implementation processes of the embodiments of this application.

It should be further understood that in the embodiments of this application, "preset" or "predefined" may be implemented by pre-storing a corresponding code or table in a device (for example, including an electronic device), or implemented in a manner that can be used to indicate related information. A specific implementation of "preset" or "predefined" is not limited in this application.

It should be further understood that division of the manners, cases, categories, and embodiments in the embodiments of this application are merely for convenience of description, and should not constitute a special limitation. Various manners, categories, cases, and features in the embodiments may be combined when there is no contradiction.

It should be further understood that in the embodiments of this application, if no special description or logic conflict exists, terms and/or descriptions of different embodiments are consistent and can be mutually referenced, and technical features of different embodiments may be combined based on an internal logical relationship between the different embodiments to form a new embodiment.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A method, comprising:

displaying a first interface that comprises a first control;

collecting raw images in response to a first operation on the first control;

processing a quantity of images in the raw images to obtain a corresponding shot image, wherein the quantity of images is a first frame quantity and the processing is performed with a first photographing algorithm responsive to a memory occupation amount being less than a first memory threshold, wherein the quantity of images is a second frame quantity and the processing is performed with a second photographing algorithm responsive to a memory occupation amount being greater than or equal to the first memory threshold and less that a second memory threshold, and wherein the quantity of images is a third frame quantity and the processing is performed with a third photographing algorithm responsive to a memory occupation amount being greater than the second memory threshold; and saving the shot image, wherein the first frame quantity is greater than the second frame quantity, the second frame quantity is greater than the third frame quantity, wherein the first photographing algorithm, the second photographing algorithm, and the third photographing algorithm are different from each other, and wherein the first, second, and third photographing algorithms being different comprises a duration for processing an image frame with the second photographing algorithm being shorter than a duration for processing the image frame with the first photographing algorithm and a duration for processing the image frame with the third photographing algorithm being shorter than the duration for processing the image frame with the second photographing algorithm.

2. The method of claim 1, further comprising processing, when a temperature of an electronic device is greater than or equal to a temperature threshold, one frame of image in the raw images with a single-frame algorithm to obtain a corresponding shot image, wherein a duration for processing an image frame with the single-frame algorithm is the same as or shorter than the duration for processing the image frame with the third photographing algorithm.

3. The method of claim 2, further comprising:

performing environment detection on a to-be-shot scene in response to the first operation when the first operation corresponds to a quantity of a first time of photographing; and processing images of a processing frame quantity corresponding to the quantity of the first time of photographing with a processing algorithm corresponding to the quantity of the first time of photographing, to obtain a corresponding shot image, wherein the processing frame quantity corresponding to the quantity of the first time of photographing is a frame quantity of raw images collected at the first time of photographing.

4. The method of claim 3, wherein the environment detection comprises at least lightness detection and dynamic range detection, and the environment detection result comprises at least a lightness and a dynamic range value, wherein when the lightness is less than a lightness threshold and the dynamic range value is greater than or equal to a dynamic range threshold, the processing frame quantity is a1 frames, and the processing algorithm is an A1 algorithm, wherein when the lightness is less than the lightness threshold and the dynamic range value is less than the dynamic range threshold, the processing frame quantity is b1 frames, and the processing algorithm is a B1 algorithm, wherein when the lightness is greater than or equal to the lightness threshold and the dynamic range value is greater than or equal to the dynamic range threshold, the processing frame quantity is c1 frames, and the processing algorithm is a C1 algorithm, wherein when the lightness is greater than or equal to the lightness threshold and the dynamic range value is less than the dynamic range threshold, the processing frame quantity is d1 frames, and the processing algorithm is a D1 algorithm, and wherein a1, b1, c1, and d1 are all integers greater than or equal to 1.

5. The method of claim 4, wherein processing images of the processing frame quantity corresponding to the quantity of the first time of photographing with the processing algorithm corresponding to the quantity of the first time of photographing comprises:

processing, when the lightness is less than the lightness threshold and the dynamic range value is greater than or equal to the dynamic range threshold, the a1 frames of images corresponding to the quantity of the first time of photographing with the A1 algorithm to obtain a corresponding shot image;

processing, when the lightness is less than the lightness threshold and the dynamic range value is less than the dynamic range threshold, the b1 frames of images corresponding to the quantity of the first time of photographing with the B1 algorithm to obtain a corresponding shot image;

processing, when the lightness is greater than or equal to the lightness threshold and the dynamic range value is greater than or equal to the dynamic range threshold, the c1 frames of images corresponding to the quantity of the first time of photographing with the C1 algorithm to obtain a corresponding shot image; and processing, when the lightness is greater than or equal to the lightness threshold and the dynamic range value is less than the dynamic range threshold, the d1 frames of images corresponding to the quantity of the first time of photographing with the D1 algorithm to obtain a corresponding shot image.

6. The method of claim 4, further comprising:

determining a quantity of photographing waiting in a background when a frequency of the first operation on the first control meets a preset frequency condition or a difference between a memory water level and the memory occupation amount is less than a preset difference;

separately using a processing algorithm corresponding to each of the quantity of photographing waiting in the background as an initial processing algorithm;

using, as a target processing algorithm, a processing algorithm corresponding to a quantity of photographing most recently determined;

replacing, with the target processing algorithm, the initial processing algorithm of each of the quantity of photographing waiting in the background; and processing, with the target processing algorithm and when a quantity of any time of photographing waiting in the background is invoked for processing, images of a processing frame quantity corresponding to the quantity of the any time of photographing, to obtain a corresponding shot image, wherein the processing frame quantity corresponding to the quantity of the any time of photographing is a frame quantity of raw images collected at the any time of photographing.

7. The method of claim 3, further comprising:

determining a quantity of photographing waiting in a background when a frequency of the first operation on the first control meets a preset frequency condition or a difference between a memory water level and the memory occupation amount is less than a preset difference;

separately using a processing algorithm corresponding to each of the quantity of photographing waiting in the background as an initial processing algorithm;

using, as a target processing algorithm, a processing algorithm corresponding to a quantity of photographing most recently determined;

replacing, with the target processing algorithm, the initial processing algorithm of each of the quantity of photographing waiting in the background; and processing, with the target processing algorithm and when a quantity of any time of photographing waiting in the background is invoked for processing, images of a processing frame quantity corresponding to the quantity of the any time of photographing, to obtain a corresponding shot image, wherein the processing frame quantity corresponding to the quantity of the any time of photographing is a frame quantity of raw images collected at the any time of photographing.

8. The method of claim 1, further comprising:

performing environment detection on a to-be-shot scene in response to the first operation when the first operation corresponds to a quantity of a first time of photographing; and processing images of a processing frame quantity corresponding to the quantity of the first time of photographing with a processing algorithm corresponding to the quantity of the first time of photographing, to obtain a corresponding shot image, wherein the processing frame quantity corresponding to the quantity of the first time of photographing is a frame quantity of raw images collected at the first time of photographing.

9. The method of claim 1, further comprising:

performing environment detection on a to-be-shot scene in response to the first operation when the first operation corresponds to a quantity of a first time of photographing; and processing images of a processing frame quantity corresponding to the quantity of the first time of photographing with a processing algorithm corresponding to the quantity of the first time of photographing, to obtain a corresponding shot image, wherein the processing frame quantity corresponding to the quantity of the first time of photographing is a frame quantity of raw images collected at the first time of photographing.

10. The method of claim 9, wherein the environment detection comprises at least lightness detection and dynamic range detection, and the environment detection result comprises at least a lightness and a dynamic range value, wherein when the lightness is less than a lightness threshold and the dynamic range value is greater than or equal to a dynamic range threshold, the processing frame quantity is a1 frames, and the processing algorithm is an A1 algorithm, wherein when the lightness is less than the lightness threshold and the dynamic range value is less than the dynamic range threshold, the processing frame quantity is b1 frames, and the processing algorithm is a B1 algorithm, wherein when the lightness is greater than or equal to the lightness threshold and the dynamic range value is greater than or equal to the dynamic range threshold, the processing frame quantity is c1 frames, and the processing algorithm is a C1 algorithm, wherein when the lightness is greater than or equal to the lightness threshold and the dynamic range value is less than the dynamic range threshold, the processing frame quantity is d1 frames, and the processing algorithm is a D1 algorithm, and wherein a1, b1, c1, and d1 are all integers greater than or equal to 1.

11. The method of claim 10, wherein processing images of the processing frame quantity corresponding to the quantity of the first time of photographing with the processing algorithm corresponding to the quantity of the first time of photographing comprises:

processing, when the lightness is less than the lightness threshold and the dynamic range value is greater than or equal to the dynamic range threshold, the a1 frames of images corresponding to the quantity of the first time of photographing with the A1 algorithm to obtain a corresponding shot image;

processing, when the lightness is less than the lightness threshold and the dynamic range value is less than the dynamic range threshold, the b1 frames of images corresponding to the quantity of the first time of photographing with the B1 algorithm to obtain a corresponding shot image;

processing, when the lightness is greater than or equal to the lightness threshold and the dynamic range value is greater than or equal to the dynamic range threshold, the c1 frames of images corresponding to the quantity of the first time of photographing with the C1 algorithm to obtain a corresponding shot image; and processing, when the lightness is greater than or equal to the lightness threshold and the dynamic range value is less than the dynamic range threshold, the d1 frames of images corresponding to the quantity of the first time of photographing with the D1 algorithm to obtain a corresponding shot image.

12. The method of claim 10, further comprising:

determining a quantity of photographing waiting in a background when a frequency of the first operation on the first control meets a preset frequency condition or a difference between a memory water level and the memory occupation amount is less than a preset difference;

separately using a processing algorithm corresponding to each of the quantity of photographing waiting in the background as an initial processing algorithm;

using, as a target processing algorithm, a processing algorithm corresponding to a quantity of photographing most recently determined;

replacing, with the target processing algorithm, the initial processing algorithm of each of the quantity of photographing waiting in the background; and processing, with the target processing algorithm and when a quantity of any time of photographing waiting in the background is invoked for processing, images of a processing frame quantity corresponding to the quantity of the any time of photographing, to obtain a corresponding shot image, wherein the processing frame quantity corresponding to the quantity of the any time of photographing is a frame quantity of raw images collected at the any time of photographing.

13. The method of claim 9, further comprising:

determining a quantity of photographing waiting in a background when a frequency of the first operation on the first control meets a preset frequency condition or a difference between a memory water level and the memory occupation amount is less than a preset difference;

separately using a processing algorithm corresponding to each of the quantity of photographing waiting in the background as an initial processing algorithm;

using, as a target processing algorithm, a processing algorithm corresponding to a quantity of photographing most recently determined;

replacing, with the target processing algorithm, the initial processing algorithm of each of the quantity of photographing waiting in the background; and processing, with the target processing algorithm and when a quantity of any time of photographing waiting in the background is invoked for processing, images of a processing frame quantity corresponding to the quantity of the any time of photographing, to obtain a corresponding shot image, wherein the processing frame quantity corresponding to the quantity of the any time of photographing is a frame quantity of raw images collected at the any time of photographing.

14. The method of claim 1, further comprising:

determining a quantity of photographing waiting in a background when a frequency of the first operation on the first control meets a preset frequency condition or a difference between a memory water level and the memory occupation amount is less than a preset difference;

separately using a processing algorithm corresponding to each of the quantity of photographing waiting in the background as an initial processing algorithm;

using, as a target processing algorithm, a processing algorithm corresponding to a quantity of photographing most recently determined;

replacing, with the target processing algorithm, the initial processing algorithm of each of the quantity of photographing waiting in the background; and processing, with the target processing algorithm, images of a processing frame quality corresponding to any time of photographing waiting in the background to obtain a corresponding shot image, wherein the processing frame quantity corresponding to the quantity of the any time of photographing is a frame quantity of raw images collected at the any time of photographing.

15. The method of claim 1, wherein the first interface is a photographing interface, and the first control is a control for indicating photographing.

16. The method of claim 1, wherein the first interface is a video recording interface, and the first control is a control for indicating taking a snapshot.

17. An electronic device, comprising:

one or more processors; and a memory coupled to the one or more processors and configured to store instructions that, when executed by the one or more processors, cause the electronic device to be configured to:

display a first interface that comprises a first control;

collect raw images in response to a first operation on the first control;

process a quantity of images in the raw images to obtain a corresponding shot image, wherein the quantity of images is a first frame quantity and the processing is performed with a first photographing algorithm responsive to a memory occupation amount being less than a first memory threshold, wherein the quantity of images is a second frame quantity and the processing is performed with a second photographing algorithm responsive to a memory occupation amount being greater than or equal to the first memory threshold and less that a second memory threshold, and wherein the quantity of images is a third frame quantity and the processing is performed with a third photographing algorithm responsive to a memory occupation amount being greater than the second memory threshold;

and save the shot image, wherein the first frame quantity is greater than the second frame quantity, the second frame quantity is greater than the third frame quantity, wherein the first photographing algorithm, the second photographing algorithm, and the third photographing algorithm are different from each other, and wherein the first, second, and third photographing algorithms being different comprises a duration for processing an image frame with the second photographing algorithm being shorter than a duration for processing the image frame with the first photographing algorithm and a duration for processing the image frame with the third photographing algorithm being shorter than the duration for processing the image frame with the second photographing algorithm.

18. The electronic device of claim 17, wherein the instructions, when executed by the one or more processors, further cause the electronic device to be configured to:

determine a quantity of photographing waiting in a background when a frequency of the first operation on the first control meets a preset frequency condition or a difference between a memory water level and the memory occupation amount is less than a preset difference;

separately use a processing algorithm corresponding to each of the quantity of photographing waiting in the background as an initial processing algorithm;

use, as a target processing algorithm, a processing algorithm corresponding to a quantity of photographing most recently determined;

replace, with the target processing algorithm, the initial processing algorithm of each of the quantity of photographing waiting in the background; and process, with the target processing algorithm and when a quantity of any time of photographing waiting in the background is invoked for processing, images of a processing frame quantity corresponding to the quantity of the any time of photographing, to obtain a corresponding shot image, wherein the processing frame quantity corresponding to the quantity of the any time of photographing is a frame quantity of raw images collected at the any time of photographing.

19. A chip for an electronic device, wherein the chip comprises:

one or more processors configured to invoke computer instructions to cause the electronic device to be configured to:

display a first interface that comprises a first control;

collect raw images in response to a first operation on the first control;

process a quantity of images in the raw images to obtain a corresponding shot image, wherein the quantity of images is a first frame quantity and the processing is performed with a first photographing algorithm responsive to a memory occupation amount being less than a first memory threshold, wherein the quantity of images is a second frame quantity and the processing is performed with a second photographing algorithm responsive to a memory occupation amount being greater than or equal to the first memory threshold and less that a second memory threshold, and wherein the quantity of images is a third frame quantity and the processing is performed with a third photographing algorithm responsive to a memory occupation amount being greater than the second memory threshold; and save the shot image, wherein the first frame quantity is greater than the second frame quantity, the second frame quantity is greater than the third frame quantity, wherein the first photographing algorithm, the second photographing algorithm, and the third photographing algorithm are different from each other, and wherein the first, second, and third photographing algorithms being different comprises a duration for processing an image frame with the second photographing algorithm being shorter than a duration for processing the image frame with the first photographing algorithm and a duration for processing the image frame with the third photographing algorithm being shorter than the duration for processing the image frame with the second photographing algorithm.

* * * * *